(12) United States Patent
Shibutani et al.

(10) Patent No.: US 8,983,062 B2
(45) Date of Patent: Mar. 17, 2015

(54) ENCRYPTION PROCESSING DEVICE, ENCRYPTION PROCESSING METHOD, AND PROGRAMME

(75) Inventors: Kyoji Shibutani, Tokyo (JP); Toru Akishita, Tokyo (JP); Takanori Isobe, Tokyo (JP); Taizo Shirai, Kanagawa (JP); Harunaga Hiwatari, Kanagawa (JP); Atsushi Mitsuda, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/005,663

(22) PCT Filed: Feb. 20, 2012

(86) PCT No.: PCT/JP2012/053930
§ 371 (c)(1),
(2), (4) Date: Sep. 17, 2013

(87) PCT Pub. No.: WO2012/132620
PCT Pub. Date: Oct. 4, 2012

(65) Prior Publication Data
US 2014/0010364 A1 Jan. 9, 2014

(30) Foreign Application Priority Data
Mar. 28, 2011 (JP) .................................. 2011-069182
Sep. 22, 2011 (JP) .................................. 2011-207702

(51) Int. Cl.
G06F 21/00 (2013.01)
H04L 9/28 (2006.01)
(Continued)

(52) U.S. Cl.
CPC ................ *H04L 9/28* (2013.01); *H04L 9/0625* (2013.01); *G09C 1/00* (2013.01); *H04L 2209/24* (2013.01)
USPC .......................................................... 380/28

(58) Field of Classification Search
USPC ............................................................ 380/28
See application file for complete search history.

(56) References Cited

U.S. PATENT DOCUMENTS 5,351,299 A 9/1994 Matsuzaki et al.
6,269,163 B1 7/2001 Rivest et al.
(Continued)

FOREIGN PATENT DOCUMENTS

EP 2 325 828 A1 5/2011
JP 6-118872 A 4/1994
(Continued)

OTHER PUBLICATIONS

U.S. Appl. No. 14/278,632, filed May 15, 2014, Shirai, et al.
U.S. Appl. No. 14/002,379, filed Aug. 30, 2013, Shibutani, et al.
U.S. Appl. No. 14/006,392, filed Sep. 20, 2013, Shibutani, et al.
(Continued)

*Primary Examiner* — Jeffrey Pwu
*Assistant Examiner* — William Corum, Jr.
(74) *Attorney, Agent, or Firm* — Oblon, McClelland, Maier & Neustadt, L.L.P.

(57) ABSTRACT

A cryptographic processing unit divides and inputs constituent bits of data to be subjected to data processing to lines, and repeatedly performs a data converting operation using round functions on the data of the respective lines. The cryptographic processing unit inputs n/d-bit data obtained by dividing n-bit data as input data by a division number d to each line, and repeatedly performs a round calculation including a data converting operation using round functions. The n/d-bit data in each line having output data of the round calculations is divided into d/2 sets of data, and the divided data are combined to restructure d sets of n/d-bit data that are different from the output data of the round calculations of the previous stage. The restructured data is set as input data for round calculations of the next stage. The cryptographic processing realizes improved diffusion properties and a high level of security.

15 Claims, 40 Drawing Sheets

(51) Int. Cl.
*H04L 9/06* (2006.01)
*G09C 1/00* (2006.01)

(56) References Cited

U.S. PATENT DOCUMENTS

| | | | |
|---|---|---|---|
| 8,073,140 | B2 | 12/2011 | Shirai et al. |
| 2002/0025035 | A1 | 2/2002 | Rivest et al. |
| 2009/0010425 | A1 | 1/2009 | Shibutani et al. |
| 2010/0002872 | A1* | 1/2010 | Shibutani et al. ............ 380/28 |
| 2010/0014659 | A1* | 1/2010 | Shibutani et al. ............ 380/28 |
| 2010/0061548 | A1* | 3/2010 | Shirai et al. ............ 380/28 |
| 2010/0266122 | A1 | 10/2010 | Suzaki et al. |
| 2011/0211688 | A1* | 9/2011 | Shirai et al. ............ 380/28 |

FOREIGN PATENT DOCUMENTS

| | | |
|---|---|---|
| JP | 2002-518713 | 6/2002 |
| WO | WO 99/66669 A2 | 12/1999 |
| WO | WO 99/66669 A3 | 12/1999 |
| WO | 2005/025124 A1 | 3/2005 |
| WO | WO 2009/075337 A1 | 6/2009 |
| WO | WO 2011/052585 A1 | 5/2011 |

OTHER PUBLICATIONS

U.S. Appl. No. 14/002,462, filed Aug. 30, 2013, Shibutani, et al.
International Search Report issued Mar. 27, 2012 in PCT/JP2012/053930.
Tomoyasu Suzaki, et al., "Improving the Generalized Feistel", International Association for Cryptologic Research, 2010, pp. 19-39 with cover pages.
Kyoji Shibutani, et al., "Piccolo: An Ultra-Lightweight Blockcipher", International Association for Cryptologic Research, 2011, pp. 342-357 with cover pages.
Yuliang Zheng, et al., "On the Construction of Block Ciphers Provably Secure and Not Relying on Any Unproved Hypotheses", Crypto, 1998, pp. 461-480.
Kaisa Nyberg "Generalized Feistel Networks", AsiaCrypt 96, 1996, pp. 91-104.
Search and Examination Report issued Sep. 12, 2014, in Singapore Patent Application No. 2013070586.
Extended European Search Report issued Oct. 6, 2014, in European Patent Application No. 12763711.4.
Office Action issued Oct. 21, 2014, in Japanese Patent Application No. 2011-207702 (no English translation or abstract).

* cited by examiner

RELATIONS AMONG n-BIT DATA DIVISION NUMBER d, d/n-BIT DATA DIVISION NUMBER p, AND NUMBER OF full-diffusion ROUNDS

| d\p | 2 | 3 | 4 | 5 | 6 | 7 | 8 | 9 | 10 | 11 | 12 |
|---|---|---|---|---|---|---|---|---|---|---|---|
| 4 | 4 | – | – | – | – | – | – | – | – | – | – |
| 6 | 5 | 4 | – | – | – | – | – | – | – | – | – |
| 8 | 5 | 5 | 4 | – | – | – | – | – | – | – | – |
| 10 | 6 | 5 | 5 | 4 | – | – | – | – | – | – | – |
| 12 | 6 | 5 | 5 | 5 | 4 | – | – | – | – | – | – |
| 14 | 6 | 5 | 5 | 5 | 5 | 4 | – | – | – | – | – |
| 16 | 6 | 5 | 5 | 5 | 5 | 5 | 4 | – | – | – | – |
| 18 | 7 | 5 | 5 | 5 | 5 | 5 | 5 | 4 | – | – | – |
| 20 | 7 | 6 | 5 | 5 | 5 | 5 | 5 | 5 | 4 | – | – |
| 22 | 7 | 6 | 5 | 5 | 5 | 5 | 5 | 5 | 5 | 4 | – |
| 24 | 7 | 6 | 5 | 5 | 5 | 5 | 5 | 5 | 5 | 5 | 4 |

EACH DIVIDED INTO p

FIG. 29
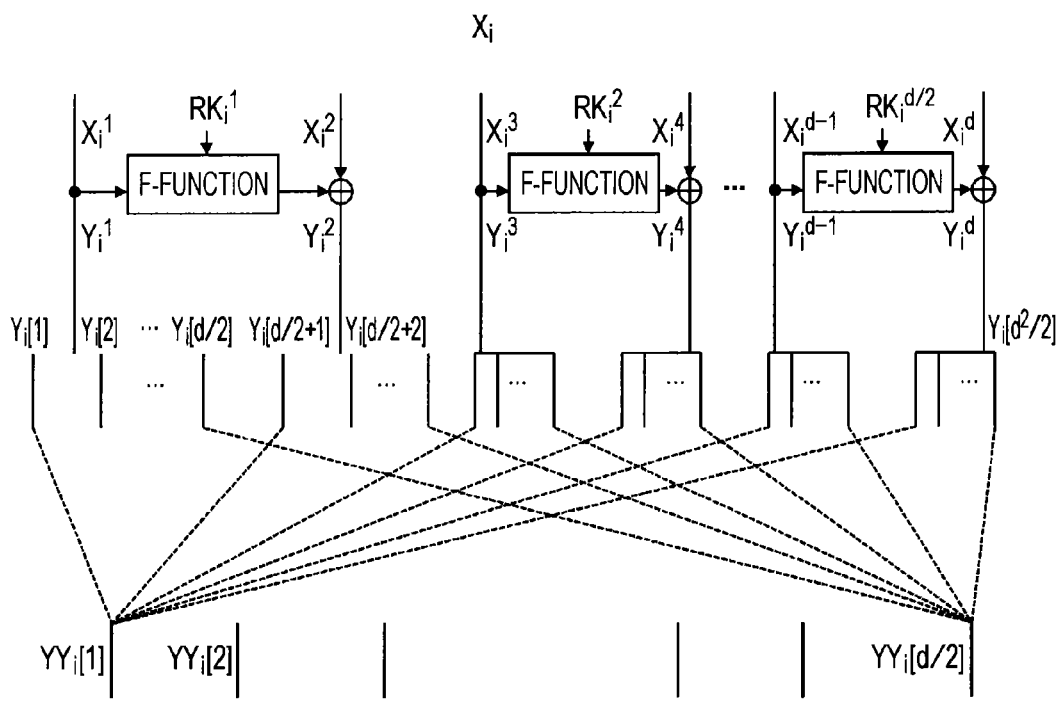
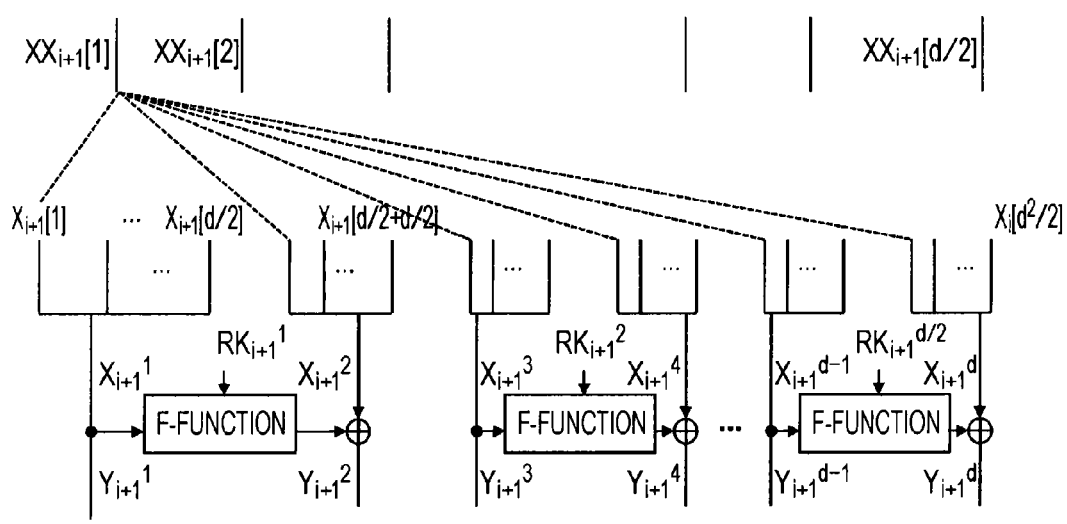

FIG. 30
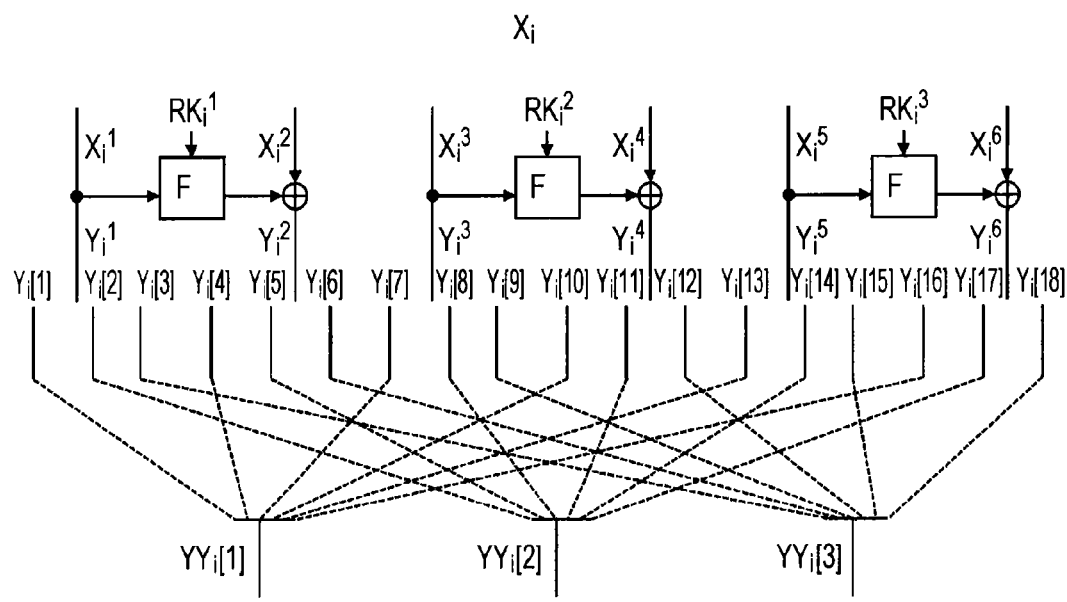
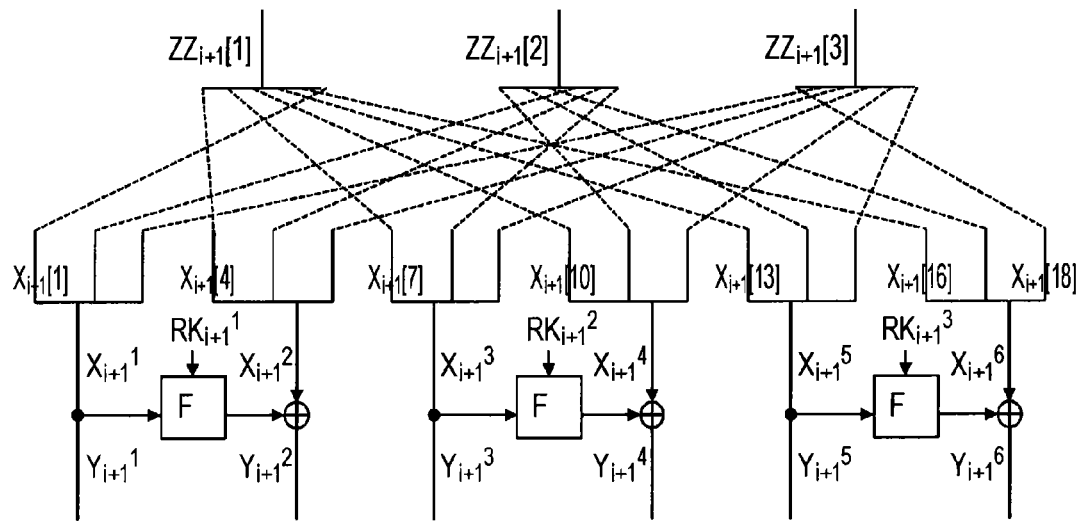

Feistel STRUCTURE (ENCRYPTION FUNCTION)

ENCRYPTION PROCESSING DEVICE, ENCRYPTION PROCESSING METHOD, AND PROGRAMME

TECHNICAL FIELD

This disclosure relates to cryptographic processing devices, cryptographic processing methods, and programs. More particularly, this disclosure relates to a cryptographic processing device that involves symmetric-key cryptography, a cryptographic processing method, and a program.

BACKGROUND ART

As the information-oriented society develops, the importance of the information security technology for securing safety of information being handled becomes higher. One of the elements of the information security technology is cryptographic technology, and the cryptographic technology is being currently used in various products and systems.

There are various cryptographic processing algorithms, and one of the basic techniques is so-called symmetric-key block cryptography. In symmetric-key block cryptography, the key for encryption and the key for decryption are the same. In both an encrypting operation and a decrypting operation, keys are generated from the common key, and a data converting operation with a certain block data unit such as 64 bits, 128 bits, or 256 bits is repeatedly performed.

Widely known symmetric-key block cryptographic algorithms include DES (Data Encryption Standard), which is a former standard in the U.S., and AES (Advanced Encryption Standard), which is the current standard in the U.S. Other various symmetric-key block cryptographic techniques are still being suggested today, and CLEFIA, which was suggested by Sony Corporation in 2007, is also one of symmetric-key block cryptographic techniques.

Such a symmetric-key block cryptographic algorithm is formed mainly with a cryptographic processing unit that has a round-function executing unit that repeatedly converts input data, and a key scheduling unit that generates round keys to be used in the respective rounds of round function units. The key scheduling unit first generates an enlarged key with an increased number of bits based on a master key (a main key) that is a secret key, and then generates round keys (sub keys) to be used in the respective round function units of the cryptographic processing unit based on the generated enlarged key.

As a specific structure that executes such an algorithm, there is a known structure that repeatedly executes a round function including a linear transformation unit and a nonlinear transformation unit. Typical example structures include a Feistel structure and a generalized Feistel structure. A Feistel structure and a generalized Feistel structure each have a structure that transforms a plain text into a cipher text through a simple repetition of a round function including F-functions as data conversion functions. In each F-function, linear transformation and nonlinear transformation are performed. Non-Patent Document 1 and Non-Patent Document 2 are examples of documents that disclose cryptographic processing using a Feistel structure.

One of the indications used in evaluating security of block encryption is diffusion properties. The properties can be regarded as properties that spread (or diffuse) input data changes into output data, and, in secure block encryption, influence of such changes in the input data is expected to be transmitted to the output data as fast as possible.

It can be predicted that, to improve diffusion properties, an increase in the number of round function repetitions will be effective, for example. However, there are no conventional techniques disclosed to improve diffusion properties with a smaller number of round-function repetitions.

CITATION LIST

Non-Patent Documents

Non-Patent Document 1: K. Nyberg, "Generalized Feistel networks", ASIACRYPT 96, SpringerVerlag, 1996, pp. 91—104.
Non-Patent Document 2: Yuliang Zheng, Tsutomu Matsumoto, Hideki Imai: On the Construction of Block Ciphers Provably Secure and Not Relying on Any Unproved Hypotheses. CRYPTO 1989:461-480

SUMMARY OF THE INVENTION

Problems to be Solved by the Invention

This disclosure is being made in view of the above described circumstances, for example, and an object thereof is to provide a cryptographic processing device that has a high level of security with improved diffusion properties, a cryptographic processing method, and a program.

Solutions to Problems

A first aspect of this disclosure resides in a cryptographic processing device that includes a cryptographic processing unit that divides and inputs constituent bits of data to be subjected to data processing, into lines, and repeatedly performs a data converting operation on the data in the respective lines by using a round function,
wherein the cryptographic processing unit has a structure designed to input n/d-bit data formed by dividing n-bit data as input data by a division number d to the respective lines, and repeatedly perform a calculation as a round calculation including the data converting operation using the round function, and
the cryptographic processing unit performs an operation in which the n/d-bit data of each line having output data of the round calculation is redivided into d/2 sets of data, the redivided data is recombined to restructure d sets of n/d-bit data different from output data of the round calculation of the previous stage, and the restructured data is set as input data for the round calculation of the next stage.

Further, in an embodiment of the cryptographic processing device of this disclosure, the round function includes an F-function that includes a calculation using a round key, nonlinear transformation, and linear transformation, and an exclusive OR operation between an output or an input of the F-function and the data of another line.

Further, in an embodiment of the cryptographic processing device of this disclosure, the cryptographic processing unit sets the result of the round calculation of the previous stage as the input to the round calculation of the next stage by performing an operation that satisfies the following distribution conditions (1) through (3):
(1) F-function input-side data series are invariably distributed to XOR-side data series of the next round function,
(2) XOR-side data series are invariably distributed to F-function input-side data series of the next round function, and
(3) each one of data series divided into d/2 sets is distributed to d/2 data series of the next round function without overlaps.

Further, in an embodiment of the cryptographic processing device of this disclosure, the cryptographic processing unit has a generalized Feistel structure having equal to or greater than 4 as the division number d of input data.

Further, in an embodiment of the cryptographic processing device of this disclosure, the cryptographic processing unit performs an operation in which d×(n/d) sets of redivided data are generated by redividing n/d-bit data of each of d lines having the output data of the round calculation into d/2 sets of data, d/2 sets of redivided data selected from different lines among the d lines corresponding to the division number d are recombined to restructure d sets of n/d-bit data different from the output data of the round calculation of the previous stage, and the restructured data is set as the input data for the round calculation of the next stage.

Further, in an embodiment of the cryptographic processing device of this disclosure, when all the output bits are in a diffusion state that satisfies the following two conditions, or when the output bits are expressed in a relational expression with input bits, the cryptographic processing unit has a structure that realizes a full diffusion state satisfying the following two conditions:

(Condition 1) all the input bits are included in the relational expression, and (Condition 2) all the input bits have passed through the round function at least once.

Further, in an embodiment of the cryptographic processing device of this disclosure, the cryptographic processing unit further realizes the full diffusion state through four rounds of round calculations.

Further, in an embodiment of the cryptographic processing device of this disclosure, the connection structure that determines an input-output relationship between the output data of the round calculation of the previous stage and the redivided data of the round calculation of the next stage is a connection structure selected from connection structures that have (d/2) sets of 2n/d-bit data as units that are the data generated by combining d×(n/d) sets of redivided data generated through a redividing operation performed on the n/d-bit data in the lines having the output data of the round calculation.

Further, in an embodiment of the cryptographic processing device of this disclosure, the cryptographic processing unit has involution properties applicable both in an encrypting operation and a decrypting operation.

Further, in an embodiment of the cryptographic processing device of this disclosure, the operation to restructure redivided data of the respective round calculations in the cryptographic processing unit includes: distributing the redivided data of round-function input-side series of the previous stage to XOR-side series of the next stage in accordance with a predetermined rule; and distributing the redivided data of the XOR-side series of the previous stage to the round-function input-side series of the next stage in accordance with a predetermined rule.

Further, in an embodiment of the cryptographic processing device of this disclosure, the cryptographic processing unit performs an encrypting operation to transform a plain text as input data into a cipher text, or a decrypting operation to transform a cipher text as input data into a plain text.

Further, a second aspect of this disclosure resides in a cryptographic processing method implemented in a cryptographic processing device, the cryptographic processing method including a cryptographic processing step of dividing and inputting the constituent bits of data to be subjected to data processing into lines, and repeatedly performing a data converting operation on the data in the respective lines by using a round function, wherein the cryptographic processing step includes: inputting n/d-bit data formed by dividing n-bit data as input data by a division number d to the respective lines; and repeatedly performing a calculation as a round calculation including the data converting operation using the round function, and the cryptographic processing step includes an operation in which the n/d-bit data of each line having the output data of the round calculation is redivided into d/2 sets of data, the redivided data is recombined to restructure d sets of n/d-bit data different from the output data of the round calculation of the previous stage, and the restructured data is set as input data for the round calculation of the next stage.

Further, a third aspect of this disclosure resides in a program for causing a cryptographic processing device to perform cryptographic processing, the program causing a cryptographic processing unit to carry out a cryptographic processing step of dividing and inputting the constituent bits of data to be subjected to data processing into lines, and repeatedly performing a data converting operation on the data in the respective lines by using a round function, wherein the cryptographic processing step includes: inputting n/d-bit data formed by dividing n-bit data as input data by a division number d to the respective lines; and repeatedly performing a calculation as a round calculation including the data converting operation using the round function, and the cryptographic processing step includes an operation in which the n/d-bit data of each line having output data of the round calculation is redivided into d/2 sets of data, the redivided data is recombined to restructure d sets of n/d-bit data different from output data of the round calculation of the previous stage, and the restructured data is set as input data for the round calculation of the next stage.

It should be noted that the program of this disclosure is a program that is recorded on a storage medium and is then provided to an information processing device or a computer system that can execute various program codes, for example. As a program executing unit in an information processing device or a computer system executes such a program, operations according to the program are performed.

Other objects, features, and advantages of this disclosure will become apparent from the detailed description below in conjunction with the later described embodiments of the present invention and the accompanying drawings. In this specification, a system is a logical integration of devices, and each of the component devices is not necessarily located in the same housing.

Effects of the Invention

According to an embodiment of this disclosure, cryptographic processing with improved diffusion properties and a high level of security is realized.

Specifically, a cryptographic processing unit divides and inputs the constituent bits of the data to be subjected to data processing to lines, and repeatedly performs a data converting operation using round functions on the data of the respective lines. The cryptographic processing unit inputs n/d-bit data obtained by dividing n-bit data as input data by a division number d to each line, and repeatedly performs a round calculation that is a calculation including a data converting operation using round functions. The n/d-bit data in each line having output data of the round calculations is divided into d/2 sets of data, and the divided data are combined to restructure d sets of n/d-bit data that are different from the output data of the round calculations of the previous stage. The restructured data is set as the input data for the round calculations of the next stage. With this structure, cryptographic processing with improved diffusion properties and a high level of security can be realized.

BRIEF DESCRIPTION OF DRAWINGS

FIG. 29 is a diagram for explaining a more efficient data distribution method.

FIG. 30 is a diagram for explaining a more efficient data distribution method.

MODES FOR CARRYING OUT THE INVENTION

Figure 1:
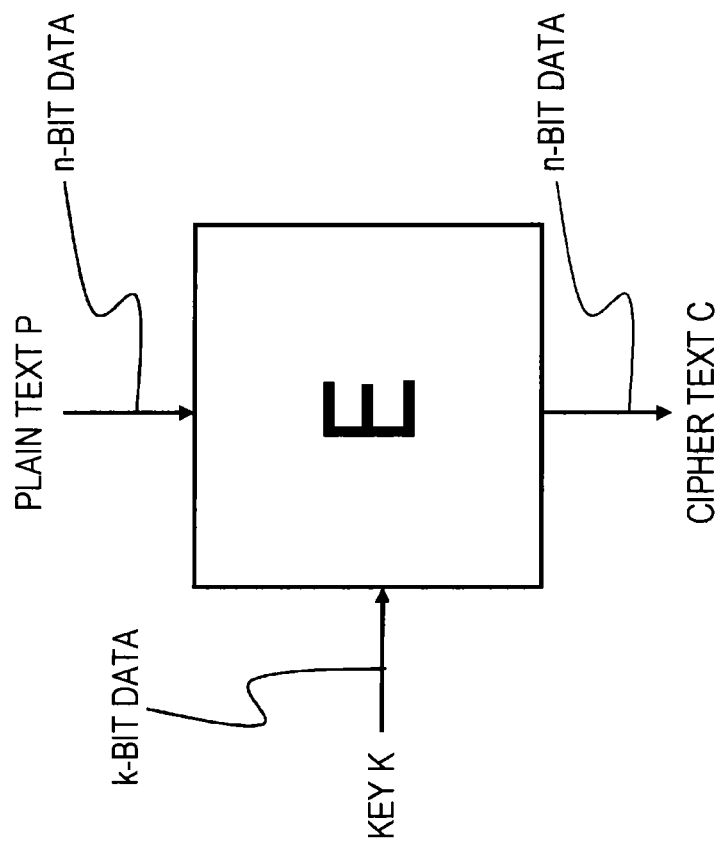
FIG. 1 is a diagram for explaining an n-bit symmetric-key block cryptographic algorithm compatible with the key length of k bits.

The following is a detailed description of a cryptographic processing device, a cryptographic processing method, and a program according to this disclosure, with reference to the drawings. Explanation will be made in the order of the following chapters.

1. Outline of symmetric-key block cryptography
2. Outline of diffusion properties
(2-1) Description of diffusion properties
(2-2) Conventional example structure taking diffusion properties into account
3. Example structure with improved diffusion properties according to this disclosure
4. Example structure having more efficient data distribution
5. Example structure with involution properties
6. Example structure of a cryptographic processing device
7. Summary of the structures according to this disclosure

[1. Outline of Symmetric-Key Block Cryptography]

First, symmetric-key block cryptography is briefly described.

(1-1. Symmetric-Key Block Cryptography)

Symmetric-key block cryptography (hereinafter referred to as block encryption) is defined as follows.

In block encryption, a plain text P and a key K are received as inputs, and a cipher text C is output. The bit length of a plain text and a cipher text is referred to as the block size, and is represented by n herein. Although n may be any integer value, n is normally a value uniquely determined for each block encryption algorithm. Block encryption using n as the block length may also be referred to as n-bit block encryption.

The bit length of a key is represented by k. A key may have any integer value. Each symmetric-key block cryptographic algorithm is compatible with one or more key sizes. For example, a block encryption algorithm A has a block size of n=128, and may be compatible with key sizes of k=128, 192, and 256.

Plain text P: n bits
Cipher text C: n bits
Key K: k bits

FIG. 1 is a diagram of an n-bit symmetric-key block encryption algorithm E compatible with the key length of k bits.

Figure 2:
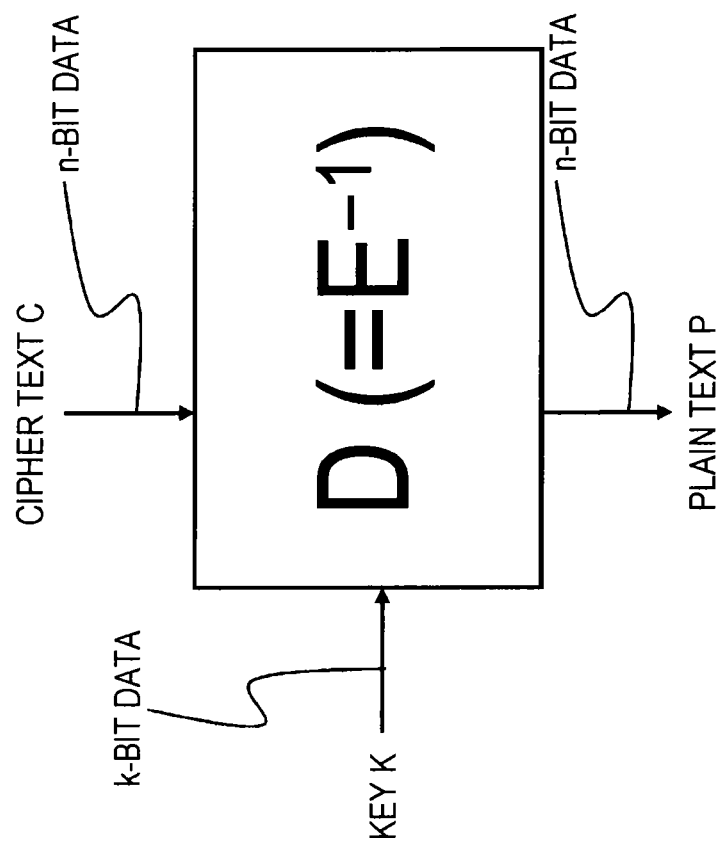
FIG. 2 is a diagram for explaining a decryption algorithm corresponding to the n-bit symmetric-key block cryptographic algorithm compatible with the key length of k bits shown in FIG. 1.

A decryption algorithm D compatible with the encryption algorithm E can be defined as the inverse function $E^{-1}$ of the encryption algorithm E. A cipher text C and a key K are received as inputs, and a plain text P is output. FIG. 2 is a diagram showing the decryption algorithm D compatible with the encryption algorithm E shown in FIG. 1.

(1-2. Inner Structure)

Block encryption can be divided into two units.

One is a "key scheduling unit" that inputs a key K and outputs an enlarged key K' (bit length k') formed by extending a bit length through a predetermined step, and the other one is a "data encrypting unit" that receives the plain text P and the enlarged key K' from the key scheduling unit, converts the data, and outputs the cipher text C.

Figure 3:
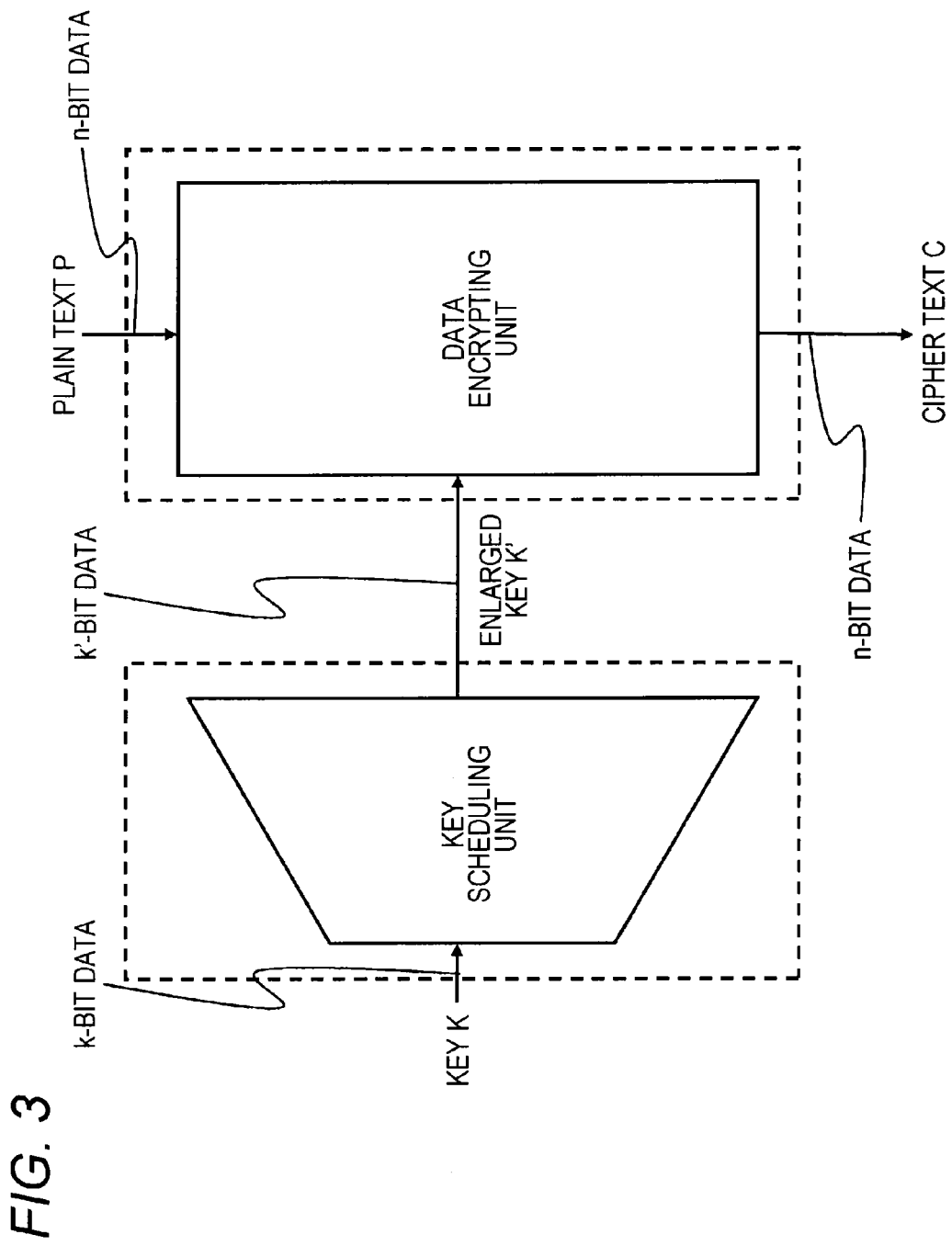
FIG. 3 is a diagram for explaining a relationship between a key scheduling unit and a data encrypting unit.

The relationship between the two units is shown in FIG. 3.

(1-3. Data Encrypting Unit)

Figure 4:
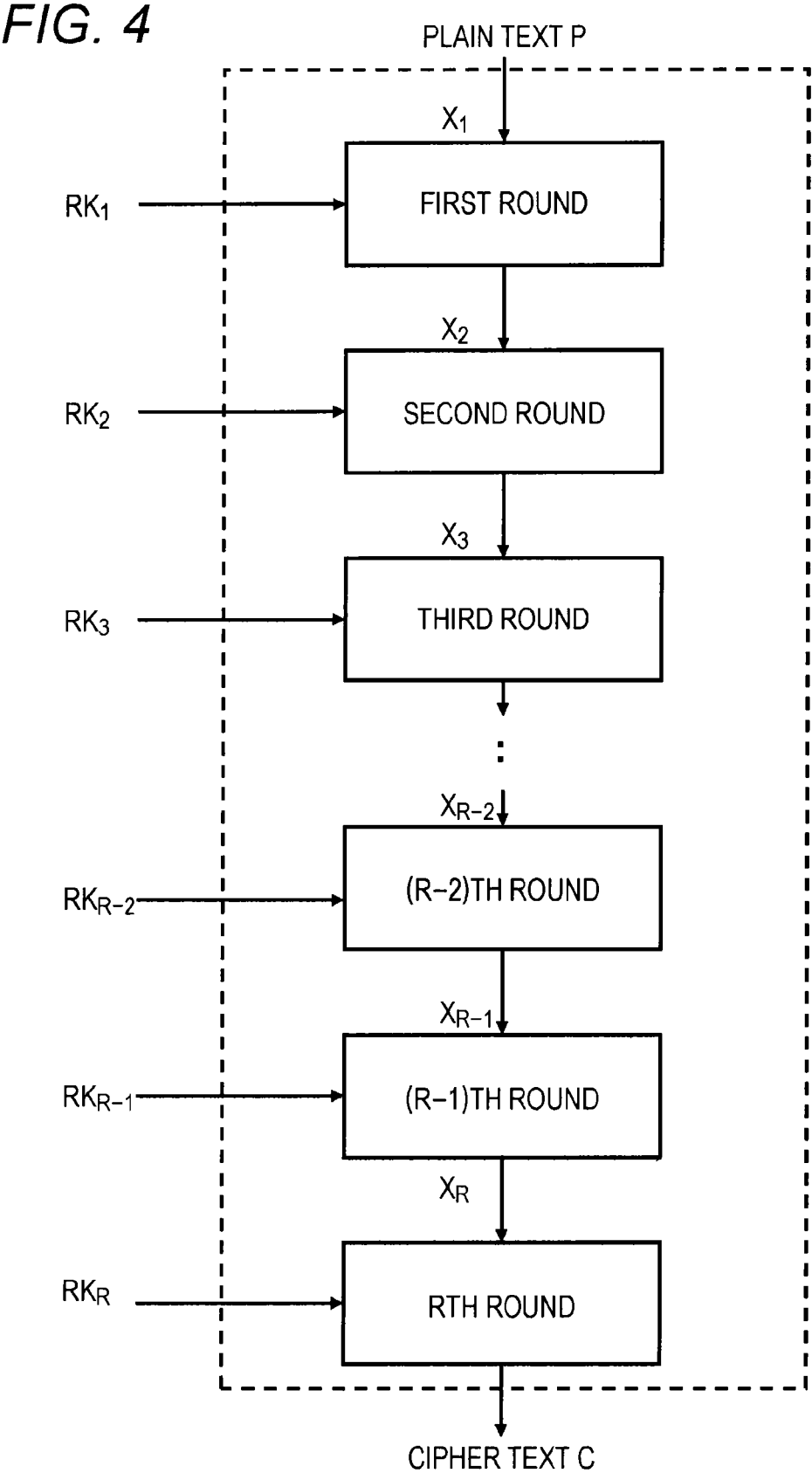
FIG. 4 is a diagram for explaining an example structure of the data encrypting unit.

The data encrypting unit used in the following embodiments can be divided into processing units called round functions. A round function receives two sets of data as inputs, and outputs one set of data after processing the data therein. One set of the input data is n-bit data being currently encrypted, and the output of the round function in a round is supplied as an input to the next round. The other set of the input data is the data of part of the enlarged key that is output from the key scheduling unit, and this key data is called the round key. The total number of the round functions is called the total number of rounds, and is a value that is set beforehand for each encryption algorithm. Here, the total number of rounds is represented by R.

Where the input data of the first round counted from the input side of the data encrypting unit is represented by $X_1$, the data that is input to the ith round function is represented by $X_i$, and the round key is represented by $RK_i$, the entire data encrypting unit is expressed as shown in FIG. 4.

(1-4. Round Functions)

The round functions can have various forms, depending on block encryption algorithms. The round functions can be classified on the basis of the structures employed by respective encryption algorithms. Examples of typical structures include a SPN structure, a Feistel structure, and an extended Feistel structure.

(a) SPN-Structure Round Function

Figure 5:
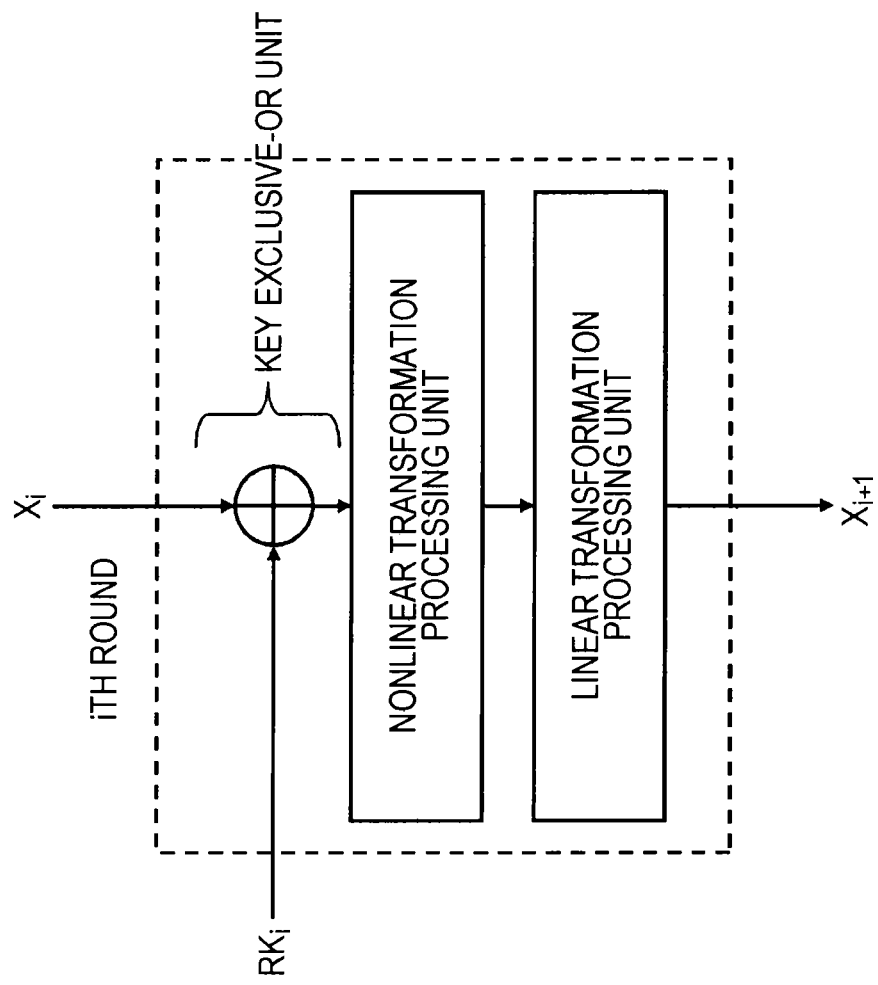
FIG. 5 is a diagram for explaining an example of a round function having an SPN structure.

A structure that performs an exclusive OR operation with a round key, a nonlinear transformation, and a linear transformation on all the n-bit input data. The order of the respective operations is not particularly set. FIG. 5 shows an example of a round function having the SPN structure.

Figure 6:
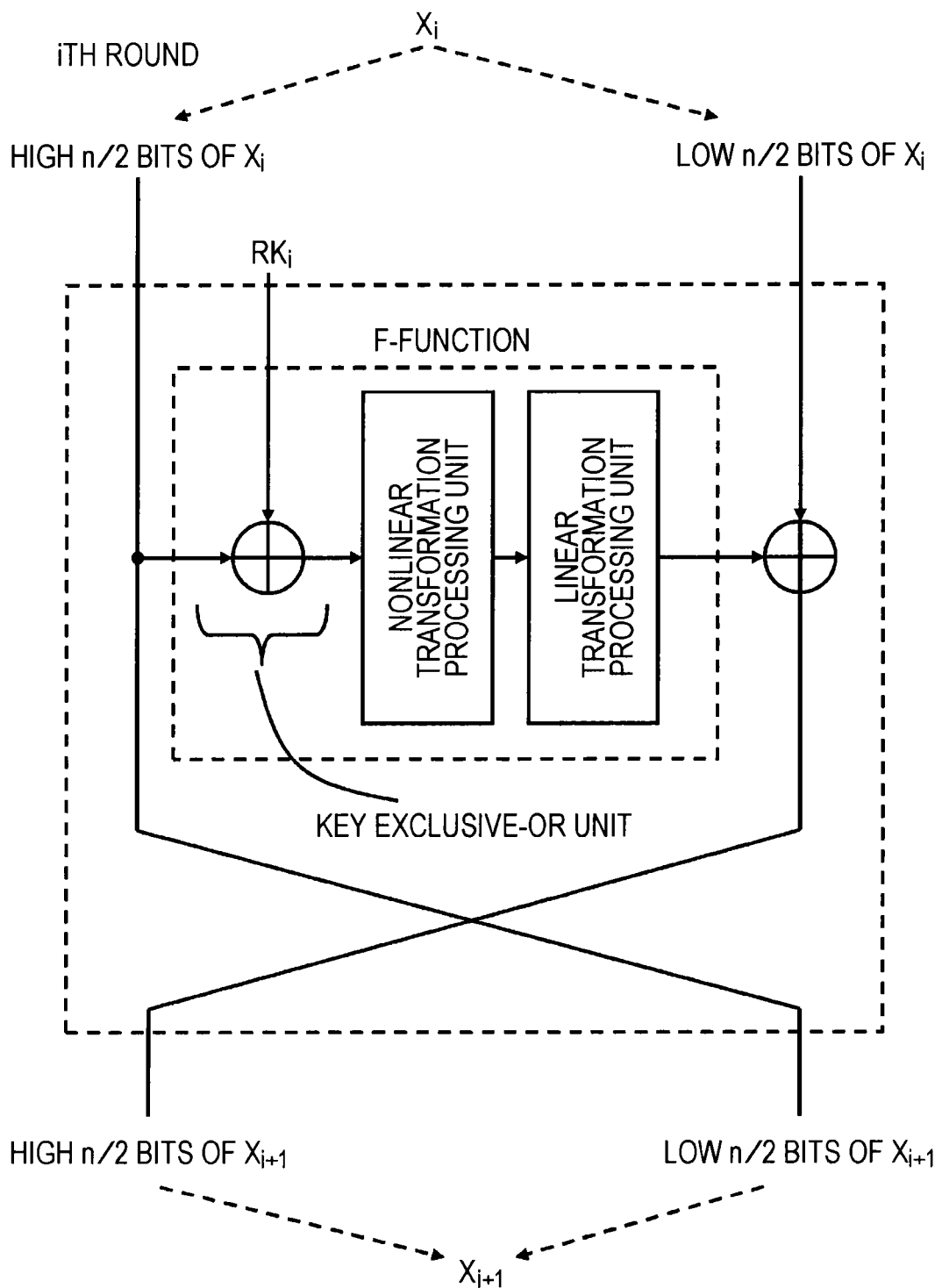
FIG. 6 is a diagram for explaining an example of a round function having a Feistel structure.

(b) Feistel Structure n-bit input data is divided into two sets of n/2-bit data. One of the sets of the data and a round key are input to a function (an F-function), and the output and the other one set of the data are subjected to exclusive OR. The right and the left of the data are then replaced with each other, to form output data. The inner structure of the F-function may be of any of various types, but is basically realized by a combination of an exclusive OR operation with round key data, a nonlinear operation, and a linear transformation, like a SPN structure. FIG. 6 shows an example of a round function having the Feistel structure.

(c) Extended Feistel Structure

Figure 7:
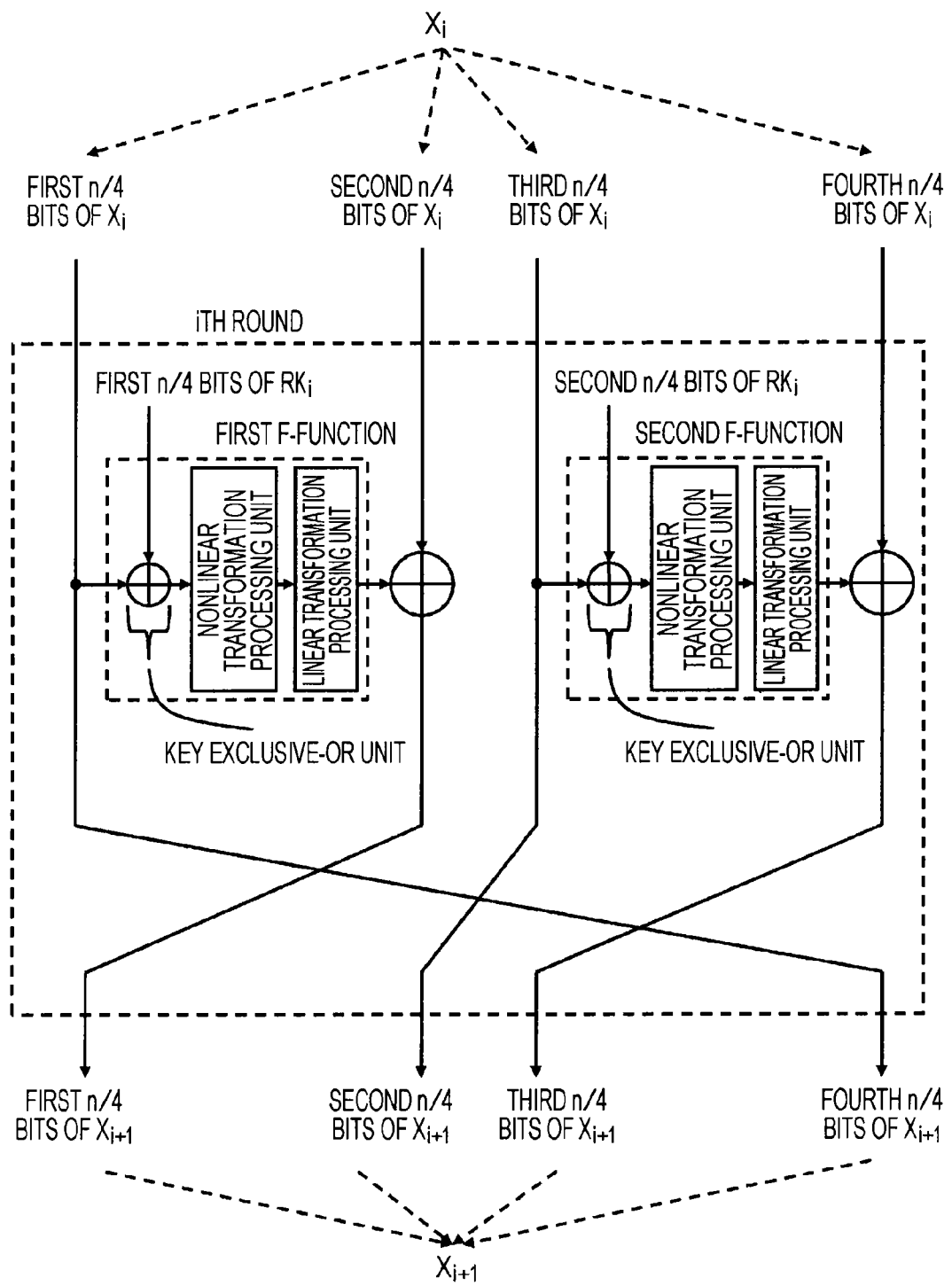
FIG. 7 is a diagram for explaining an example of an extended Feistel structure.
Figure 8:
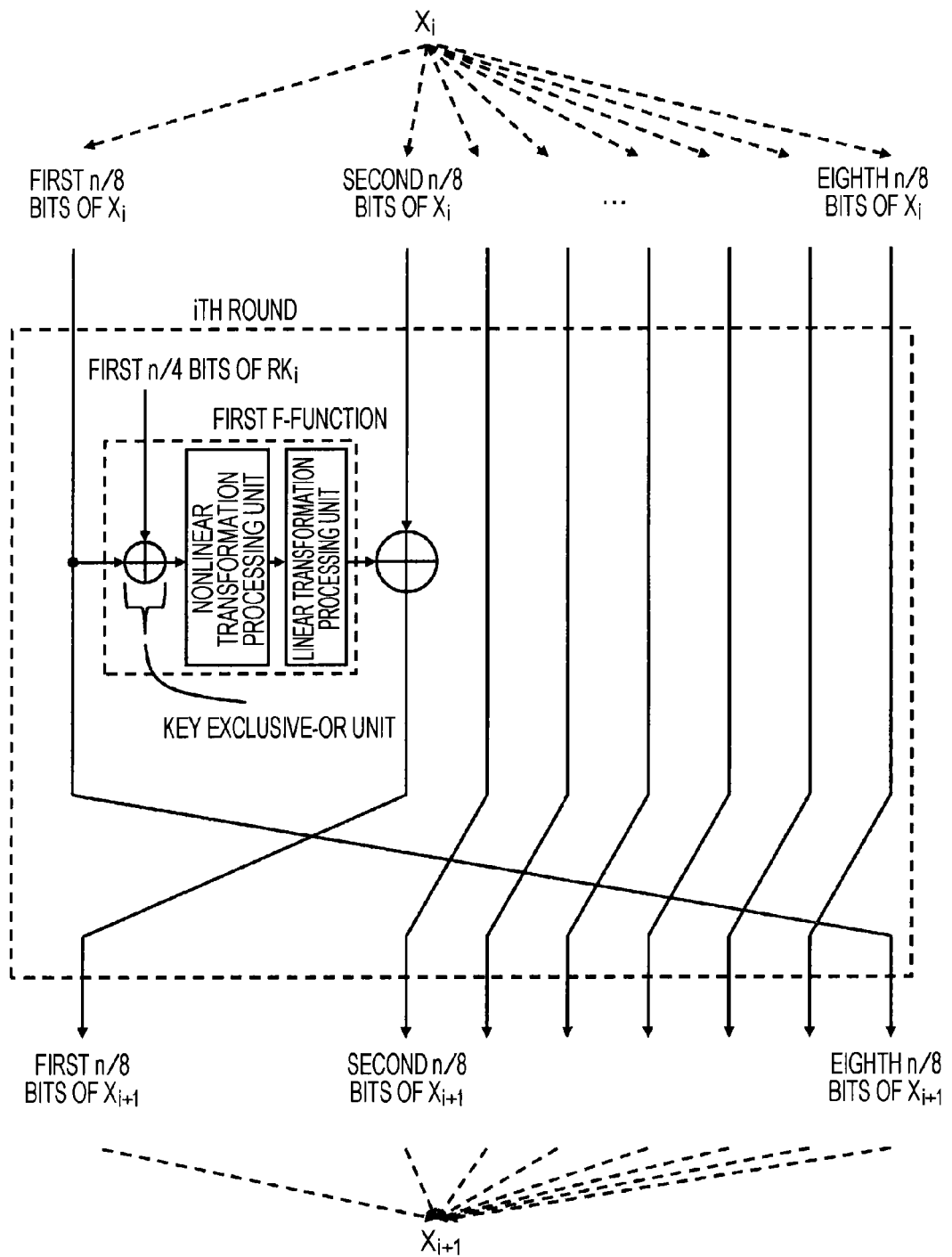
FIG. 8 is a diagram for explaining an example of an extended Feistel structure.

An extended Feistel structure differs from a Feistel structure in that the number of data divisions is 3 or more, instead of 2. Where the number of divisions is represented by d, various extended Feistel structures can be defined by d. As the input/output size of an F-function becomes relatively smaller, this structure is considered suitable for small-size implementation. FIG. 7 shows an example of an extended Feistel structure in a case where d is 4, and two F-functions are used in parallel in one round. FIG. 8 shows an example of an extended Feistel structure employed in a case where d is 8, and one F-function is used in one round.

(1-5. Nonlinear Transformation Processing Unit)

Figure 9:
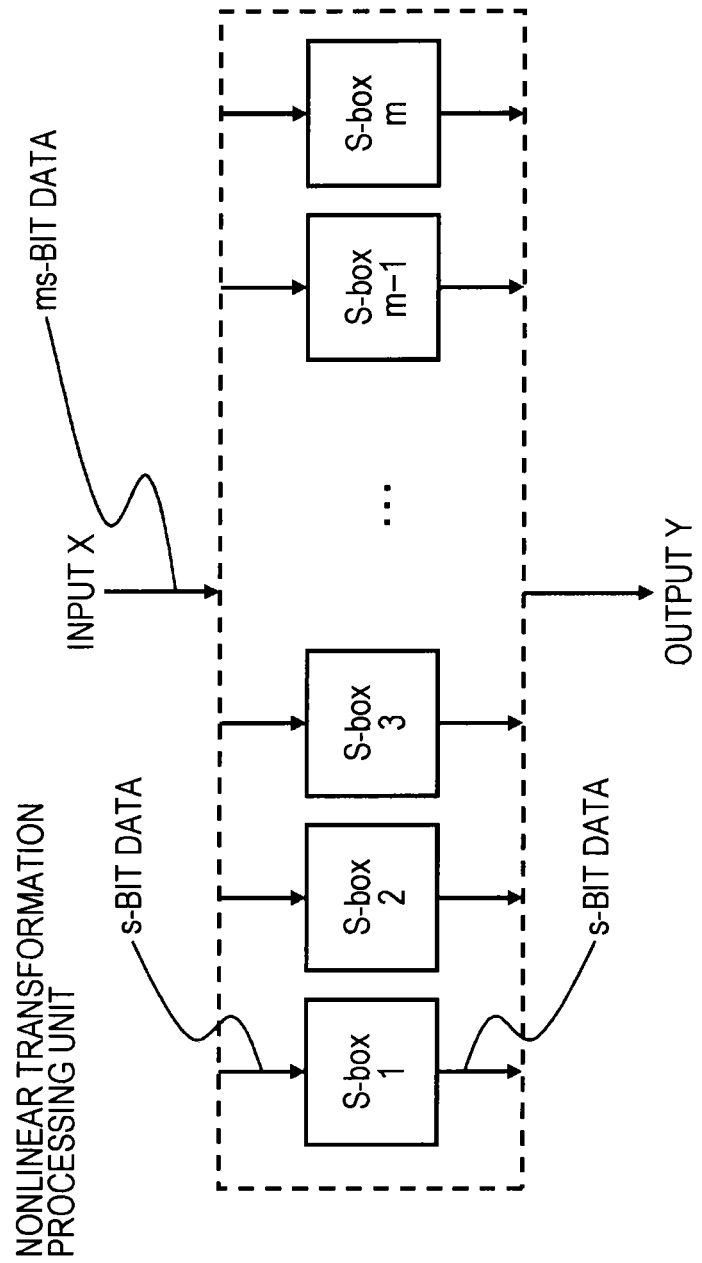
FIG. 9 is a diagram for explaining an example structure of a nonlinear transformation unit.

A nonlinear transformation processing unit tends to have high implementation costs where the size of data to be input is large. To avoid that, target data is divided into two or more units, and a nonlinear transformation is performed on each of the units in many cases. For example, where the input size is ms bits, input data is divided into m sets of s-bit data, and a nonlinear transformation having an s-bit input and output is performed on each of the m sets of s-bit data. Those s-bit nonlinear transformations are called S-boxes herein. FIG. 9 shows an example.

(1-6. Linear Transformation Processing Unit)

Figure 10:
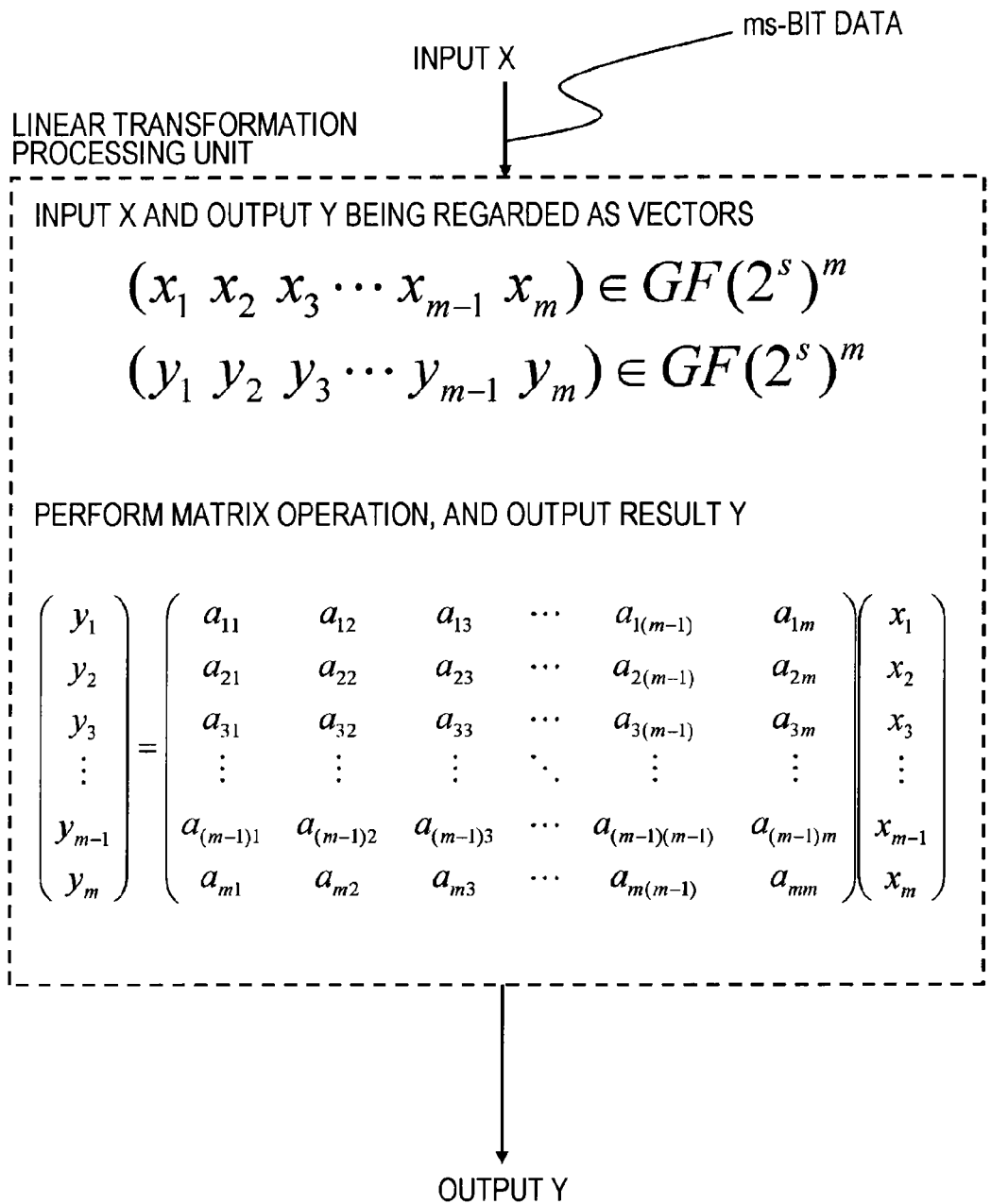
FIG. 10 is a diagram for explaining an example structure of a linear transformation processing unit.

A linear transformation processing unit can be defined as a matrix, in view of the characteristics thereof. The elements of the matrix may be normally expressed in various forms, such as the elements of $GF(2^8)$ or the elements of $GF(2)$. FIG. 10 shows an example of a linear transformation processing unit that has an ms-bit input and output and is defined by an m×m matrix defined on $GF(2^s)$.

[2. Outline of Diffusion Properties]

Diffusion properties are now briefly described before cryptographic processing of this disclosure is explained.

(2-1) Description of Diffusion Properties

As briefly described above, diffusion properties are used as one of the indications used in evaluating security of block encryption. The properties can be regarded as properties that spread (or diffuse) input data changes into output data, and, in secure block encryption, influence of such changes in the input data is expected to be transmitted to the output data as fast as possible.

In the following, "diffusion state", "full diffusion state", and "number of full diffusion rounds" are defined.

In a case where an output bit is written as a relational expression of input bits, and the relational expression satisfies the conditions shown below, the state of the output bit is defined as the "diffusion state".

(Condition 1) All the input bits are included in the relational expression.

(Condition 2) All the input bits have passed through a round function (an F-function) at least once.

Further, a state where all the output bits are in the diffusion state is defined as the "full diffusion state".

The minimum number of rounds (the number of repetitions) required to achieve the full diffusion state is defined as the "number of full diffusion rounds".

Figure 11:
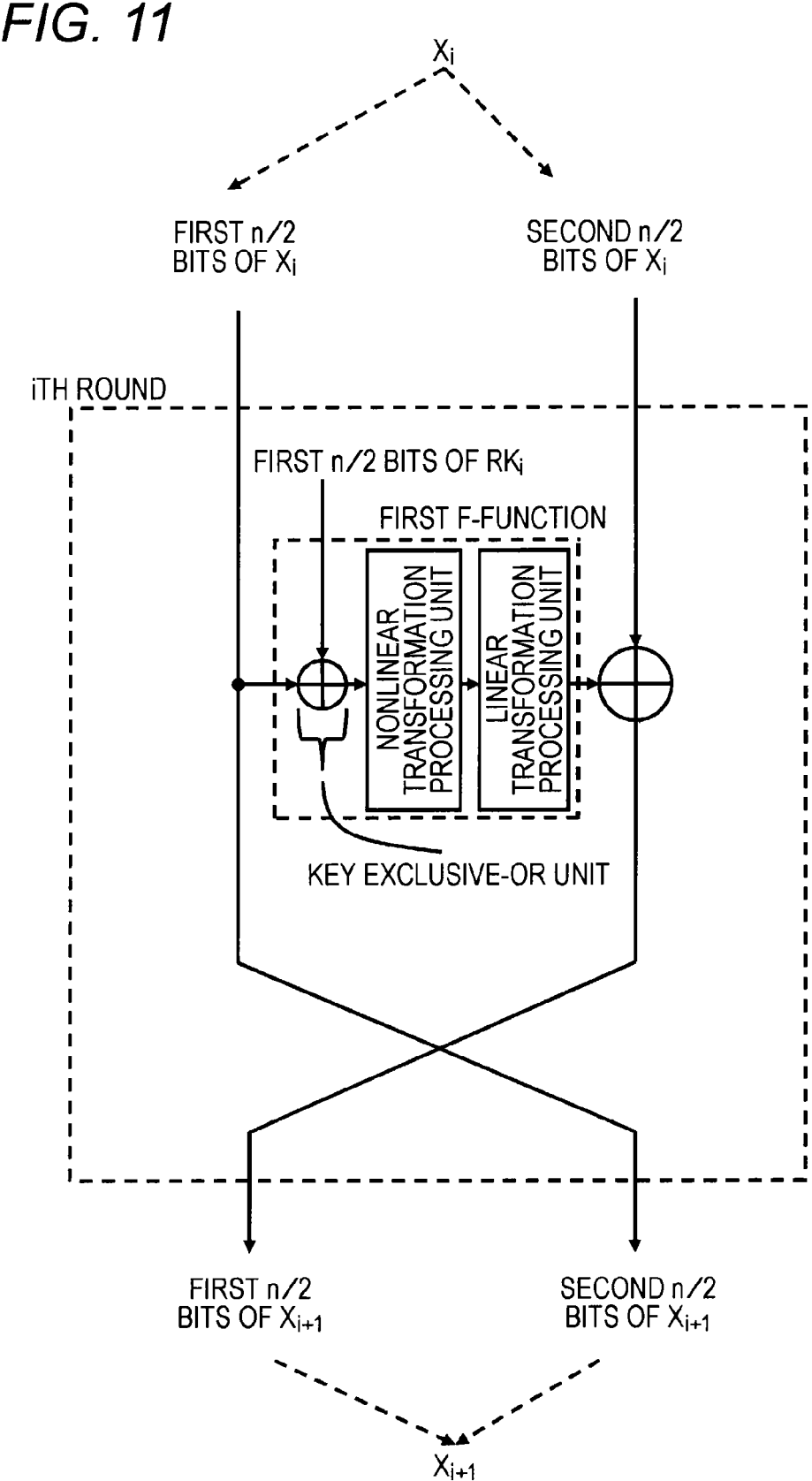
FIG. 11 is a diagram for explaining a diffusion state in block encryption with a Feistel structure.
Figure 12:
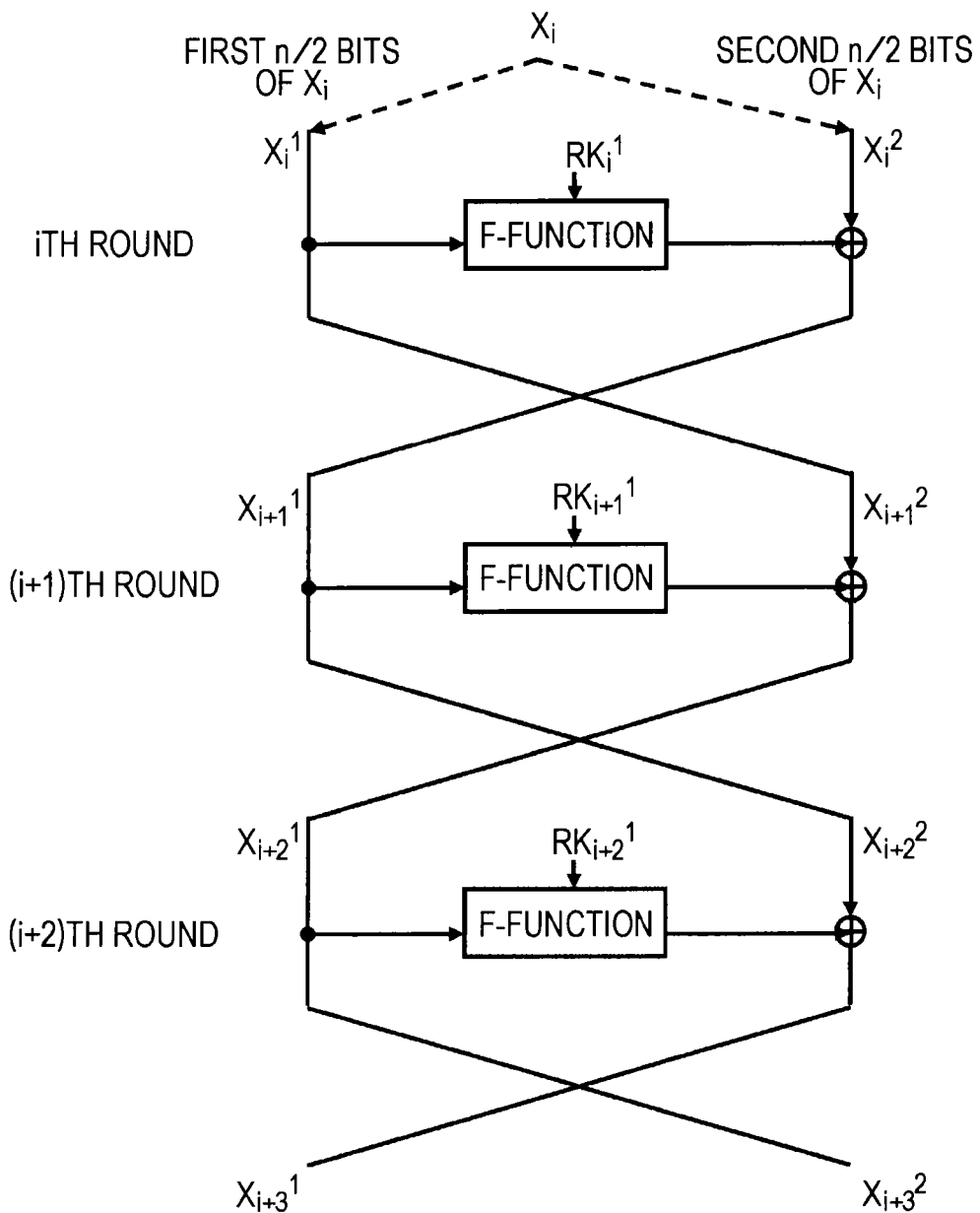
FIG. 12 is a diagram for explaining a diffusion state in block encryption with a Feistel structure.

Referring now to block encryption with the Feistel structures shown as specific examples in FIGS. 11 and 12, those definitions are described in detail. FIG. 11 shows an example structure of a round function of block encryption with a Feistel structure, and FIG. 12 shows a structure in which the round function is repeated three times.

As is seen from FIG. 12, n/2-bit data $X_{i+1}^1$, $X_{i+2}^1$, and $X_{i+3}^1$ on the left sides of the outputs of the ith, (i+1)th, and (i+2)th rounds (or on the left side of the (i+1)th, (i+2)th, and (i+3)th inputs), and n/2-bit data) $X_{i+1}^2$, $X_{i+2}^2$, and $X_{i+3}^2$ on the right sides of the outputs of the ith, (i+1)th, and (i+2)th rounds (or on the right side of the (i+1)th, (i+2)th, and (i+3)th inputs) can be each expressed as follows by using the ith round inputs $X_i^1$ and $X_i^2$, and round keys $RK_i^1$, $RK_i^2$, and $RK_i^3$.

$$X_i^1 +_1 = F(RK_i^1, X_i^1)(+)X_i^2$$

$$X_i^1 +_2 = F(RK_i^1 +_1, X_i^1 +_1)(+)X_i^2 +_1$$
$$= F(RK_i^1 +_1, F(RK_i^1, X_i^1)(+)X_i^2)(+)X_i^1$$

$$X_i^1 +_3 = F(RK_i^1 +_2, X_i^1 +_2)(+)X_i^2 +_2$$
$$= F(RK_i^1 +_2, F(RK_i^1 +_1, X_i^1 +_1)(+)X_i^2 +_1)(+)X_i^2 +_2$$
$$= F(RK_i^1 +_2, F(RK_i^1 +_1, F(RK_i^1, X_i^1)(+)X_i^2)(+)X_i^1)(+)$$
$$F(RK_i^1, X_i^1)(+)X_i$$

$$X_i^2 +_1 = X_i^1$$

$$X_i^2 +_2 = X_i^1 +_1$$
$$= F(RK_i^1, X_i^1)(+)X_i^2$$

$$X_i^2 +_3 = X_i^1 +_2$$
$$= F(RK_i^1 +_1, X_i^1 +_1)(+)X_i^2 +_1$$
$$= F(RK_i^1 +_1, F(RK_i^1, X_i^1)(+)X_i^2)(+)X_i^1$$

In the above expression, F(K, X) represents the data obtained by transforming data X with an F-function using a parameter K, and (+) represents the exclusive OR of each bit.

Although expressed with the input data $X_i^1$ and $X_i^2$, $X_{i+1}^1$ is not in the diffusion state, because $X_i^2$ has not passed through an F-function. $X_{i+2}^1$ is expressed with the input data $X_i^1$ and $X_i^2$, and the input data is given as inputs to an F-function. Accordingly, it can be said that $X_{i+2}^1$ is in the diffusion state. Likewise, it can be said that $X_{i+3}^1$ is in the diffusion state.

Being expressed only with $X_i^1$, $X_{i+1}^2$ is not in the diffusion state. $X_{i+2}^2$ is not in the diffusion state, since $X_i^2$ has not passed through an F-function. $X_{i+3}^2$ is in the diffusion state, satisfying the conditions.

From the above results, the (i+3)th round outputs $X_{i+3}^1$ and $X_{i+3}^2$ are both in the diffusion state, and it can be said that the full diffusion state is achieved. As can be seen from the above, the number of full diffusion rounds of the block encryption with the Feistel structures shown in FIGS. 11 and 12 is 3.

If the full diffusion state is not achieved, a certain output bit is not affected by a certain input bit and a nonlinear function (an F-function), and therefore, is probably vulnerable to various kinds of attacks.

Particularly, diffusion properties are used as an indication in directly estimating security against attacks such as impossible differential attacks and saturation attacks. It can be said that better diffusion properties are achieved with a smaller number of full diffusion rounds.

Figure 13:
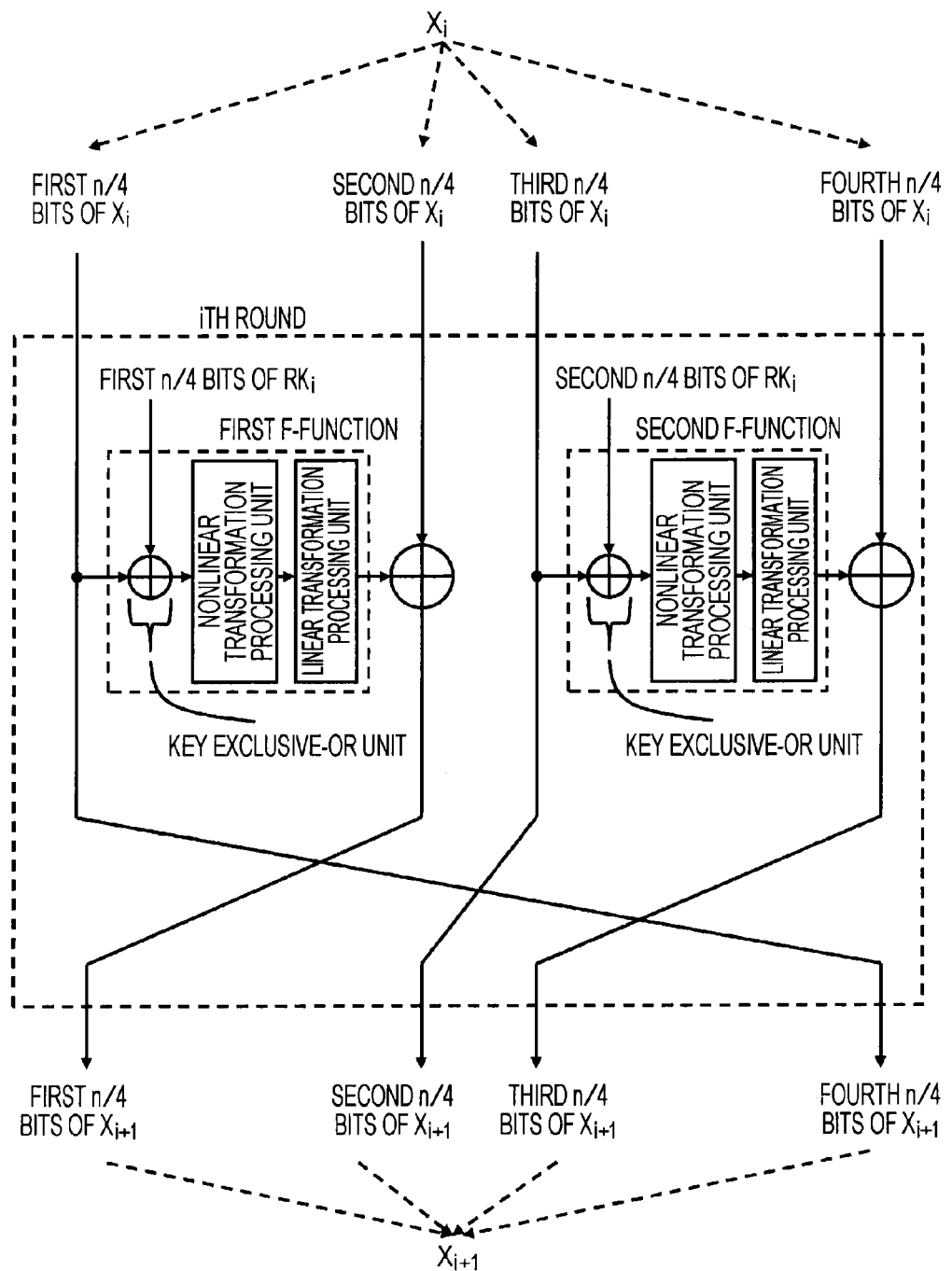
FIG. 13 is a diagram for explaining a diffusion state in block encryption with a 4-line generalized Feistel structure using two F-functions in one stage.
Figure 14:
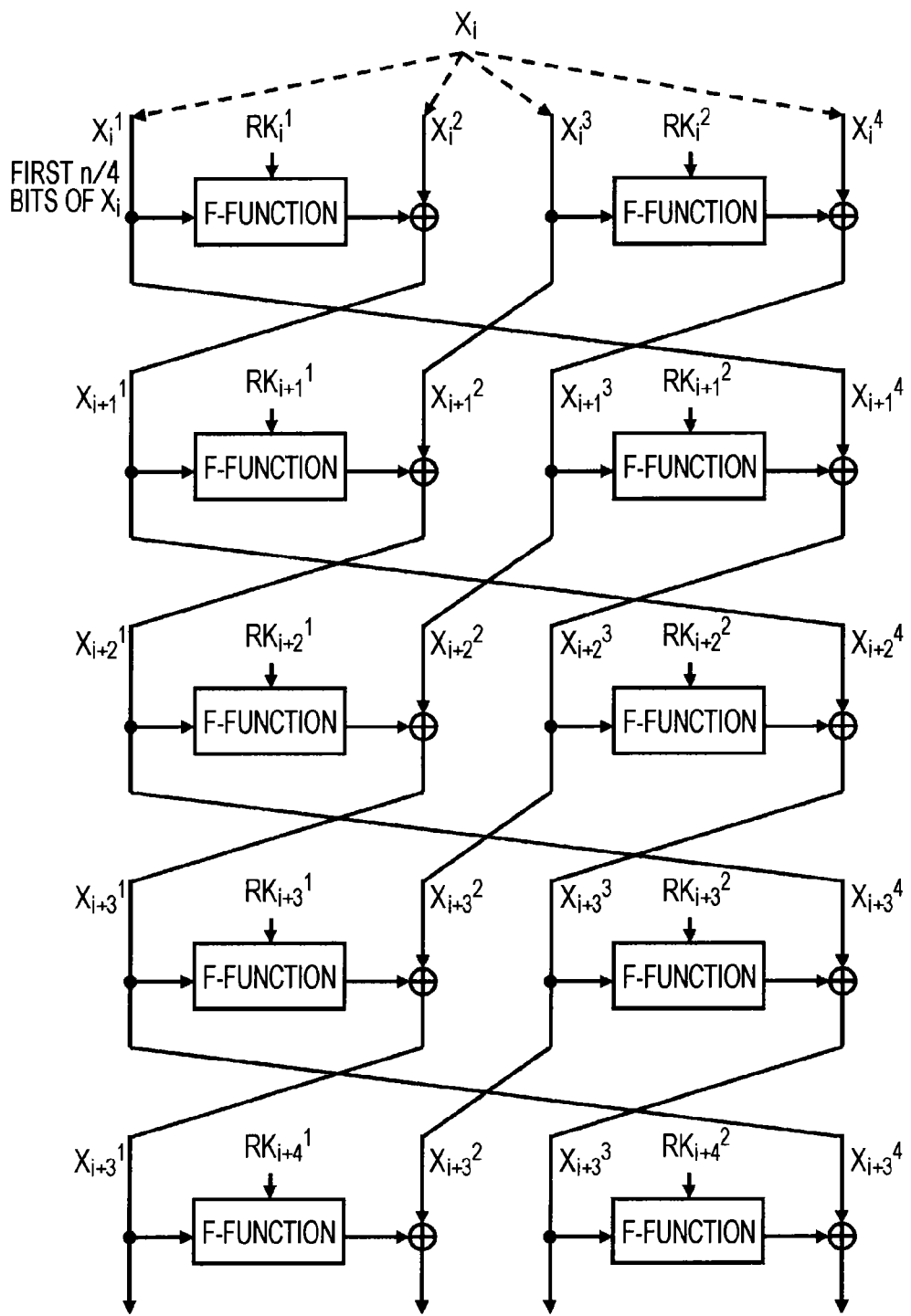
FIG. 14 is a diagram for explaining a diffusion state in block encryption with a 4-line generalized Feistel structure using two F-functions in one stage.

FIGS. 13 and 14 show other examples. These drawings show 4-line generalized Feistel structures using two F-functions in one stage.

Figure 15:
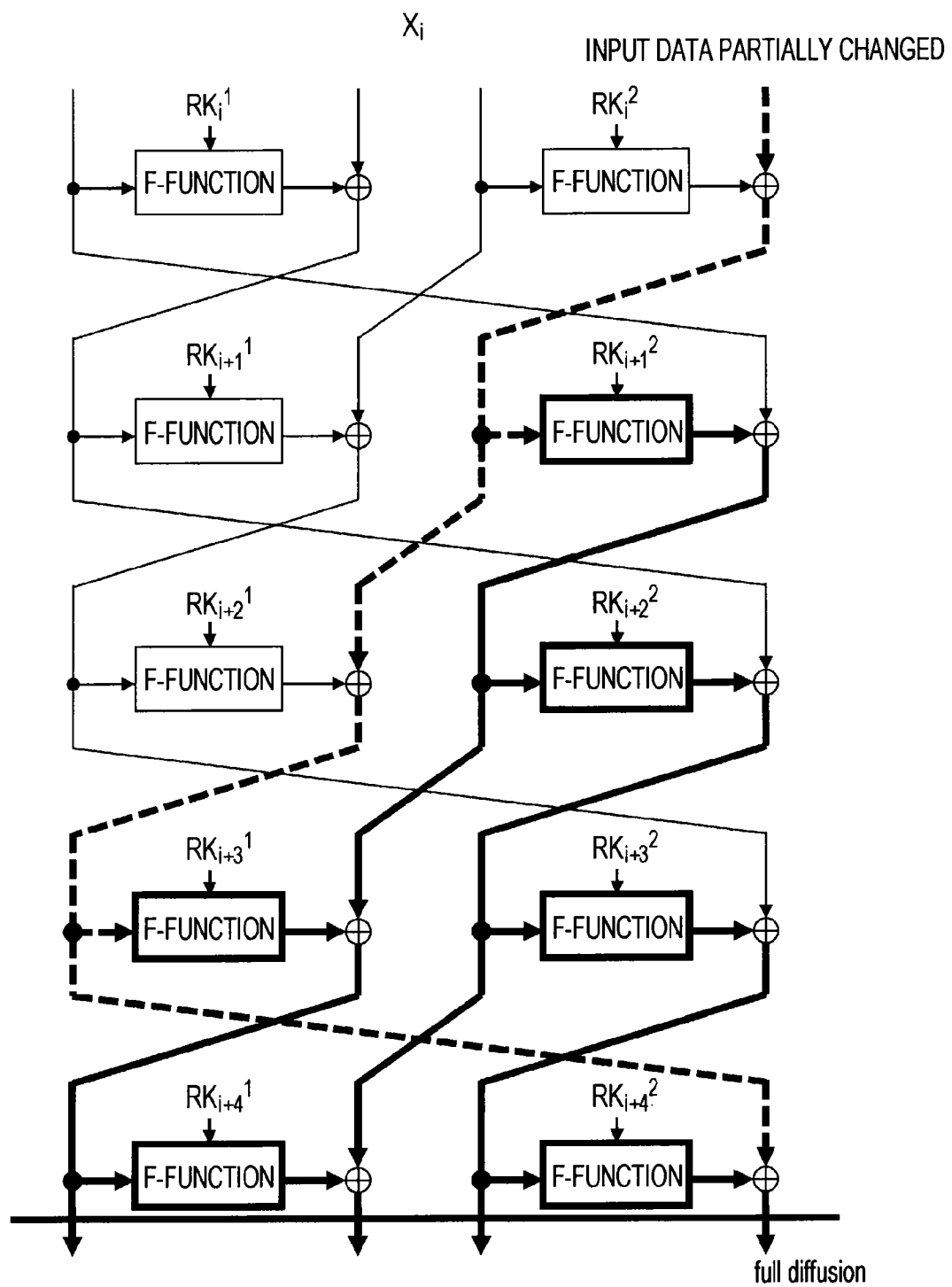
FIG. 15 is a diagram for explaining a diffusion state in block encryption with a 4-line generalized Feistel structure using two F-functions in one stage.

FIG. 15 shows repercussions of a change in a case where n-bit input $X_i$ of the ith round is divided into four n/4-bit data, and the change is made only to part of the fourth n/4-bit data (represented by $X_i^4$)

In the drawing, the thick dashed line indicates data being transmitted in a state where the change in the input has not passed through an F-function, and the thick lines indicate data being transmitted in a state where the change in the input has passed through an F-function at least once. Also, it is assumed that each output bit of the F-functions is affected by all the input bits of the F-functions. As described above, the number of full diffusion rounds can be determined by calculating the number of rounds required before all the output bits are affected by a virtual change in various input bits. In practice, it is known that the number of full diffusion rounds in a generalized Feistel structure using two F-functions in one stage is 5, with d being 4.

(2-2) Conventional Example Structure Taking Diffusion Properties into Account

Next, a processing structure taking into account the diffusion properties suggested so far is briefly described.

It is widely known that a d-line generalized Feistel structure using d/2 Functions in one stage do not have very good diffusion properties, and the number of full diffusion rounds is d+1. This is disclosed in Non-Patent Document 3 (T. Suzaki and K. Minematsu, "Improving the Generalized Feistel", FSE 2010, LNCS6147, pp. 19-39, 2010), for example.

Figure 16:
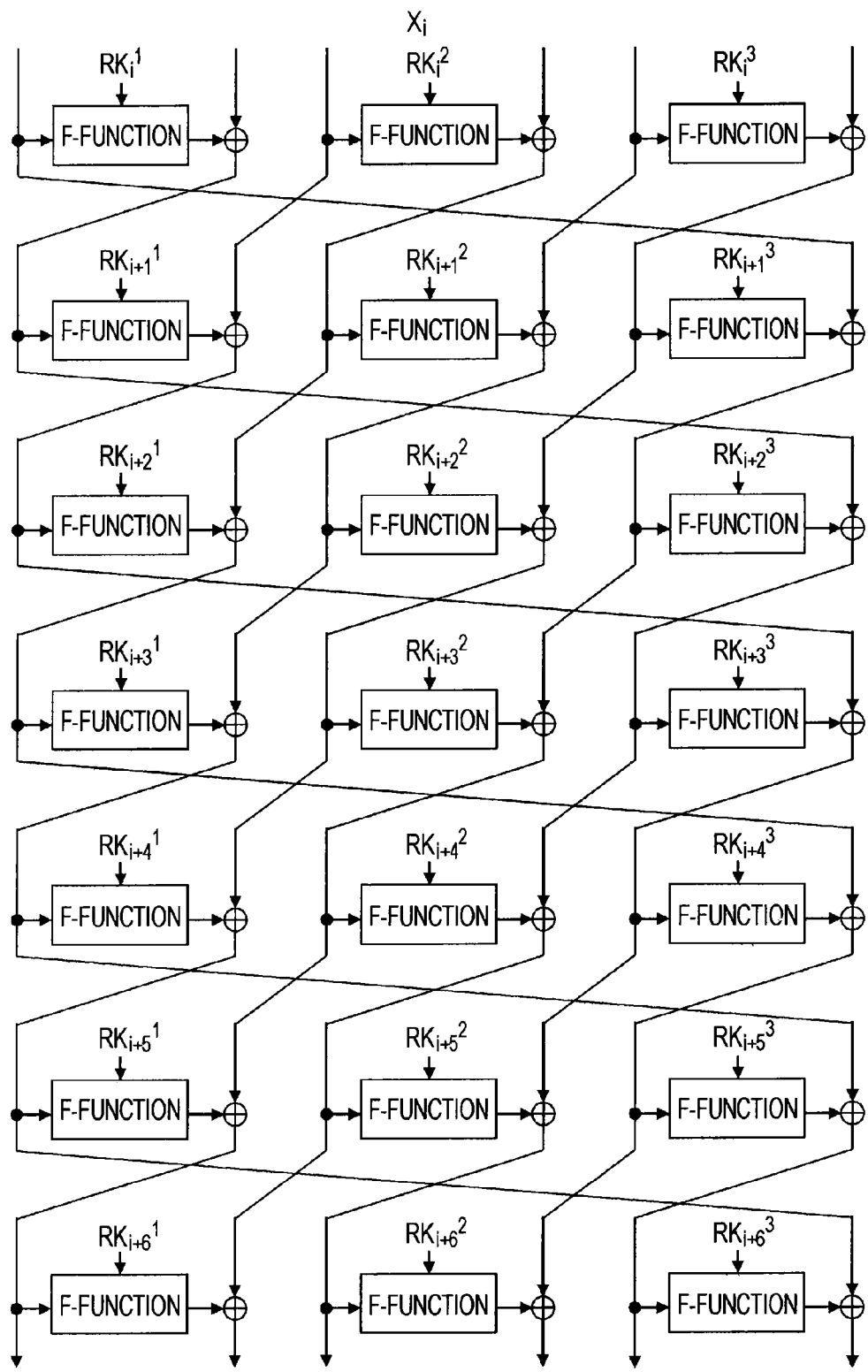
FIG. 16 is a diagram for explaining a conventional generalized Feistel structure in a case where d is 6.
Figure 17:
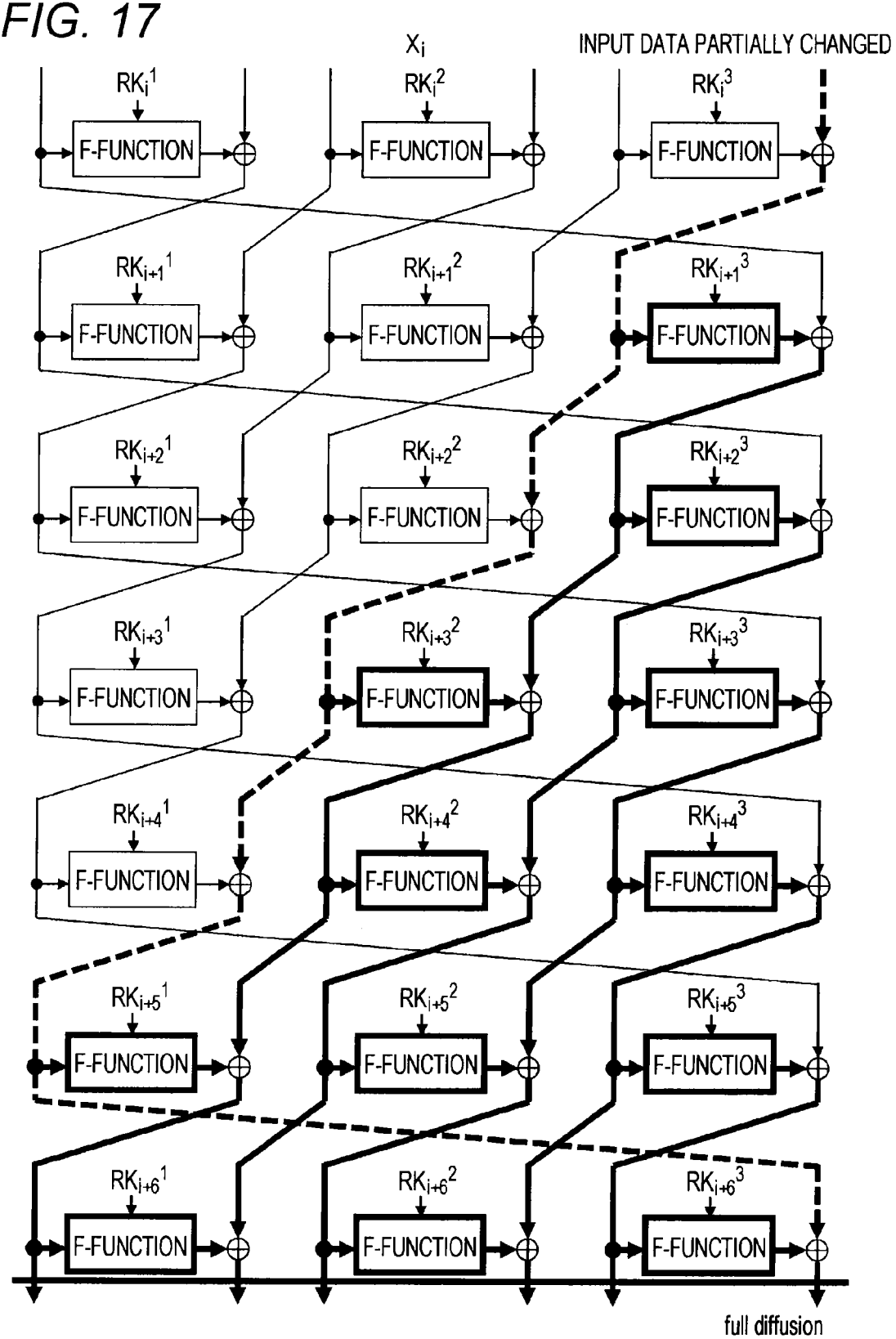
FIG. 17 is a diagram showing an example of paths with which a full diffusion state is achieved in a conventional generalized Feistel structure in a case where d is 6.

FIG. 16 shows a conventional generalized Feistel structure where d is 6, and FIG. 17 shows an example of paths with which the structure is in the full diffusion state.

To solve the above problem, Non-Patent Document 3 suggests a structuring method that can make the number of full diffusion rounds smaller than that in a conventional structure in a case where the division number d is equal to or greater than 6, by changing inter-round lines for each set of n/d-bit data formed by dividing data into d sets.

Figure 18:
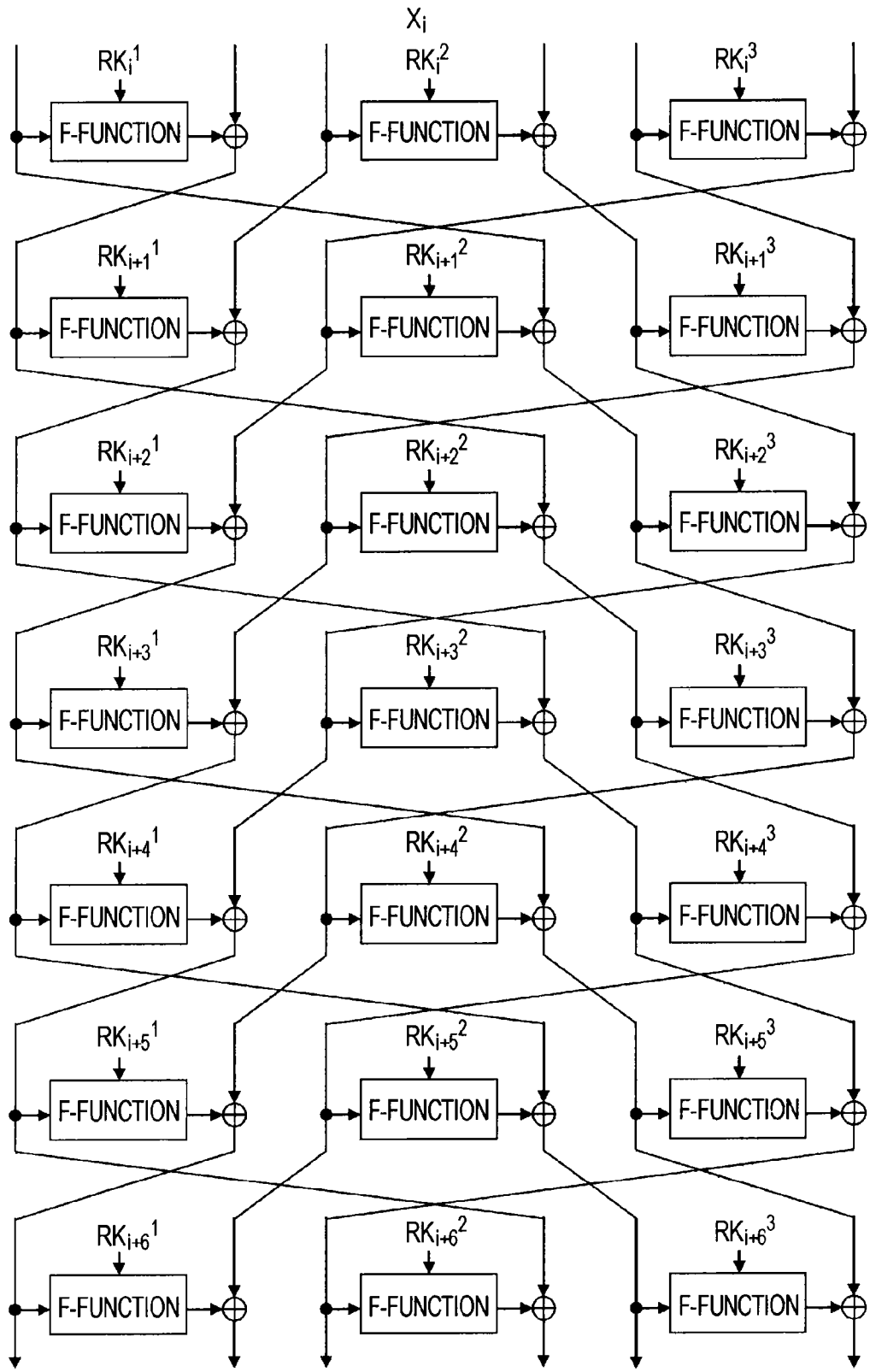
FIG. 18 is a diagram for explaining an example structure in which the number of full diffusion rounds is made smaller than that with a conventional structure by changing inter-round lines in a case where the division number d is 6 or greater.
Figure 19:
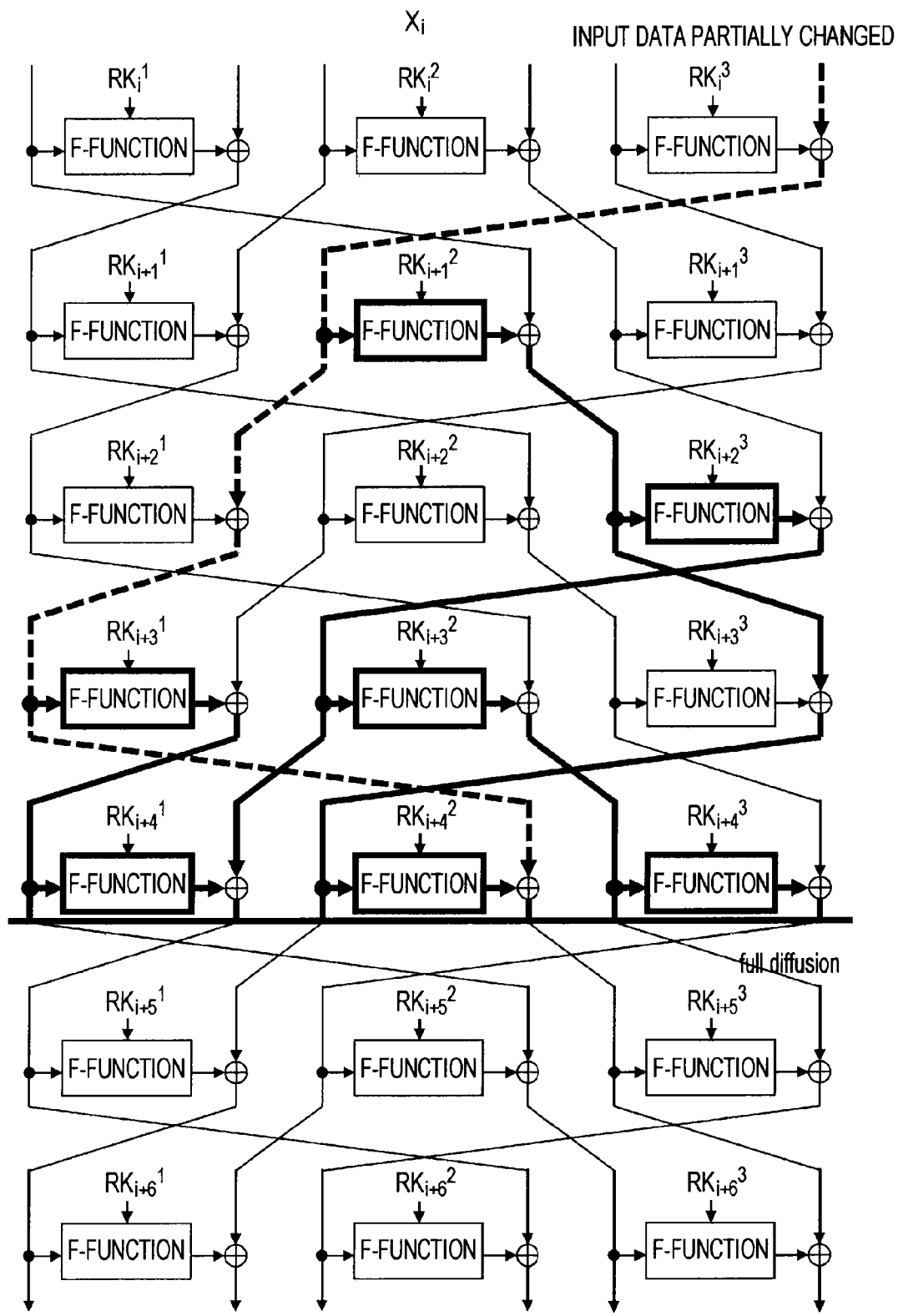
FIG. 19 is a diagram showing an example of paths with which a full diffusion state is achieved in a structure where the number of full diffusion rounds is made smaller than that with a conventional structure by changing inter-round lines when the division number d is 6 or greater.

FIG. 18 illustrates this structuring method in a case where d is 6, and FIG. 19 shows an example of paths with which the structure is in the full diffusion state.

The numbers of full diffusion rounds achieved in this structure are 5, 6, 7, 8, 8, and 8 in cases where d is 6, 8, 10, 12, 14, and 16, respectively. As can be seen from that, better diffusion properties than those with (d+1) rounds of a conventional structure are achieved. However, this structure is not effective in a case where d is 4, and the number of full diffusion rounds cannot be made smaller than that.

Non-Patent Document 4 (Suzaki, Tsunoo, Kubo, and Kawabata, "Proposal of a structure having diffusion layer incorporated into a generalized Feistel structure", SCIS2008, 2008) suggests a structure that makes diffusion properties better than those of a conventional structure by performing a linear operation on each set of n/d-bit data formed by dividing data into d sets. In this structure, however, a means of implementation for linear operations is required, resulting in higher implementation costs.

[3. Example Structure With Improved Diffusion Properties According to this Disclosure]

In view of the above described problems, this disclosure suggests a structuring method for achieving better diffusion properties in a generalized Feistel structure without an increase in implementation costs.

Figure 20:
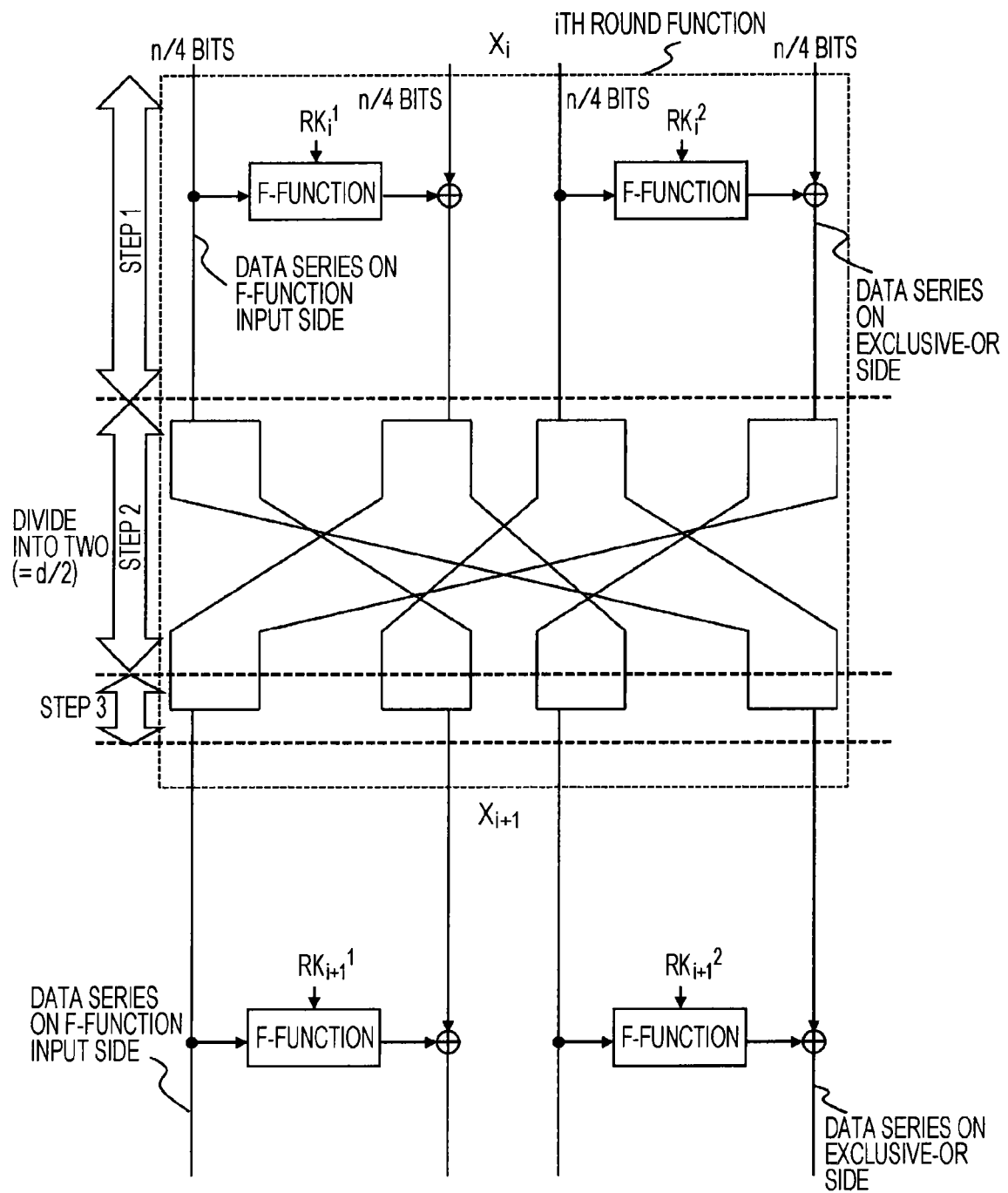
FIG. 20 is a diagram for explaining a cryptographic processing structure as an embodiment of this disclosure.

In a d-line generalized Feistel structure of this constitution, n-bit input data is divided into d sets of n/d-bit data, and F-function processing and an exclusive OR operation are performed on each of the d sets, as in a conventional structure (step 1 in FIG. 20).

The data series that are input to the F-functions at this point are referred to as the F-function input-side data series, and the data series that are subjected to exclusive OR are referred to as the XOR-side data series.

After that, each set of n/d-bit data transferred in each corresponding series (each corresponding line) is further redivided into d/2 sets (the division at this point may not be equal division).

The data redivided into d/2 sets in each series (each line) is distributed in accordance with the following rules (step 2 in FIG. 20).

(1) The F-function input-side data series are invariably distributed to the XOR-side data series of the next round function.

(2) The XOR-side data series are invariably distributed to the F-function input-side data series of the next round function.

(3) Each one of data series divided into d/2 sets is distributed to d/2 data series of the next round function without overlaps.

After the above described distribution, each set of data divided into d/2 sets is integrated into one set of data (step 3 in FIG. 20).

The above is repeated a required number of times.

FIG. 20 shows an example structure in which the division number d is 4.

In this structure, the number of full diffusion rounds can be 4, regardless of the number d of data divisions.

The reasons that this method satisfies the condition that the number of rounds required to realize full diffusion is 4, regardless of the division numbered, are as follows.

(1) Any change in input data in the ith round affects at least one F-function in the (i+1)th round.

(2) At least one of the XOR-side data series in the (i+1)th round is in the diffusion state.

(3) The data in the diffusion state among the XOR-side data series in the (i+1)th round is further divided into d/2 sets, and affects all the d/2 F-functions in the (i+2)th round. Accordingly, all the XOR-side data series in the (i+2)th round are in the diffusion state.

(4) As the XOR-side data series in the (i+2)th round are the F-function input-side data series in the (i+3)th round, all the F-function input-side data series in the (i+3)th round are in the diffusion state. As the data in the diffusion state is input to all the F-functions in the (i+3)th round, all the XOR-side data series subjected to exclusive OR with the outputs are in the diffusion state.

Figure 21:
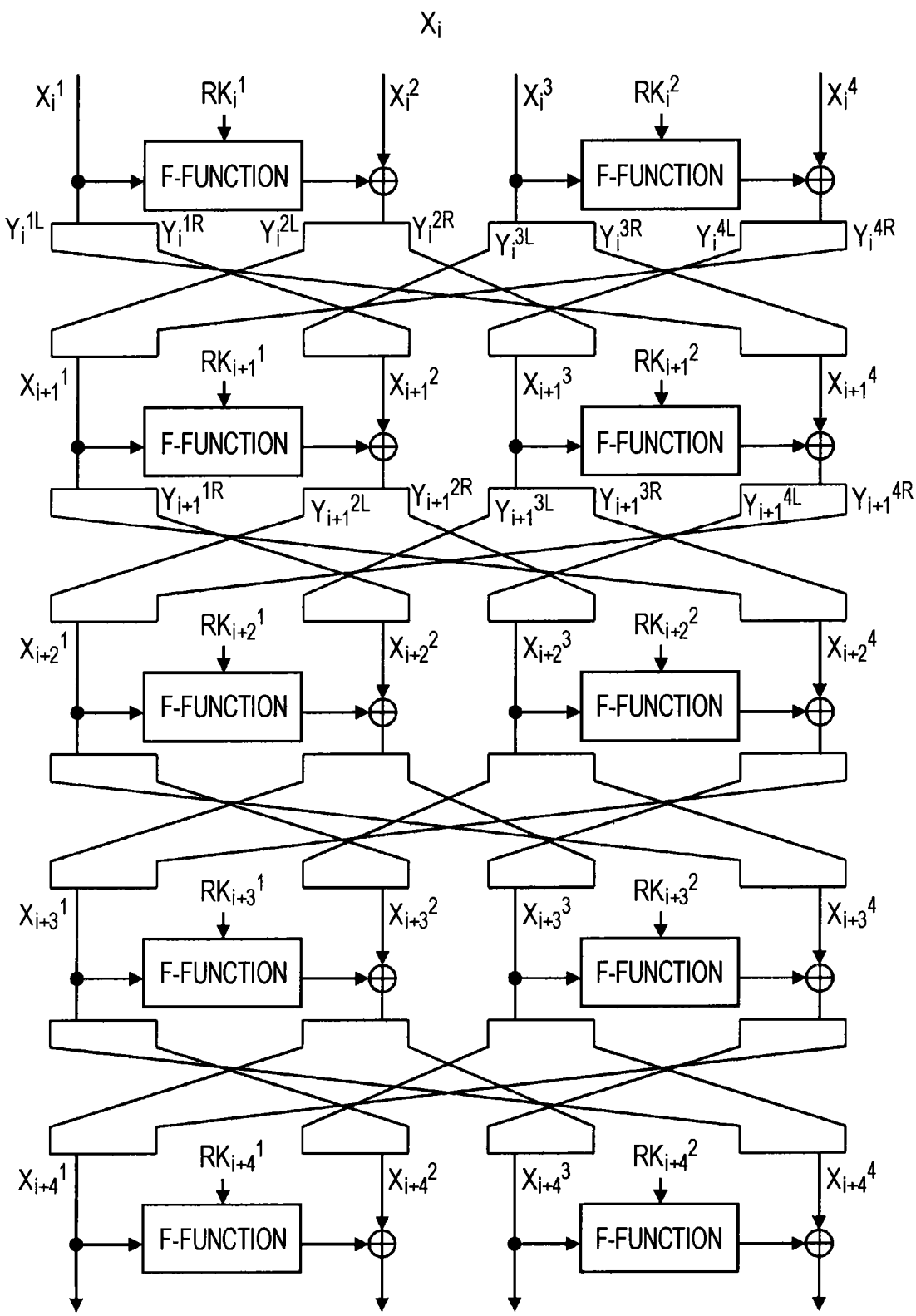
FIG. 21 is a diagram for explaining an example case where d is 4 as an embodiment of this disclosure.
Figure 22:
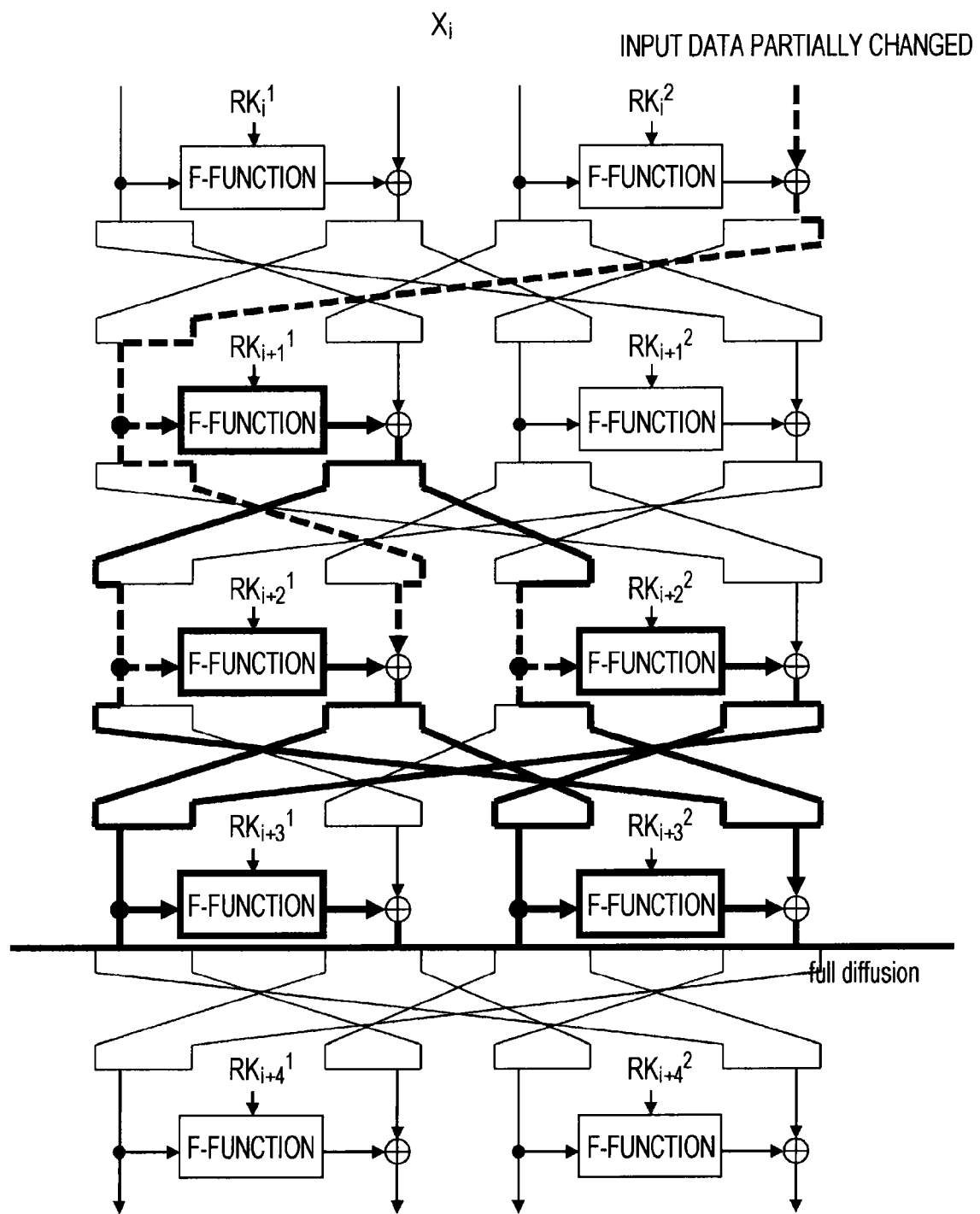
FIG. 22 shows an example of paths with which the full diffusion state is achieved by this method in a case where d is 4.

For the above reasons, the full diffusion state is invariably achieved after the (i+3)th round or in four rounds. Referring now to FIGS. 21 and 22, specific examples are described.

FIG. 21 illustrates an example of this method in a case where d is 4. Since d is 4, each set of n/4-bit data obtained by dividing input data into four sets is further divided by 2 (into d/2 sets).

The two sets of divisional data as the ith round outputs corresponding to the ith round input $X_i^1$ are represented by $Y_i^{1L}$ and $Y_i^{1R}$, and likewise, the respective sets of divisional data corresponding to $X_i^2$, $X_i^3$, and $X_i^4$ are $Y_i^{2L}$, $Y_i^{2R}$, $Y_i^{3L}$, $Y_i^{4L}$, and $Y_i^{4R}$. The size of those divisional data is n/8 bits in the case of equal division.

However, the operation to redivide the data in each line is not necessarily equal division. In a case where the number of input bits is 256, and the division number d is 4, for example, the number of bits in each line is n/d=256/4=64 bits, and the data obtained by redivision is 32-bit data in the case of equal division. As a result, two sets of 32-bit data are generated.

However, equal division is not obligatory, and the redivided data generated from the 64-bit data may be any combination such as a combination of 20-bit data and 44-bit data.

However, at the time of inputting to the next round calculating unit, four sets of 64-bit data according to the division number d=4 are restructured by combining the 20-bit data and the 44-bit data separated into different lines, and are input to respective divisional lines.

That is, in a structure having the division number d, equal division is not obligatory, but the forms (the division ratios) in redivision in the respective d lines need to be identical in the redividing operation in the respective d lines.

If a change is made somewhere in the ith-round input data, the influence is input to at least one of the two F-functions in the (i+1)th round. In a case where a change is made only in the LSB1 bit of $X_i^4$, for example, the influence is transmitted only to $Y_i^{4R}$, and the influence of the transmission is transmitted to $X_{i+1}^1$. As a result, $X_{i+1}^1$ is input to the left F-function in the (i+1)th round (FIG. 22). The same applies in cases where a change is made in the position of some other input bit, and transmission of the influence to at least one F-function is guaranteed.

Since at least one F-function in the (i+1)th round is affected by the change in the input, the data subjected to exclusive OR with the output is in the diffusion state. That is, the diffusion state of either the combinations ($Y_{i+1}^{2L}$, $Y_{i+1}^{2R}$) or ($Y_{i+1}^{4L}$, $Y_{i+1}^{4R}$) is guaranteed. FIG. 22 illustrates an example case where the combination ($Y_{i+1}^{2L}$, $Y_{i+1}^{2R}$) is in the diffusion state.

According to the rules 2 and 3 of this method, the outputs $Y_{i+1}^{2L}$ and $Y_{i+1}^{2R}$ of the (i+1)th round are input to the two (=d/2) F-functions in the (i+2)th round. Likewise, $Y_{i+1}^{4L}$ and $Y_{i+1}^{4R}$ are also input to all the F-functions in the (i+2)th round. That is, no matter which one of the combinations ($Y_{i+1}^{2L}$, $Y_{i+1}^{2R}$) and ($Y_{i+1}^{4L}$, $Y_{i+1}^{4R}$) is in the diffusion state in the (i+1)th round, data in the diffusion state is input to all the F-functions in the (i+2)th round. Accordingly, all the data $Y_{i+2}^{2L}$, $Y_{i+2}^{2R}$, $Y_{i+2}^{4L}$ and $Y_{i+2}^{4R}$ subjected to exclusive OR with the outputs of those F-functions are in the diffusion state, and are supplied to $X_{i+3}^1$ and $X_{i+3}^3$ according to the rules 2 and 3. Thus, it is apparent that $X_{i+3}^1$ and $X_{i+3}^3$ are also in the diffusion state.

$X_{i+3}^1$ and $X_{i+3}^3$ in the diffusion state are input to the respective F-functions in the (i+3)th round, and accordingly, and $Y_{i+2}^{2L}$, $Y_{i+2}^{2R}$, $Y_{i+2}^{4L}$, and $Y_{i+2}^{4R}$, which are the results of exclusive OR with the outputs, or $X_{i+4}^1$ and $X_{i+4}^3$, are also in the diffusion state.

From the above results, this method can satisfy the condition that the number of full diffusion rounds is 4. FIG. 22 shows an example of paths with which the full diffusion state is achieved by this method in a case where d is 4. In this example structure, the full diffusion state is realized in four rounds, which is less than five rounds as the number of full diffusion rounds in a conventional structure. FIG. 22 shows an example of the paths that realize full diffusion in the case where d is 4 in this structure.

Figure 23:
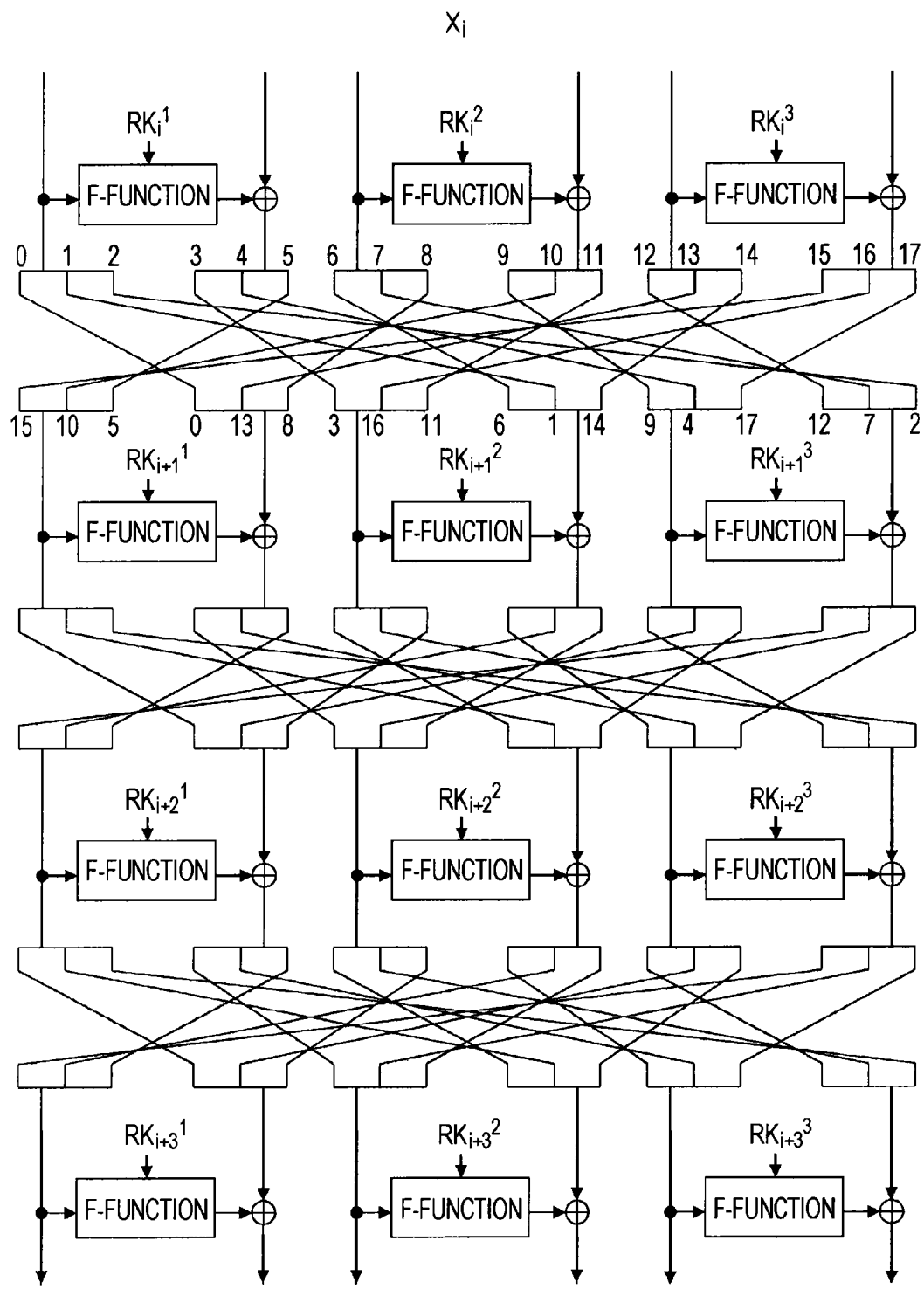
FIG. 23 is a diagram for explaining an example case where d is 6 as an embodiment of this disclosure.
Figure 24:
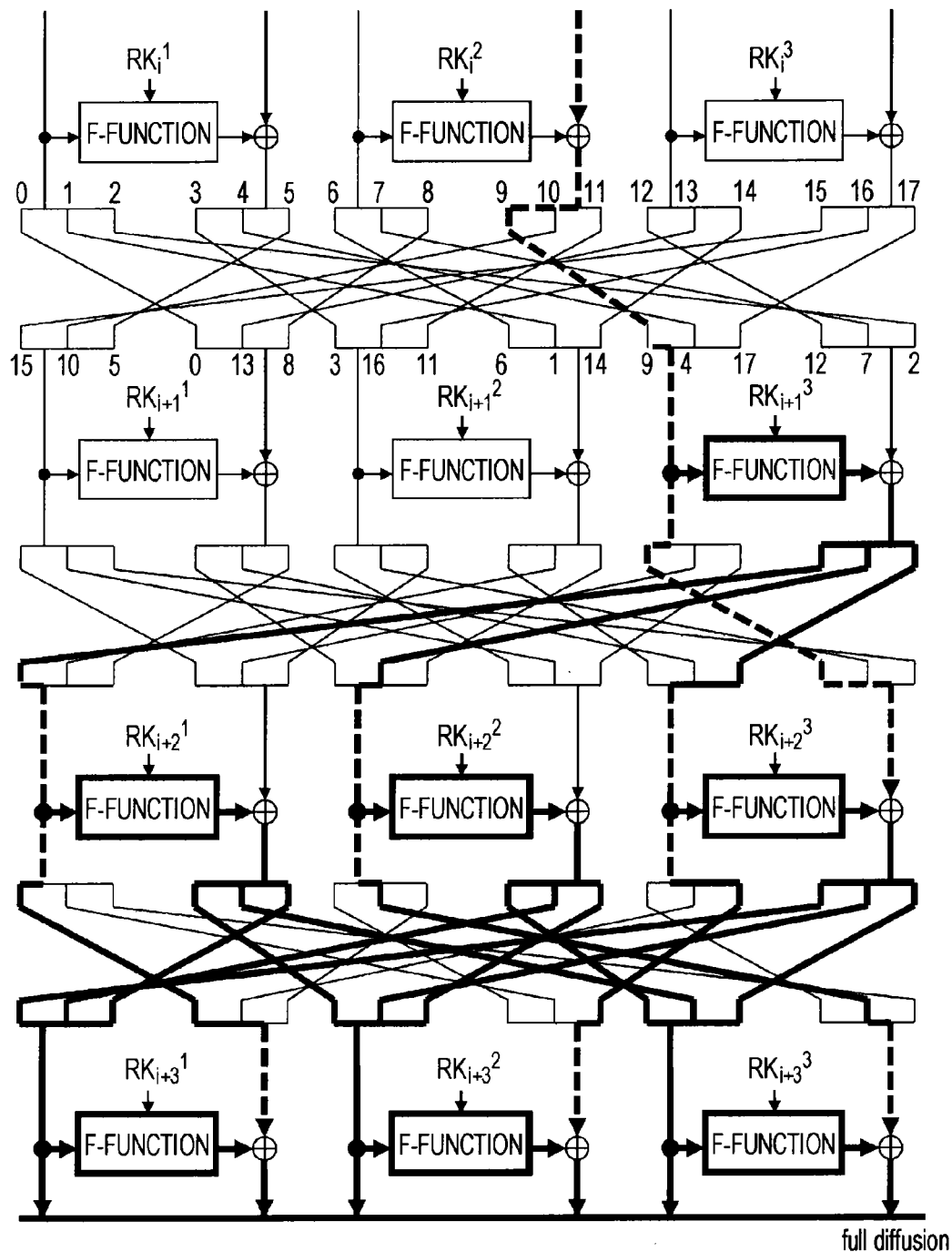
FIG. 24 shows an example of paths with which the full diffusion state is achieved by this method in a case where d is 6.

FIG. 23 shows an example structure in which d is 6, and FIG. 24 shows an example of paths with which the full diffusion state is achieved in the example structure (the numbers shown before and after the inter-round permutation represent the indexes indicating which positions the respective sets of data are located after the permutation).

As is apparent from the above, structures according to this disclosure achieve much better diffusion properties than those with conventional structures. Also, as the structures according to this disclosure do not involve linear operations, implementation costs do not increase.

As described above, in this embodiment, a cryptographic processing unit divides and inputs the constituent bits of data to be subjected to data processing to lines, and repeatedly performs a data converting operation using round functions on the data of the respective lines. The cryptographic processing unit repeatedly performs a round calculation involving data redivision and restructuring as described below.

Specifically, the cryptographic processing unit inputs n/d-bit data formed by dividing n-bit data as the input data by the division number d to the respective lines, and repeatedly performs the round calculation that is a calculation including the data converting operation using round functions.

In the operation to repeatedly performing the round calculation, the n/d-bit data of each line having the output data of the round calculations is redivided into d/2 sets, and the redivided data is recombined, to restructure d sets of n/d-bit data that differ from the output data of the round calculations of the previous stage. The restructured n/d-bit data is set as the input data for the round calculations of the next stage.

Specifically, a redividing and restructuring operation that satisfies the following conditions is performed.

(1) The F-function input-side data series are invariably distributed to the XOR-side data series of the next round function.

(2) The XOR-side data series are invariably distributed to the F-function input-side data series of the next round function.

(3) Each one of data series divided into d/2 sets is distributed to d/2 data series of the next round function without overlaps.

An operation that satisfies such conditions is performed.

For example, the cryptographic processing unit performs an operation in which d×(n/d) sets of redivided data are generated by redividing the n/d-bit data of each of the d lines having the output data of the round calculations into d/2 sets of data, d/2 sets of redivided data selected from different lines among the d lines corresponding to the division number d are recombined to restructure d sets of n/d-bit data that are different from the output data of the round calculations of the previous stage, and the restructured data is set as input data for the round calculations of the next stage.

As such an operation is performed, the minimum number of rounds (repetitions) required to achieve the above described full diffusion state, or the "number of full diffusion rounds", can be set at 4.

As mentioned above, in a case where an output bit is written as a relational expression of input bits, and the relational expression satisfies the conditions shown below, the state of the output bit is defined as the "diffusion state".

(Condition 1) All the input bits are included in the relational expression.

(Condition 2) All the input bits have passed through a round function (an F-function) at least once.

Further, a state where all the output bits are in the diffusion state is the "full diffusion state".

In each of the example structures described as an embodiment of this disclosure, each of the sets of n/d-bit data that are transferred through the respective lines for transferring data formed by dividing n-bit input data by d, or (d/2) lines of F-function input-side data series lines and (d/2) lines of XOR-side series lines, is divided into d/2 sets.

This is the setting for realizing the minimum number of rounds, which is 4, to achieve full diffusion.

Figure 25:
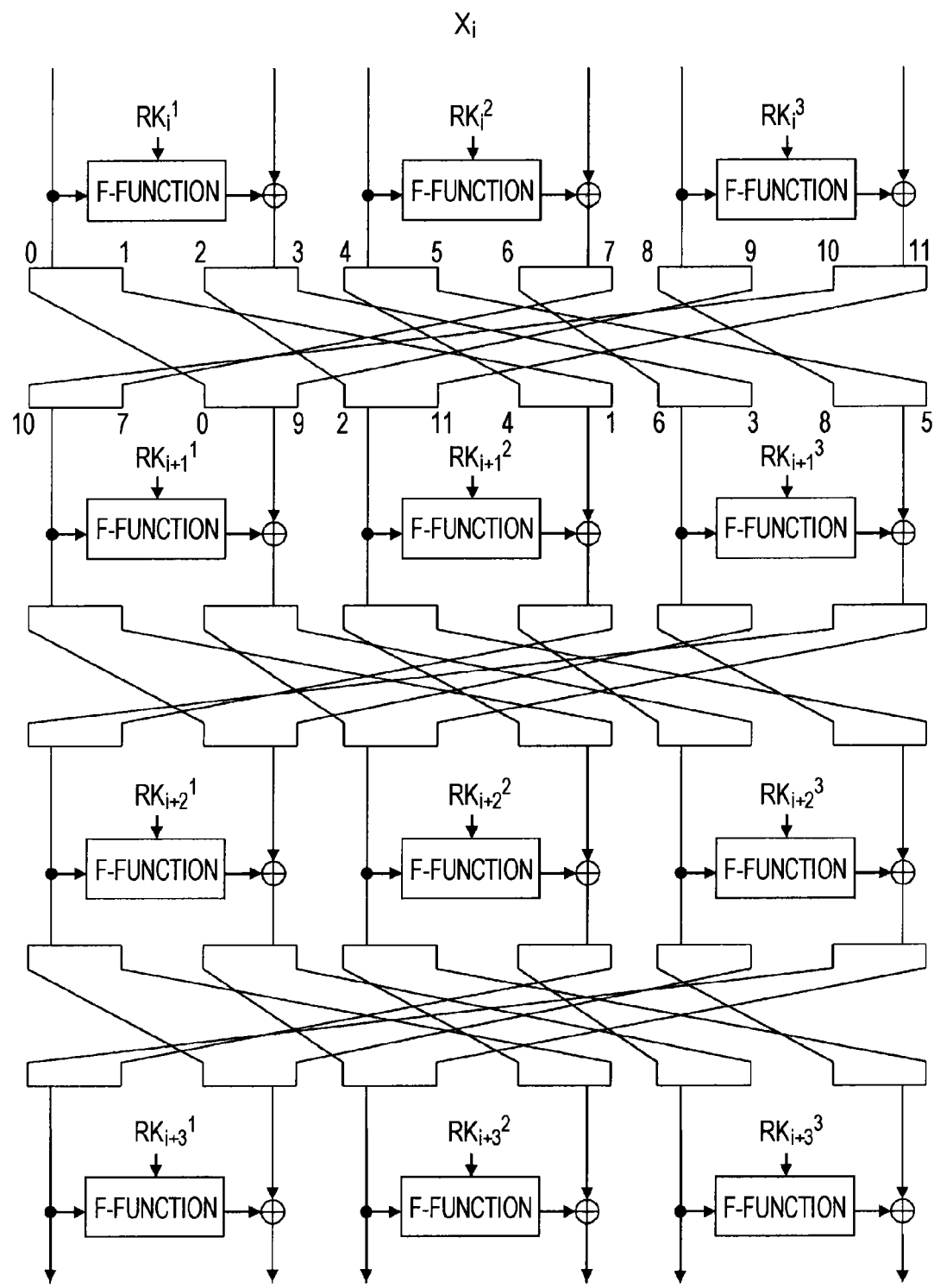
FIG. 25 is a diagram showing an example structure in which each set of n/d-bit data is divided by 2 in a case where d is 6.

FIG. 25 shows an example structure in which the division number d is 6, and n/d-bit data (n/6-bit data) to be transferred through respective lines is divided by 2, or is divided into sets of d/12-bit data that are then transferred between rounds.

However, the number of divisions to realize full diffusion is not limited to (d/2) in each line, unless the number of rounds is limited to 4.

Figure 26:
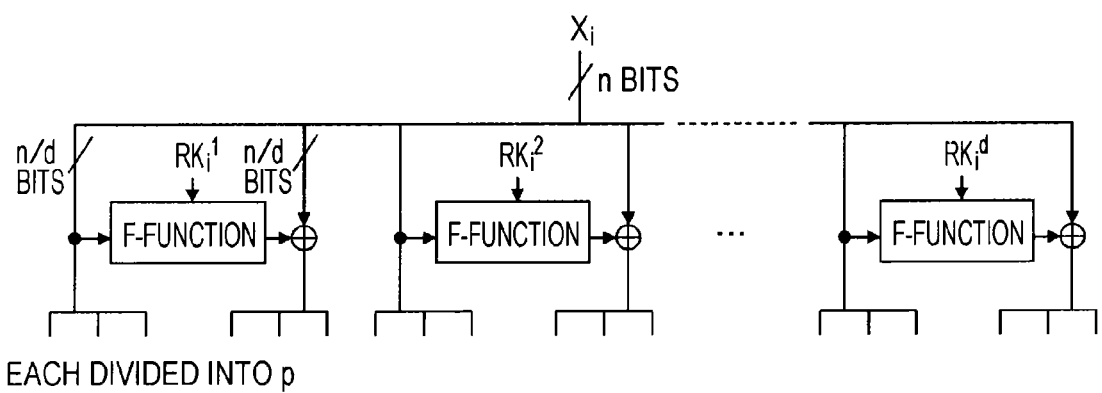
FIG. 26 is a diagram showing part of the relationship among the division number d of n-bit input data, the division number p of each set of n/d-bit data, and the number of full diffusion rounds.

FIG. 26 is a table showing the correspondence relationship among the number d of divisions of n-bit input bits, the number p of divisions in each line, and the number of rounds required to realize full diffusion.

If data series are appropriately distributed, the number of full diffusion rounds can be calculated according to the equation shown below.

$$\text{The number of rounds} = 3 + \lceil \log_p(d/2) \rceil$$

Here, [x] is the smallest integer, which is equal to or greater than x.

Figure 27:
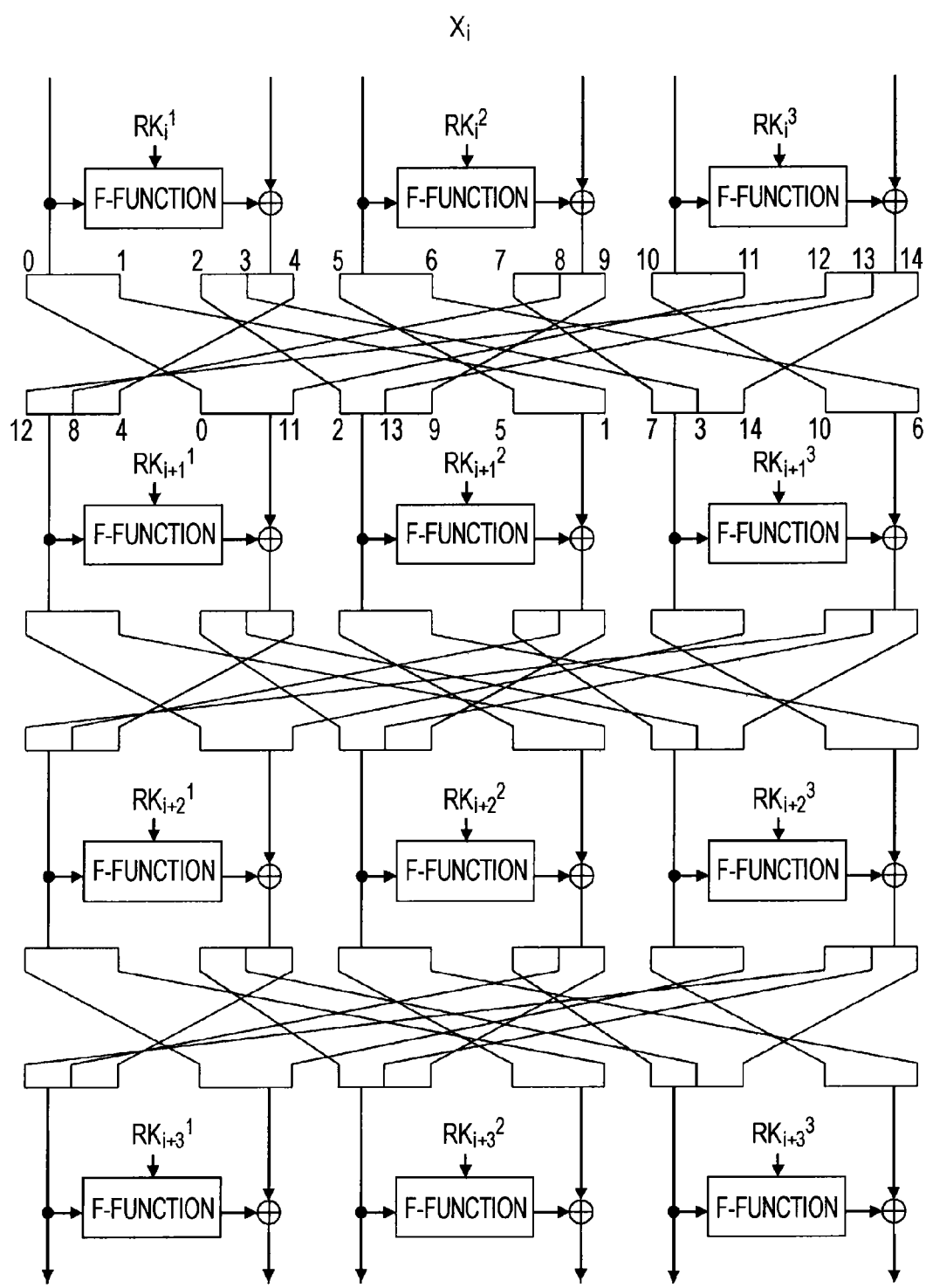
FIG. 27 is a diagram showing an example structure in which F-function input-side data series and XOR-side data series are divided in different manners from each other.

FIG. 27 shows a structure as an extended example in which the F-function input-side data series and the XOR-side data series are divided in different manners from each other.

The structure shown in FIG. 27 is an example in which the division number d is 6, each of the three (=d/2) F-function input-side data series lines is divided by 2, and each of the three (=d/2) XOR-side series lines is divided by 3.

The number of full diffusion rounds can also be 4 in this structure, if the data series are appropriately distributed.

Figure 28:
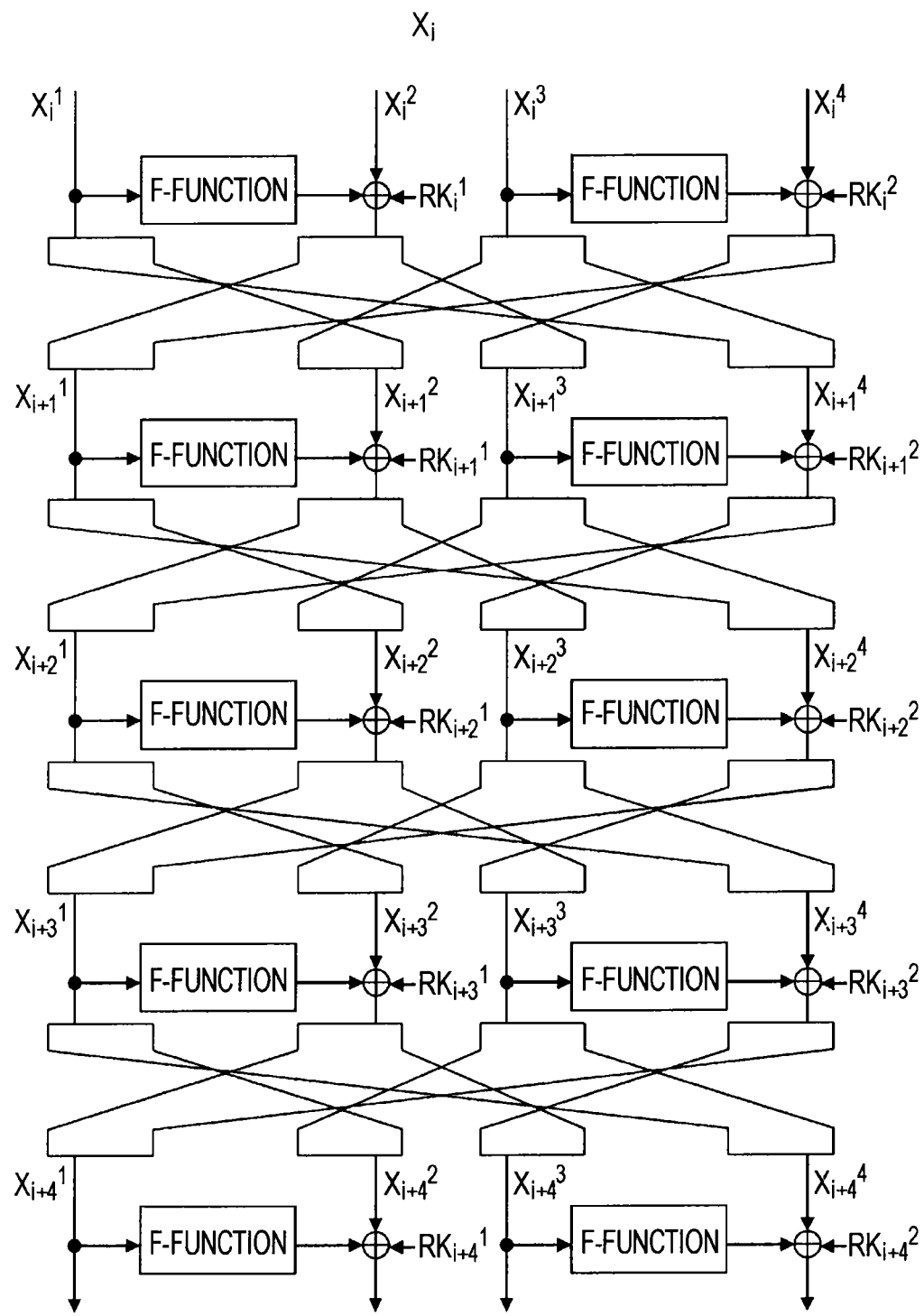
FIG. 28 is a diagram showing an example structure that is the same as the example structure shown in FIG. 21, except for the insertion positions of enlarged keys.

The effects of this method can be achieved, regardless of the insertion positions of enlarged keys (round keys). FIG. 28 shows an example structure that is the same as the example structure shown in FIG. 21, except for the insertion positions of enlarged keys (round keys).

In FIG. 21, enlarged keys (round keys) are inserted to the respective F-functions.

In the structure shown in FIG. 28, on the other hand, enlarged keys (round keys) are inserted to the portions that perform exclusive OR operations on F-function outputs and XOR-side data series.

In such a structure, the number of full diffusion rounds can also be reduced with a transfer mechanism involving the above described inter-round data redividing operation.

[4. Example Structure Having More Efficient Data Distribution]

In the above described chapter [3. Example Structure With Improved Diffusion Properties According to This Disclosure], a structuring method for achieving better diffusion properties in a generalized Feistel structure without an increase in implementation costs has been described.

Specifically, in a structure in which n/d-bit data obtained by dividing n-bit data as input data by a division number d is input to each line, and an operation as a round calculation including a data converting operation using round functions is repeatedly performed, the n/d-bit data in each of the lines having the output data of the round calculations is further redivided into d/2 sets, and the redivided data is combined to restructure d sets of n/d-bit data that differ from the output data of the round calculations of the previous stage. The d sets of n/d-bit data are used as input data for the round calculations of the next stage.

In the following, a more efficient technique for the data distribution described in the above embodiment is described.

Referring first to FIG. 29, a typical example structure of this embodiment is described.

In this structure, n-bit input data is divided into d sets of n/d-bit data according to a division number d in a d-line generalized Feistel structure, and an operation as a round calculation including a data converting operation using round functions is repeatedly performed, as in the embodiment described in the above chapter [3].

After the ith round calculation, the n/d-bit series in each of the d lines (series) is further redivided into d/2 sets.

The jth set of data among the d/2 sets of divided output data in each line (series) after the ith round calculation is represented by $Y_i[j]$ (j being an integer that is not smaller than 1 and not greater than $d^2/2$).

Likewise, among the d/2 sets of data obtained by redividing the n/d-bit data in each of the d lines according to the division number d in the round calculating unit in the (i+1)th stage, the jth set of data is represented by $X_{i+1}[j]$ (j being an integer that is not smaller than 1 and not greater than $d^2/2$).

Meanwhile, $YY_i[t]$ represents the data that is obtained by sequentially combining the data satisfying the equation, j=(d/2)s+t, among $Y_i[j]$.

Here, s is an integer that is not smaller than 0 and not greater than (d−1), and t is an integer that is not smaller than 1 and not greater than d/2.

Specifically, the following equations are satisfied, for example.

$$YY_i[1] = $$
$$Y_i[1] \| Y_i[1 \times d/2 + 1] \| Y_i[2 \times d/2 + 1] \| \ldots \| Y_i[(d-1) \times d/2 + 1],$$
$$YY_i[2] = $$
$$Y_i[2] \| Y_i[1 \times d/2 + 2] \| Y_i[2 \times d/2 + 2] \| \ldots \| Y_i[(d-1) \times d/2 + 2],$$
$$\ldots$$
$$YY_i[d/2] = Y_i[d/2] \| Y_i[1 \times d/2 + d/2] \| Y_i[2 \times d/2 + d/2] \|$$
$$\ldots \| Y_i[(d-1) \times d/2 + d/2]$$

Likewise, $XX_i[t]$ represents the data that is obtained by sequentially combining the data satisfying the equation, j=(d/2)s+t, among $X_i[j]$.

Here, $X_i[j]$ is the jth set of data among the d/2 sets of data obtained by dividing each of the d sets of n/d-bit data obtained by dividing input data in the ith stage, s is an integer that is not smaller than 0 and not greater than (d−1), and t is an integer that is not smaller than 1 and not greater than d/2.

According to the method described in the above chapter [3], there are a large number of distribution patterns, and evaluations take a long time. Specifically, according to the method described in the above chapter [3], the distribution patterns satisfy the following conditions (1) through (3).

(1) The F-function input-side data series are invariably distributed to the XOR-side data series of the next round function.

(2) The XOR-side data series are invariably distributed to the F-function input-side data series of the next round function.

(3) Each one of data series divided into d/2 sets is distributed to d/2 data series of the next round function without overlaps.

There exist a large number of distribution patterns that satisfy those conditions (1) through (3). Particularly, in a case where the number d of divisions of input data is large, the number of distribution patterns is very large, and therefore, it is not easy to select a distribution pattern. Also, implementation costs might become higher, depending on the distribution method.

In the following, a distribution method by which selectable distribution patterns are limited in advance, and the implementation costs can be lowered is suggested. This suggested method is developed by further improving the distribution method described in the above chapter [3].

First, in the jth set of data $X_{i+1}[j]$ among the d/2 sets of data obtained by redividing each of the d sets of n/d-bit data obtained by dividing input data by d in the (i+1)th stage, the data series of the data $XX_{i+1}[t]$ formed by sequentially combining the data satisfying the equation, j=(d/2)s+t, is cyclically shifted to the left by the amount equivalent to (2t−1) sets of data. The resultant data series is represented by $ZZ_{i+1}[t]$.

Specifically,
since $ZZ_{i+1}[1] = XX_{i+1}[1] <<< 1$,
the following relations are established.

$$ZZ_{i+1}[1] = $$
$$XX_{i+1}[1] <<< 1 = (X_{i+1}[1] \| X_{i+1}[1 \times d/2 + 1] \| X_{i+1}[2 \times d/2 + 1]$$
$$\| \ldots \| X_{i+1}[(d-1) \times d/2 + 1]) <<< 1 = X_{i+1}[1 \times d/2 + 1]$$
$$\| X_{i+1}[2 \times d/2 + 1] \| \ldots \| X_{i+1}[(d-1) \times d/2 + 1] \| X_{i+1}[1]$$

With the use of $YY_i[j]$ and $ZZ_{i+1}[j]$ defined as above, $ZZ_{i+1}[j]$ is selected one by one from each $YY_i[j]$ without overlaps, and connections are made. In this manner, a data permutation from the data of the ith round to the data of the (i+1)th round can be determined.

FIG. 30 shows an example case where the number d of divisions of input data is 6.

The respective intermediate variables in FIG. 30 are defined as follows.

Intermediate variables are the following three kinds of data.

$YY_i[t]$: Data generated by sequentially combining the data satisfying the equation, j=(d/2)s+t (s being an integer that is not smaller than 0 and not greater than (d−1), t being an integer that is not smaller than 1 and not greater than d/2), in the jth set of data $Y_i[j]$ (j being an integer that is not smaller than 1 and not greater than $d^2/2$) among the d/2 sets of divided output data in the ith stage.

$XX_{i+1}[t]$: Data generated by sequentially combining the data satisfying the equation, j=(d/2)s+t (s being an integer that is not smaller than 0 and not greater than (d−1), t being an integer that is not smaller than 1 and not greater than d/2), in the jth set of data $X_{i+1}[j]$ among the d/2 sets of data obtained by dividing each of the d sets of n/d-bit data obtained by dividing input data by d in the (i+1)th stage.

$ZZ_{i+1}[t]$: Data series obtained by cyclically shifting the data series $XX_{i+1}[t]$ to the left by the amount equivalent to (2t−1) sets of data.

Those are the intermediate variables.

As shown in FIG. 30, in a case where the number d of divisions of input data is 6, t is an integer that is not smaller than 1 and not greater than d/2, and t is set at each of the values 1, 2, and 3. The intermediate variables are as follows.

The intermediate variables $YY_i[t]$ corresponding to the output data of the ith stage: $YY_i[1], YY_i[2]$, and $YY_i[3]$ The intermediate variables $XX_{i+1}[t]$ corresponding to the pre-shifting input data of the (i+1)th stage: $XX_{i+1}[1], XX_{i+1}[2]$, and $XX_{i+1}[3]$ The intermediate variables $ZZ_{i+1}[t]$ corresponding to the post-shifting input data of the (i+1)th stage: $ZZ_{i+1}[1]$, $ZZ_{i+1}[2]$, and $ZZ_{i+1}[3]$ Those are calculated as described below.

The intermediate variables $YY_i[t]$ corresponding to the output data of the ith stage: $YY_i[1]$, $YY_i[2]$, and $YY_i[3]$ are set as follows.

$$YY_i[1]=Y_i[1]||Y_i[4]||Y_i[7]||Y_i[10]||Y_i[13]||Y_i[16],$$

$$YY_i[2]=Y_i[2]||Y_i[5]||Y_i[8]||Y_i[11]||Y_i[14]||Y_i[17],$$

$$YY_i[3]=Y_i[3]||Y_i[6]||Y_i[9]||Y_i[12]||Y_i[15]||Y_i[18],$$

The intermediate variables $XX_{i+1}[t]$ corresponding to the pre-shifting input data of the (i+1)th stage: $XX_{i+1}[1]$, $XX_{i+1}[2]$, and $XX_{i+1}[3]$ are set as follows.

$$XX_{i+1}[1]=X_{i+1}[1]||X_{i+1}[4]||X_{i+1}[7]||X_{i+1}[10]||X_{i+1}[13]||X_{i+1}[16],$$

$$XX_{i+1}[2]=X_{i+1}[2]||X_{i+1}[5]||X_{i+1}[8]||X_{i+1}[11]||X_{i+1}[14]||X_{i+1}[17],$$

$$XX_{i+1}[3]=X_{i+1}[3]||X_{i+1}[6]||X_{i+1}[9]||X_{i+1}[12]||X_{i+1}[15]||X_{i+1}[18].$$

The intermediate variables $ZZ_{i+1}[t]$ corresponding to the post-shifting input data of the (i+1)th stage: $ZZ_{i+1}[1]$, $ZZ_{i+1}[2]$, and $ZZ_{i+1}[3]$ are set as follows.

$$ZZ_{i+1}[1]=X_{1+1}[4]||X_{1+1}[7]||X_{1+1}[10]||X_{1+1}[13]||X_{1+1}[16]||X_{1+1}[1],$$

$$ZZ_{i+1}[2]=X_{i+1}[11]||X_{i+1}[14]||X_{i+1}[17]||X_{i+1}[2]||X_{i+1}[5]||X_{i+1}[8],$$

$$ZZ_{i+1}[3]=X_{i+1}[18]||X_{i+1}[3]||X_{i+1}[6]||X_{i+1}[9]||X_{i+1}[12]||X_{i+1}[15].$$

Here, $YY_i[1]$ is connected to $ZZ_{i+1}[1]$, $YY_i[2]$ is connected to $ZZ_{i+1}[2]$, and $YY_i[3]$ is connected to $ZZ_{i+1}[3]$, for example, as shown in FIG. 30. In this case, the data distribution method shown in (a) in the upper half of FIG. 31 is used.

Figure 31:
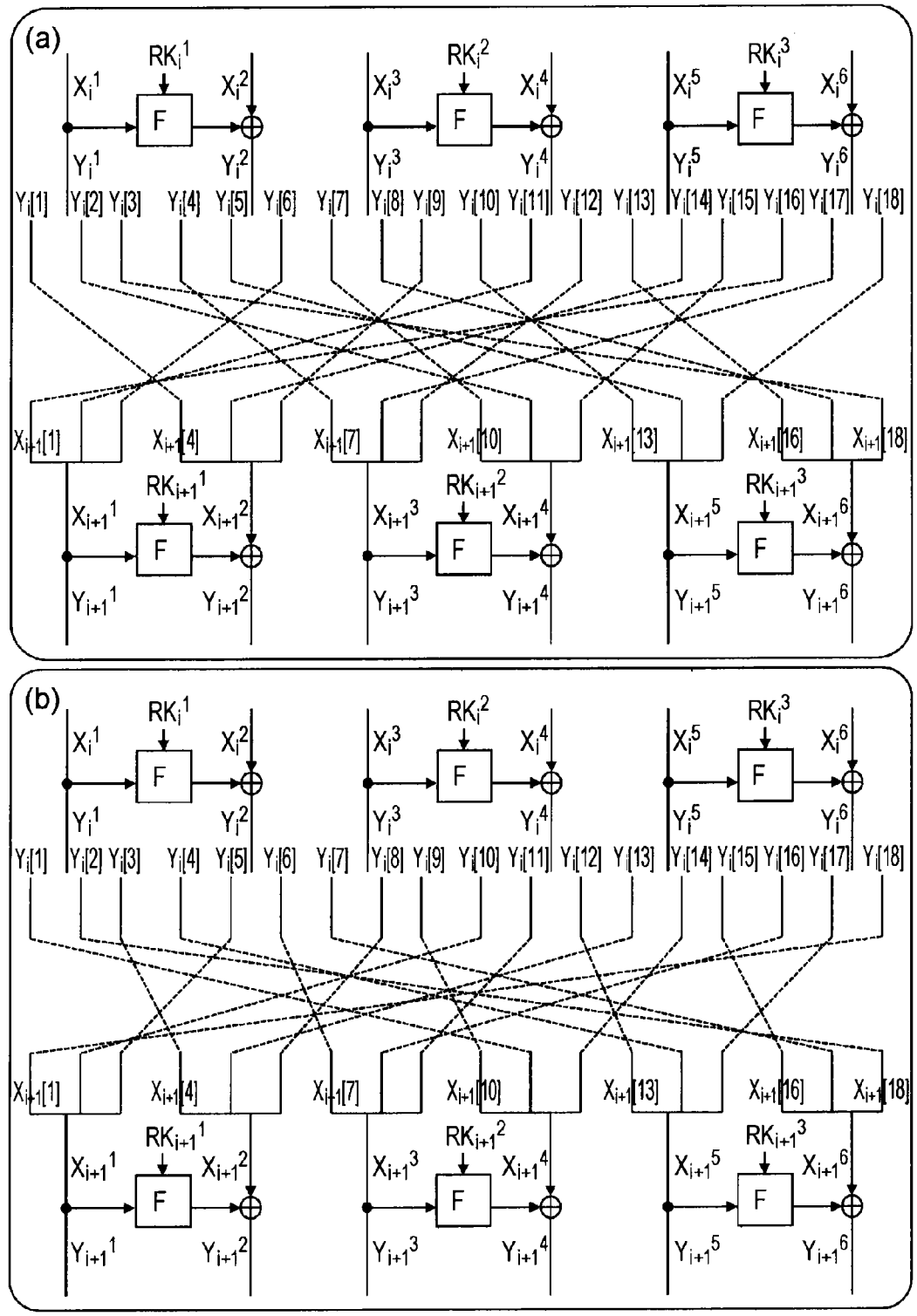
FIG. 31 is a diagram for explaining a more efficient data distribution method.

In a case where $YY_i[1]$ is connected to $ZZ_{i+1}[2]$, $YY_i[2]$ is connected to $ZZ_{i+1}[3]$, and $YY_i[3]$ is connected to $ZZ_{i+1}[1]$, for example, the data distribution method shown in (b) in the lower half of FIG. 31 is used.

As described above, the setting of the cryptographic processing unit of the cryptographic processing device of this embodiment, or the connection structure that determines the input-output relationship between the output data of the round calculations of the previous stage and the redivided data for the round calculations of the next stage, is selected from connection structures that have (d/2) sets of 2n/d-bit data as units that are the data generated by combining the d×(n/d) sets of redivided data generated through the redividing operation performed on the n/d-bit data in the lines having the output data of the round calculations.

The data distribution method determined in the above manner satisfies the conditions described in the above chapter [3], which are:

(1) The F-function input-side data series are invariably distributed to the XOR-side data series of the next round function;

(2) The XOR-side data series are invariably distributed to the F-function input-side data series of the next round function; and (3) Each one of data series divided into d/2 sets is distributed to d/2 data series of the next round function without overlaps.

Those conditions (1) through (3) are satisfied.

Accordingly, diffusion properties can be improved.

Also, according to the method described in the above chapter [3], (d/2×d/2) kinds of data series need to be selected and distributed one by one from (d/2×d/2) kinds of data series (in practice, this operation needs to be repeated one more time). According to the present method, on the other hand, d/2 kinds of data series are selected and distributed one by one from d/2 kinds of data series. Thus, the patterns from which selections are made can be dramatically reduced. Further, each distribution method selected by the above method has regularity in data distribution, and accordingly, implementation costs can be lowered.

[5. Example Structure with Involution Properties]

Figure 32:
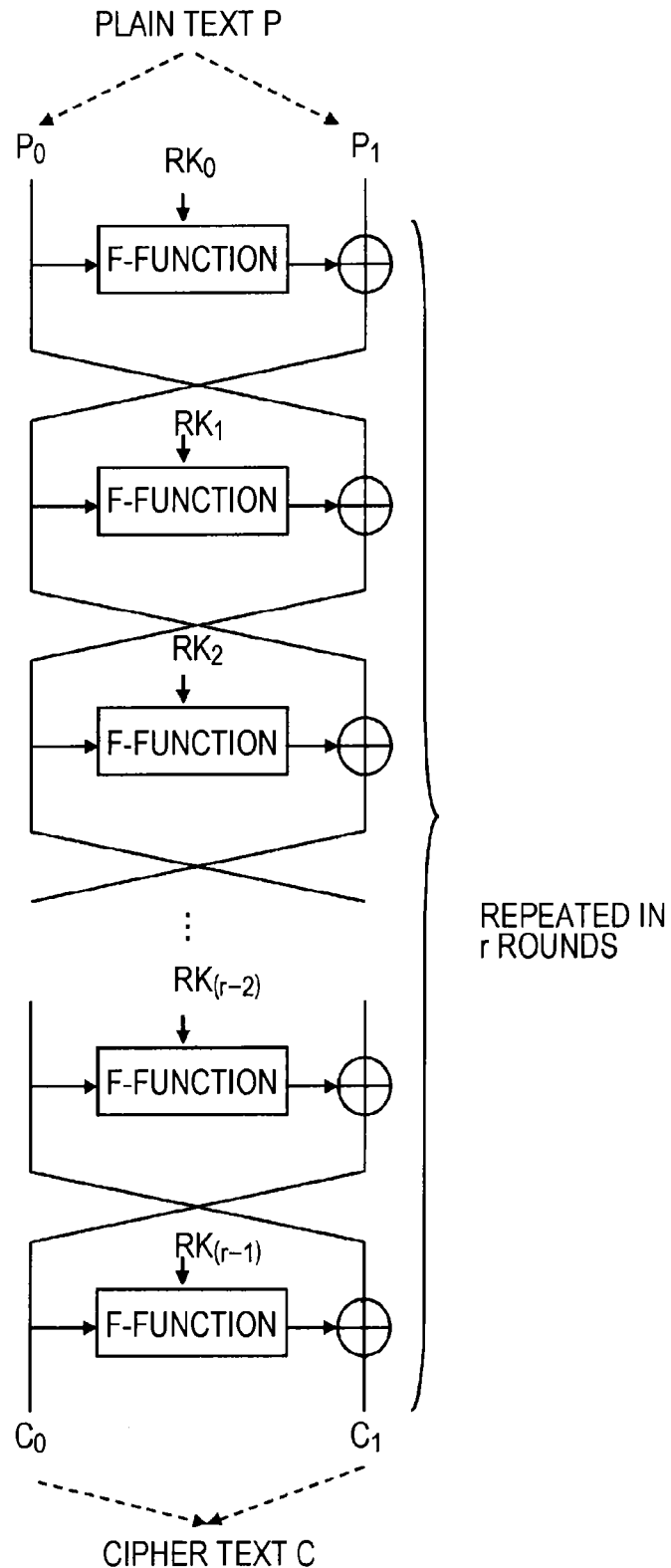
FIG. 32 is a diagram for explaining involution properties of a Feistel structure.

An encryption function in a conventional Feistel structure can be expressed as shown in FIG. 32. A decryption function in a conventional Feistel structure can be expressed as shown in FIG. 33.

Figure 33:
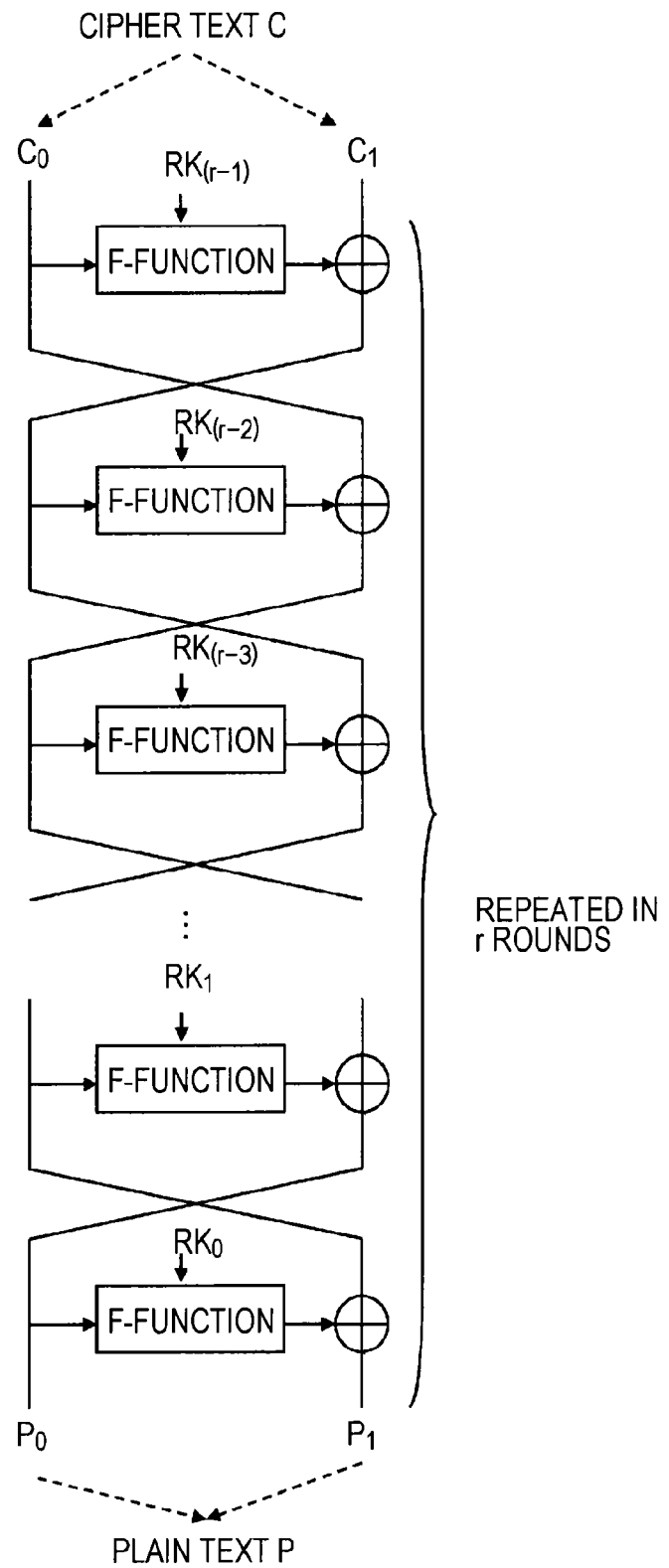
FIG. 33 is a diagram for explaining involution properties of a Feistel structure.

As can be seen from the structures shown in FIGS. 32 and 33, exactly the same function can be used as the encryption function and the decryption function simply by appropriately shuffling the order of enlarged keys (round keys) to be inserted to the F-functions. The properties with which the encryption function and the decryption function can be realized by the same structure, except for the insertion of enlarged keys (round keys), are called involution properties.

In a cryptographic processing structure with involution properties, the encryption function can serve as the decryption function if the order of enlarged keys (round keys) is appropriately shuffled, and there is no need to prepare the decryption function. Accordingly, it can be said that cryptography with involution properties can be normally implemented at lower implementation costs than those for cryptography without involution properties.

Also, the use of the same function as the encryption function and the decryption function has the advantages that validation costs can be halved (validation in either the encryption function or the decryption function will suffice), and code size can be halved, for example.

As described above, in a conventional Feistel structure with the division number d of 2 shown in FIGS. 32 and 33, exactly the same function can be used as the encryption function and the decryption function simply by appropriately shuffling the order of enlarged keys (round keys) to be inserted to the F-functions, and a structure with involution properties can be readily formed.

However, in a generalized Feistel structure (generalized Feistel networks) having a division number d that is not 2, involution properties cannot be readily achieved.

Involution properties of a d-line generalized Feistel structure using d/2 F-functions in one stage are first described (d>2).

It is known that, in a 4-line generalized Feistel structure such as the above described one shown in FIG. 14, involution properties can be achieved if the number of processing rounds is an odd number. For example, a 4-line generalized Feistel structure formed with three rounds has involution properties (the same applies in a 5-round structure). However, involution properties are not achieved in a case where the number of processing rounds is an even number.

A d-line generalized Feistel structure normally has involution properties only in cases where the remainder obtained when the number of constituent rounds is divided by a division number d is 1 or (d/2)+1.

For example, the 4-line generalized Feistel structure shown in FIG. 14 has involution properties only in cases where the remainder obtained when the number of constituent rounds is divided by a division number d of 4 is 1 or (d/2)+1=(4/2)+1=3.

Specifically, involution properties are achieved only in cases where the number of constituent rounds is 1, 3, 5, 7, 9, . . . , or where the number of constituent rounds is an odd number.

Also, a 6-line generalized Feistel structure with a division number d of 6 has involution properties only in cases where the remainder obtained when the number of constituent rounds is divided by the division number d of 6 is 1 or $(d/2)+1=(6/2)+1=4$.

Specifically, involution properties are achieved only in cases where the number of constituent rounds is 1, 4, 7, 10, 13, . . . , or where the number of constituent rounds is one of those numbers.

In general, a d-line generalized Feistel structure has involution properties invariably depending on the number of constituent rounds, as described above.

Figure 34:
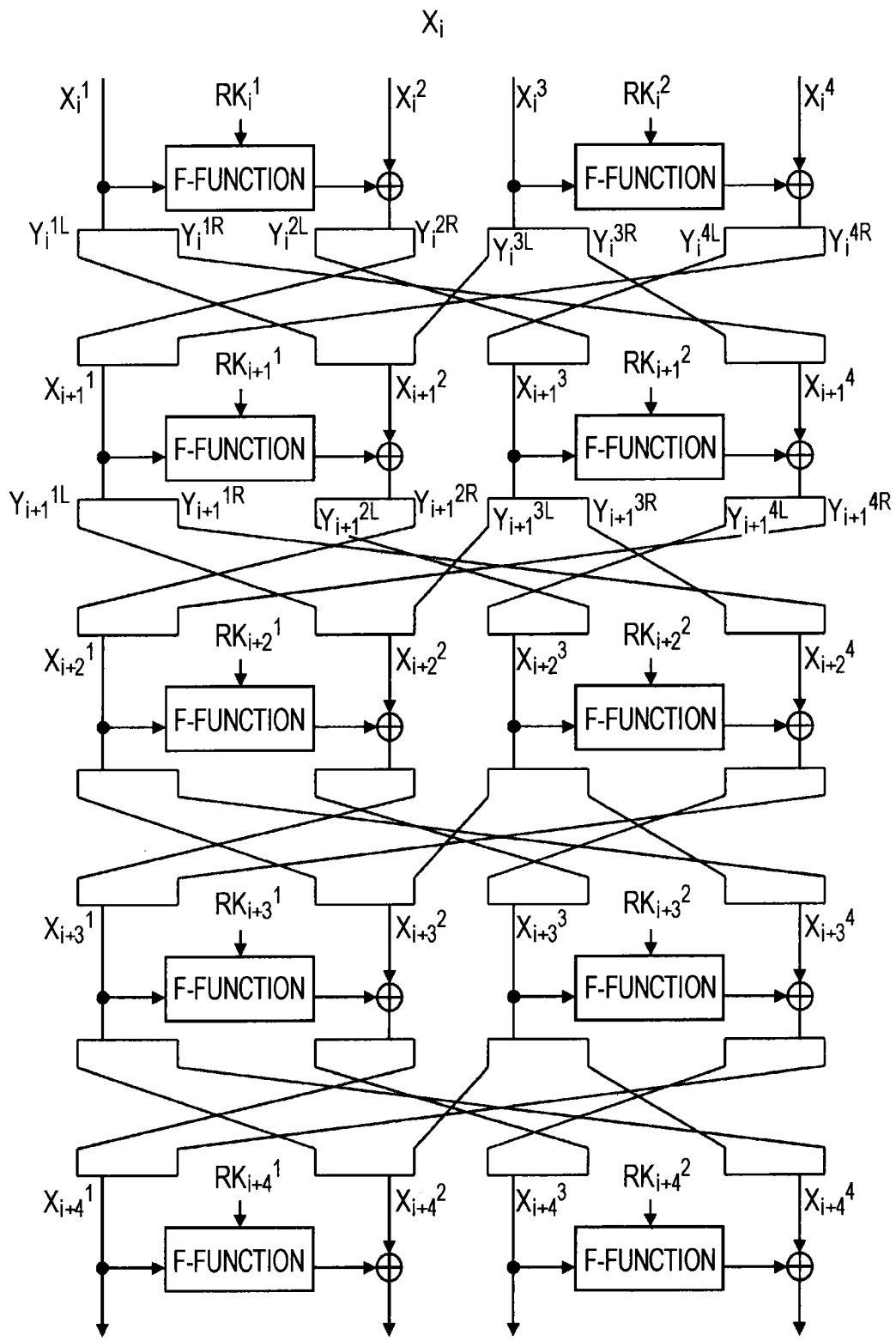
FIG. 34 is a diagram showing a type of a 4-line structure that can achieve excellent diffusion properties.

FIG. 34 is a diagram showing a method in a 4-line structure that can achieve excellent diffusion properties through the data redividing and recombining operation between round calculations as described in the above chapter [3. Example Structure With Improved Diffusion Properties According to This Disclosure].

According to this method, involution properties are achieved only when the number of constituent rounds is 1+3n (n being an integer equal to or greater than 0).

The number of constituent rounds is greatly related to security and implementation performance. In a structure having involution properties, regardless of the number of constituent rounds, the number of constituent rounds can be set in a more flexible manner, and security and implementation performance can be flexibly changed. Furthermore, small-size implementation can be performed by virtue of the involution properties.

A method of designing an inter-round permutation that achieves better diffusion properties without an increase in implementation costs and further has involution properties, regardless of the number of constituent rounds, is described.

The method described below is a method for further providing involution properties to a structure that has excellent diffusion properties as described in the above chapter [3. Example Structure With Improved Diffusion Properties According to This Disclosure].

Figure 35:
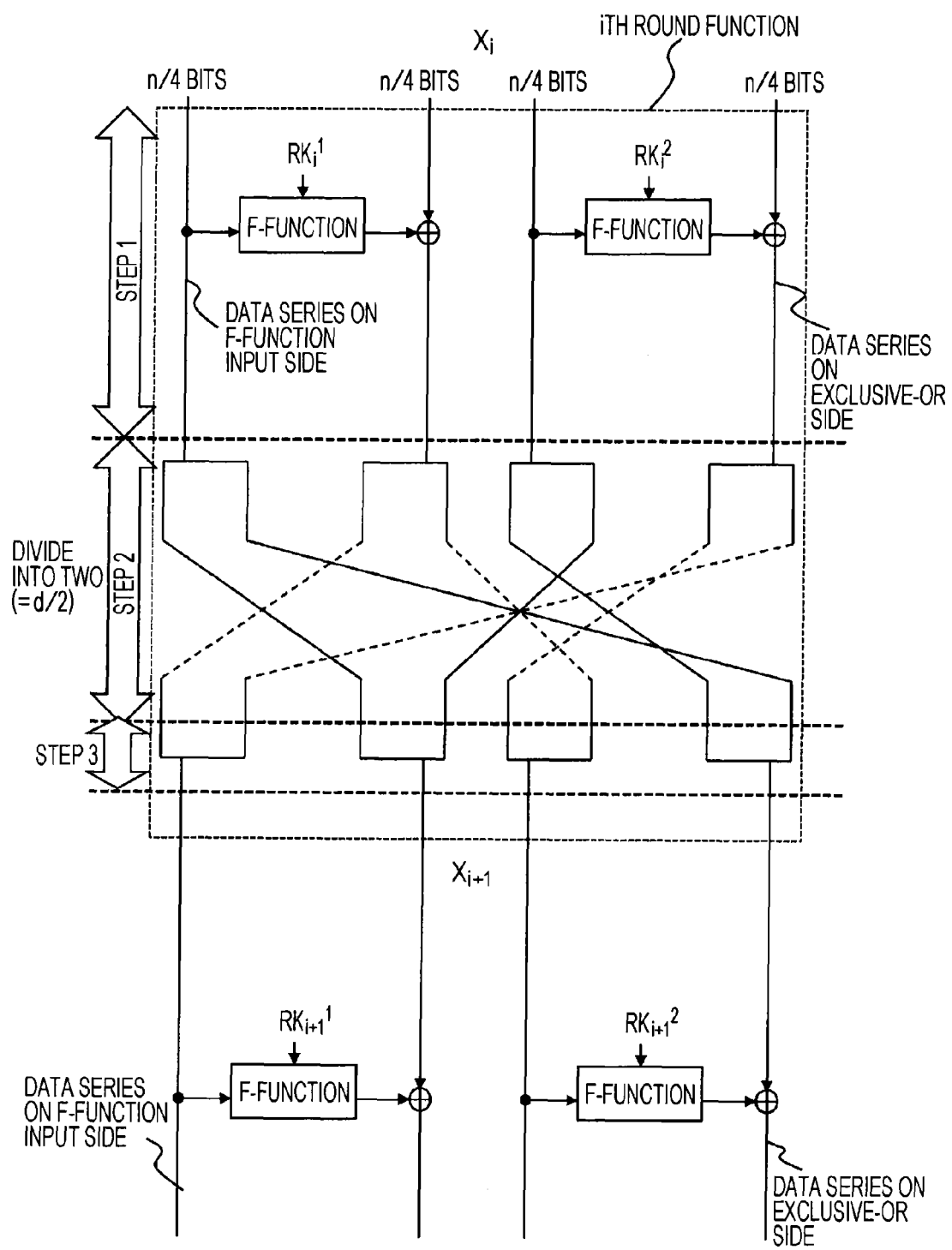
FIG. 35 is a diagram for explaining an operation to achieve involution properties.

Referring now to FIG. 35, an example of this method is described. According to this method, the procedures of the following steps 1 through 3 are repeatedly carried out, as shown in FIG. 35.

(Step 1)

First, in a d-line generalized Feistel structure having a division number d like a conventional structure, n-bit input data is divided into d sets of n/d-bit data in accordance with the division number d, and the respective sets of n/d-bit data are input to the respective divisional lines. F-function processing and an exclusive OR operation are performed on each of the sets of n/d-bit data.

The data series that are input to the F-functions at this point are referred to as the F-function input-side data series, and the data series that are subjected to exclusive OR are referred to as the XOR-side data series.

Among the F-function input-side data series, the leftmost F-function input-side data series is represented by L(0), and the rest of the F-function input-side data series are sequentially represented by $L(1), \ldots,$ and $L((d/2)-1)$, starting from the left, for example. Likewise, the XOR-side data series are sequentially represented by $R(0), \ldots,$ and $R((d/2)-1)$, starting from the left, for example.

(Step 2)

After that, the n/d-bit data that is the data transferred through each series (line) is further redivided into d/2 sets of data. This redivision may not be equal division.

The redivided data of the F-function input-side data series and the redivided data of the XOR-side data series are represented by $L(i)_j$ and $R(i)_j$, respectively.

Here, i represents the identifier (number) of each series (line), and j represents the identifier (number) of each set of redivided data in one series (line).

For example, the leftmost data of the data obtained by redividing the leftmost F-function input-side data series into d/2 sets is represented by $L(0)_0$, and the rest of the redivided data are sequentially represented by $L(0)_1, \ldots,$ and $L(0)_{d/2-1}$.

The data redivided into d/2 sets in each of the series (lines) is then distributed in accordance with the following rules.

Rule (2-1)

The leftmost F-function input data series, or the data of L(0) (i=0), is distributed.

$L(0)_0$ is distributed to $R(0)_0$ of the next round function, and $L(0)_1$ is distributed to $R(1)_1$ of the next round function. Likewise, $L(0)_i$ is distributed to $R(i)_i$ until i becomes $(d/2)-1$.

Accordingly, the following are established: $L(0)_0=R(0)_0$, $L(0)_1=R(1)_1$, $L(0)_2=R(2)_2$, . . . .

Rule (2-2)

Next, the data of L(1) is distributed.

$L(1)_0$ is distributed to $R(1)_0$ of the next round function, and $L(1)_1$ is distributed to $R(2)_1$ of the next round function. Likewise, $L(1)_i$ is distributed to $R((i+1) \bmod d/2)_i$ until i becomes $(d/2)-1$.

Rule (2-3)

The same operation as the above described 2 is repeated up to the data of $L((d/2)-1)$. That is, $L(i)_d$ is distributed to $R((i+j) \bmod d/2)_j$ of the next round (i and j being not smaller than 0 and not greater than $(d/2)-1$).

Rule (2-4)

The same operation as above is repeated on the XOR-side data series. Specifically, $R(i)_d$ is distributed to $L(((d/2)+i-j) \bmod d/2)_j$ of the next round function. Here, i and j are not smaller than 0 and not greater than $(d/2)-1$.

(Step 3)

After the above described distribution, each set of data divided into d/2 sets is integrated into one set of data.

The above operation is repeated a required number of times in accordance with the number of times a round calculation is performed.

Figure 36:
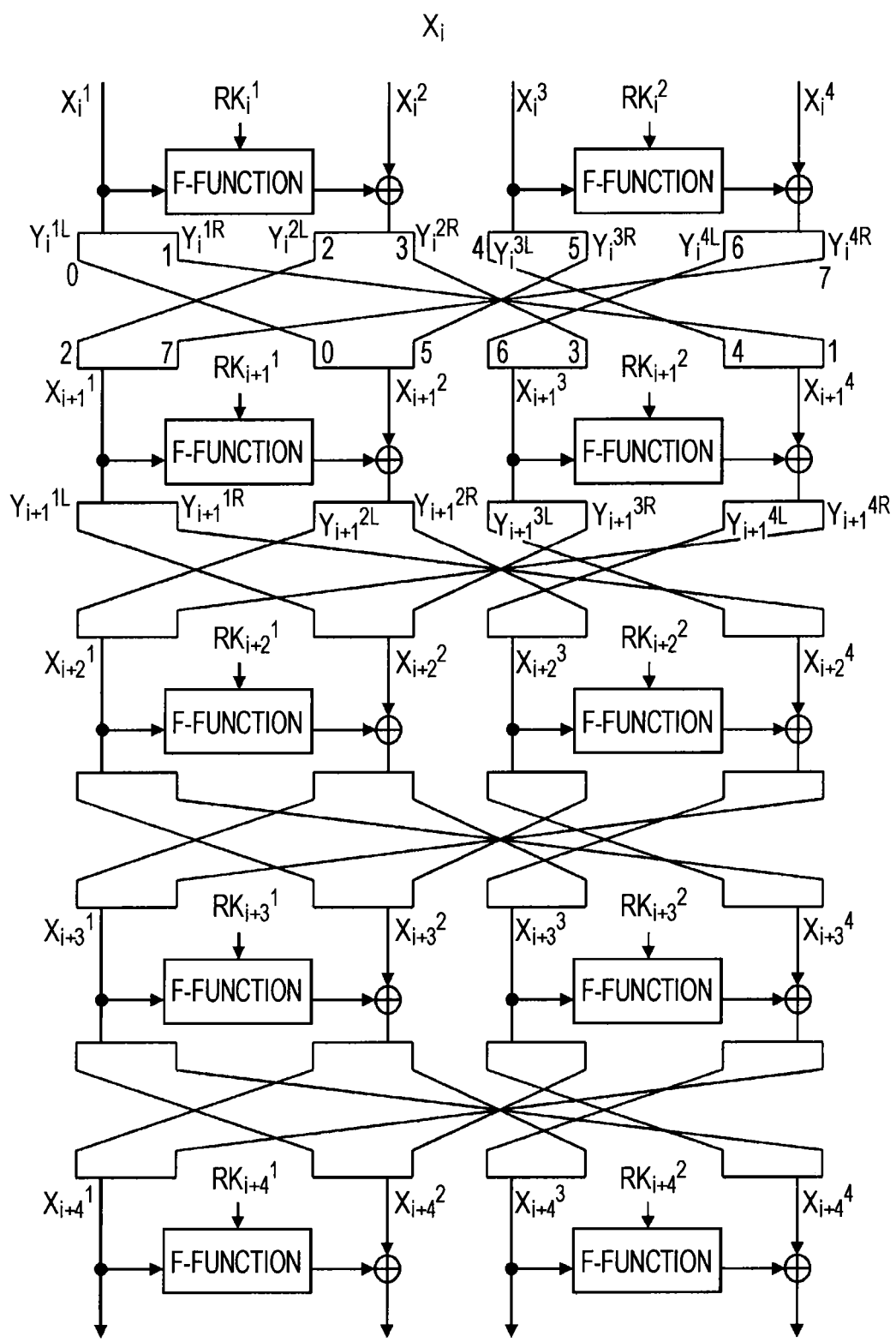
FIG. 36 is a diagram for explaining an example structure that has involution properties in a 4-line (d=4) structure.
Figure 37:
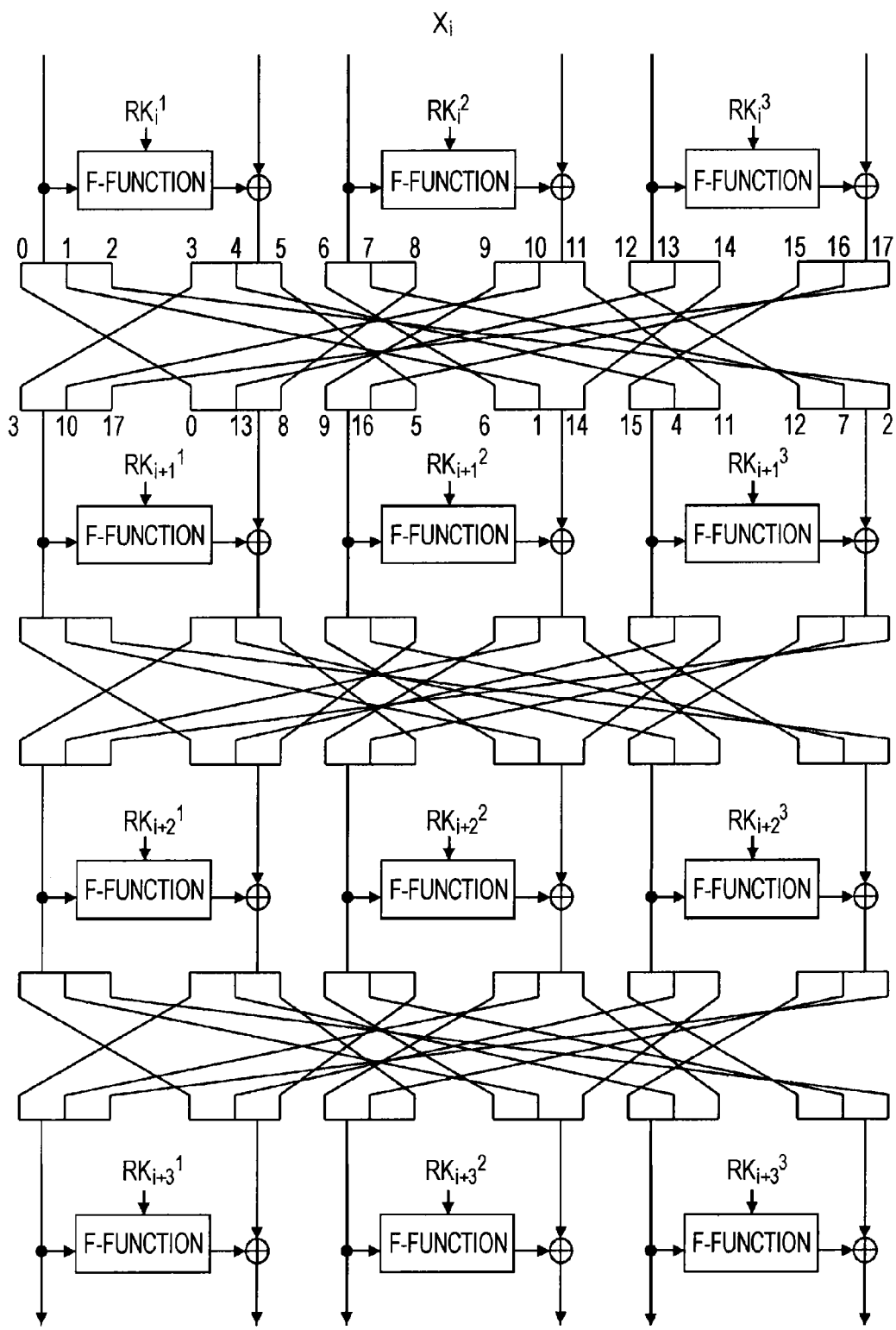
FIG. 37 is a diagram for explaining an example structure that has involution properties in a 6-line (d=6) structure.

FIG. 36 shows an example structure that performs the above described operation in the case of 4-line (d=4). FIG. 37 shows an example structure that performs the above described operation in the case of 6-line (d=6).

In the structures shown in FIGS. 36 and 37, the data redivided into d/2 sets in each series (line) is redistributed to the next round in accordance with the rules (2-1) through (2-4) described above in step 2. With the redividing of data and the redistributing structure, this method achieves involution properties, regardless of the number of constituent rounds.

Figure 38:
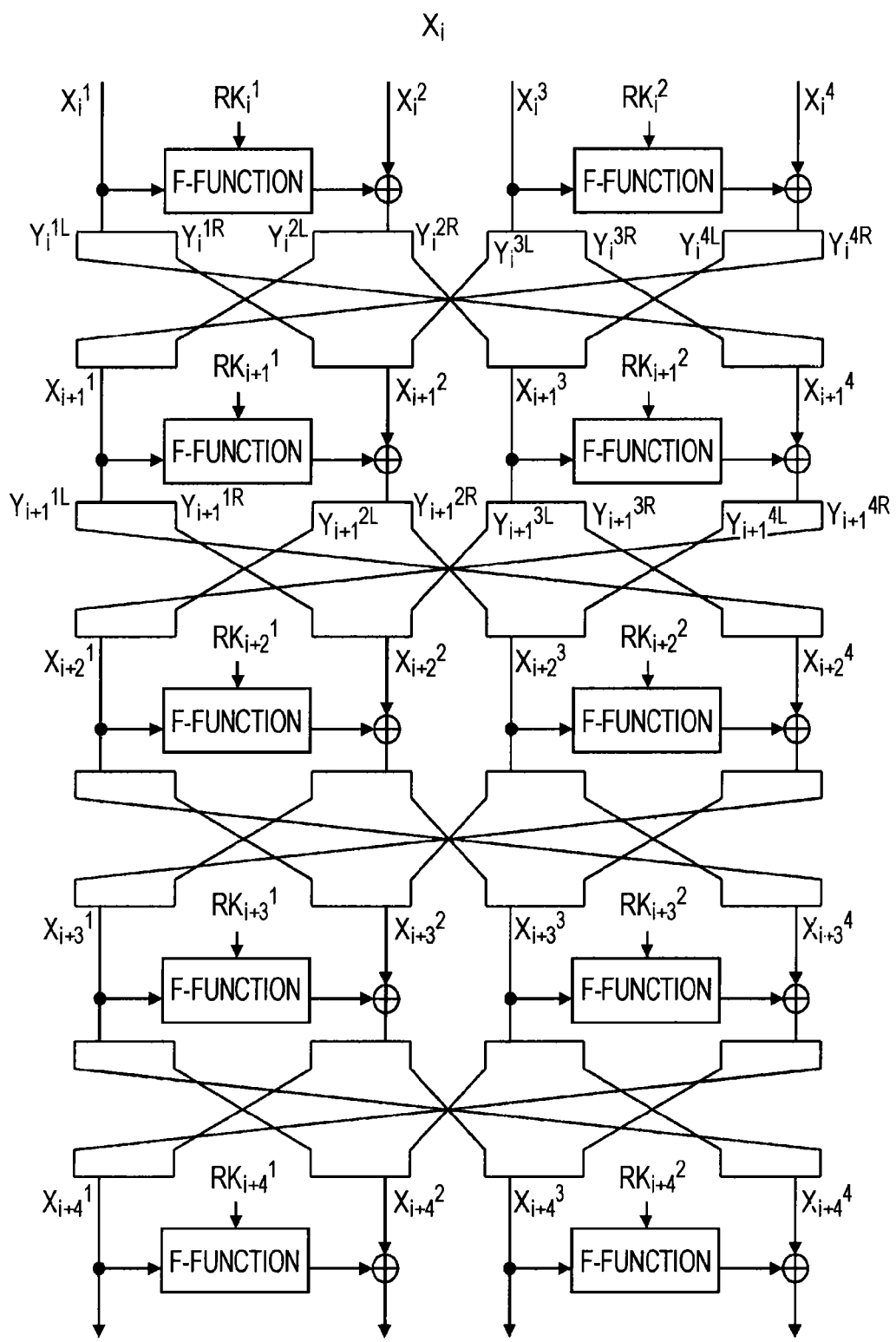
FIG. 38 is a diagram for explaining an example structure that has involution properties.
Figure 39:
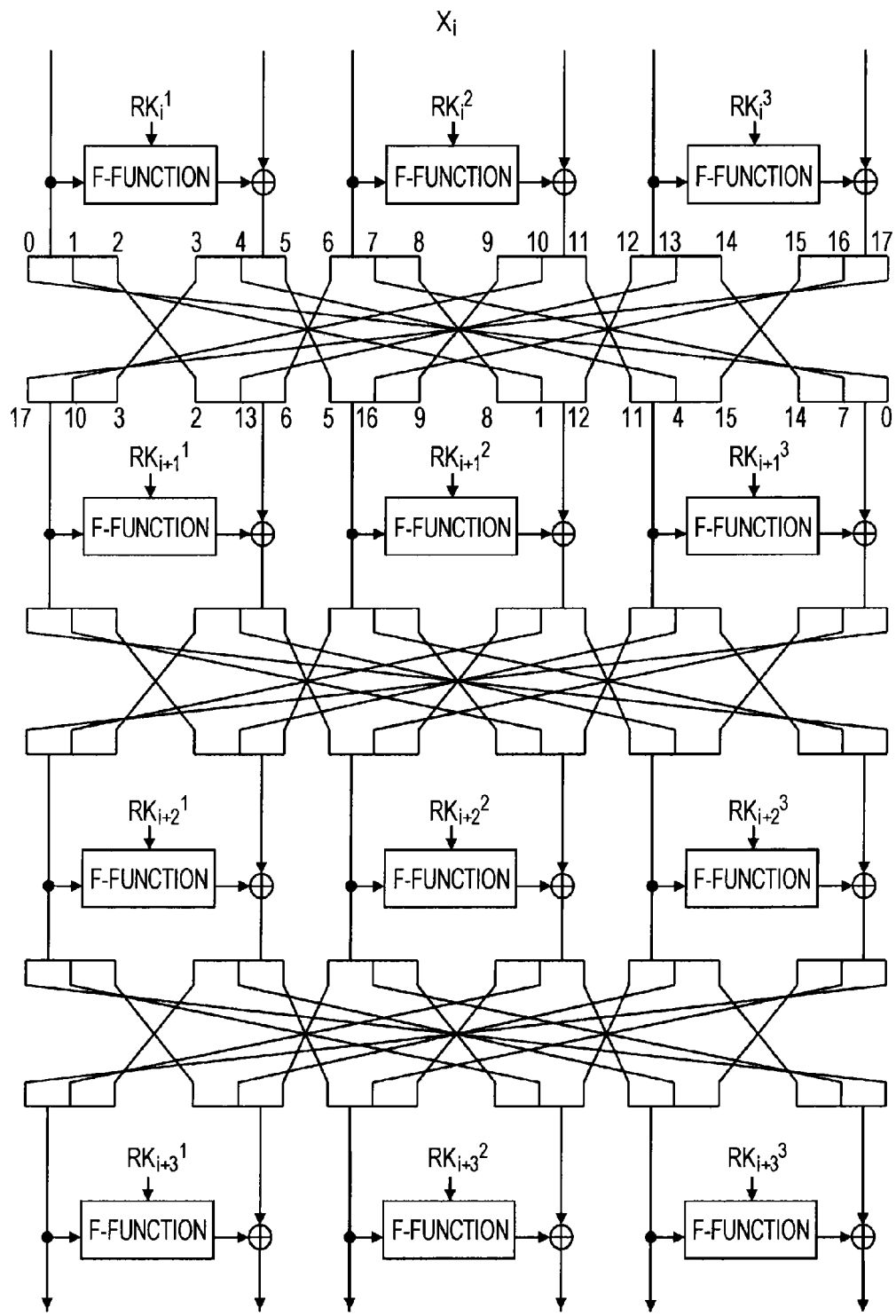
FIG. 39 is a diagram for explaining an example structure that has involution properties.

FIGS. 38 and 39 illustrate structuring methods that differ from those of the above described example structures, but achieve involution properties, regardless of the number of constituent rounds. The method that has been described in the above chapter [3] and is illustrated in FIG. 21 is an example of a structure that achieves involution properties when the number of constituent rounds is an odd number.

As described above, in the operation to restructure the redivided data of the respective round calculations in the cryptographic processing unit, the redivided data of the round-function input-side series of the previous stage is distributed to the XOR-side series of the next stage in accordance with the above described predetermined rules, and the redivided data of the XOR-side series of the previous stage is distributed to the round-function input-side series of the next stage in accordance with the above described predetermined rules. Such a structure can be a structure that has involution properties with which the same structure can be used in both encrypting operations and decrypting operations.

[6. Example Structure of a Cryptographic Processing Device]

Lastly, an embodiment of a cryptographic processing device that performs cryptographic processing according to the above described embodiments is described.

The cryptographic processing device that performs cryptographic processing according to the above described embodiments can be installed in various information processing devices that perform cryptographic processing. Specifically, the cryptographic processing device can be used in various devices that performs cryptographic processing in data processing and communication processing operations, such as PCs, television sets, recorders, players, communication devices, RFIDs, smartcards, sensor network devices, cell/battery authentication modules, health/medical equipments, and self-contained network devices.

Figure 40:
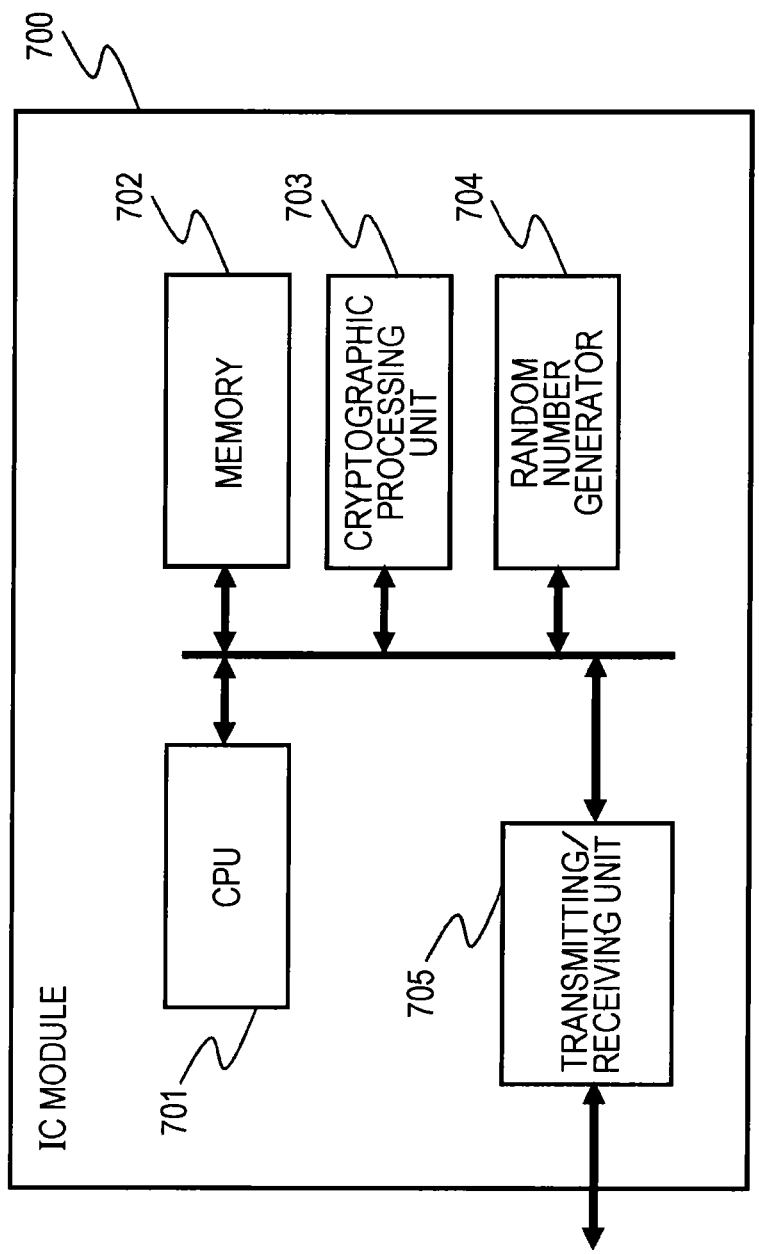
FIG. 40 is a diagram showing an example structure of an IC module 700 as a cryptographic processing device.

FIG. 40 shows an example structure of an IC module 700 as an example of a device that performs cryptographic processing according to this disclosure. The above described operations can be performed in various information processing devices such as PCs, IC cards, and readers/writers. The IC module 700 shown in FIG. 40 can be formed in any of those various devices.

A CPU (Central Processing Unit) 701 shown in FIG. 40 is a processor that executes various programs for starting and ending cryptographic processing, controlling data transmission/reception, controlling data transfers between respective components, and the like. A memory 702 is formed with a ROM (Read Only Memory) that stores the programs to be executed by the CPU 701 or fixed data such as calculation parameters, or a RAM (Random Access Memory) that is used as the storage area and the work area for the program to be executed in operations by the CPU 701 and parameters that vary in program execution, or the like. The memory 702 can also be used as the storage area that stores the key data necessary for cryptographic processing, the transformation table (permutation table) to be used in cryptographic processing, and the data to be used in transformation matrixes, and the like. The data storage area is preferably formed as a memory that has an anti-tampering structure.

A cryptographic processing unit 703 performs encrypting operations and decrypting operations by using the above described cryptographic processing structure or the symmetric-key block cryptographic processing algorithm involving a generalized Feistel structure or a Feistel structure, for example.

Although the cryptographic processing unit is described herein as an individual module, such an independent cryptographic processing module may not be provided. Instead, a cryptographic processing program may be stored in a ROM, and the CPU 701 may read and execute the program stored in the ROM, for example.

A random number generator 704 performs an operation to generate random numbers required in generating the keys necessary for cryptographic processing.

A transmitting/receiving unit 705 is a data communication processing unit that performs data communications with the outside. For example, the transmitting/receiving unit 705 performs data communications with an IC module such as a reader/writer and outputs a cipher text generated in the IC module, or receives a data input from an external reader/writer or the like.

The cryptographic processing device described in the above embodiment can be used not only in encrypting operations to encrypt plain texts as input data, but also in decrypting operations to restore plain texts from cipher texts as input data.

The structure described in the above described embodiment can be used in both encrypting operations and decrypting operations.

[7. Summary of the Structures According to this Disclosure]

Embodiments of this disclosure have been described in detail, with reference to the above specific embodiments. However, it should be obvious to those skilled in the art that modifications and alterations can be made to the embodiments without departing from the scope of this disclosure. In short, the present invention is disclosed herein by way of examples, and should not be limited to them. The claims should be taken into account in understanding the scope of this disclosure.

The technique disclosed in this specification can be in the following forms.

(1) A cryptographic processing device that includes a cryptographic processing unit that divides and inputs constituent bits of data to be subjected to data processing, into lines, and repeatedly performs a data converting operation on the data in the respective lines by using a round function, wherein the cryptographic processing unit has a structure designed to input n/d-bit data formed by dividing n-bit data as input data by a division number d to the respective lines, and repeatedly perform a calculation as a round calculation including the data converting operation using the round function, and the cryptographic processing unit performs an operation in which the n/d-bit data of each line having output data of the round calculation is redivided into d/2 sets of data, the redivided data is recombined to restructure d sets of n/d-bit data different from output data of the round calculation of the previous stage, and the restructured data is set as input data for the round calculation of the next stage.

(2) The cryptographic processing device of (1), wherein the round function includes an F-function that includes a calculation using a round key, nonlinear transformation, and linear transformation, and an exclusive OR operation between an output or an input of the F-function and the data of another line.

(3) The cryptographic processing device of (1) or (2), wherein the cryptographic processing unit sets the result of the round calculation of the previous stage as the input to the round calculation of the next stage by performing an operation that satisfies the following distribution conditions (1) through (3):

(1) F-function input-side data series are invariably distributed to XOR-side data series of the next round function, (2) the XOR-side data series are invariably distributed to the F-function input-side data series of the next round function, and (3) each one of data series divided into d/2 sets is distributed to d/2 data series of the next round function without overlaps.

(4) The cryptographic processing device of any of (1) through (3), wherein the cryptographic processing unit has a generalized Feistel structure having equal to or greater than 4 as the division number d of input data.

(5) The cryptographic processing device of any of (1) through (4), wherein the cryptographic processing unit performs an operation in which d×(n/d) sets of redivided data are generated by redividing n/d-bit data of each of d lines having the output data of the round calculation into d/2 sets of data, d/2 sets of redivided data selected from different lines among the d lines corresponding to the division number d are recombined to restructure d sets of n/d-bit data different from the output data of the round calculation of the previous stage, and the restructured data is set as the input data for the round calculation of the next stage.

(6) The cryptographic processing device of any of (1) through (5), wherein, when all output bits are in a diffusion state that satisfies the following two conditions, or when the output bits are expressed in a relational expression with input bits, the cryptographic processing unit has a structure that realizes a full diffusion state satisfying the following two conditions:

(Condition 1) all input bits are included in the relational expression, and (Condition 2) all the input bits have passed through the round function at least once.

(7) The cryptographic processing device of any of (1) through (6), wherein the cryptographic processing unit realizes the full diffusion state through four rounds of round calculations.

(8) The cryptographic processing device of any of (1) through (7), wherein the connection structure that determines an input-output relationship between the output data of the round calculation of the previous stage and the redivided data of the round calculation of the next stage is a connection structure selected from connection structures that have (d/2) sets of 2n/d-bit data as units that are the data generated by combining d×(n/d) sets of redivided data generated through a redividing operation performed on the n/d-bit data in the lines having the output data of the round calculation.

(9) The cryptographic processing device of any of (1) through (8), wherein the cryptographic processing unit has involution properties applicable both in an encrypting operation and a decrypting operation.

(10) The cryptographic processing device of any of (1) through (9), wherein the operation to restructure redivided data of the respective round calculations in the cryptographic processing unit includes: distributing the redivided data of round-function input-side series of the previous stage to XOR-side series of the next stage in accordance with a predetermined rule; and distributing the redivided data of the XOR-side series of the previous stage to the round-function input-side series of the next stage in accordance with a predetermined rule.

(11) The cryptographic processing device of any of (1) through (10), wherein the cryptographic processing unit performs an encrypting operation to transform a plain text as input data into a cipher text, or a decrypting operation to transform a cipher text as input data into a plain text.

Further, a processing method to be implemented in the above described devices and systems, and a program for performing the above described operations are included in the structures according to this disclosure.

The series of operations described in this specification can be performed by hardware, software, or a combination of hardware and software. In a case where an operation is performed by software, a program having the processing sequence recorded therein may be installed into a memory in a computer incorporated into special-purpose hardware, or may be installed into a general-purpose computer that can perform various operations. The program is then executed. For example, the program can be recorded beforehand on a recording medium. The program can not only be installed into a computer from a recording medium, but also can be received via a network such as a LAN (Local Area Network) or the Internet and be installed into a recording medium such as an internal hard disk.

The various operations described in this specification are not necessarily performed in the described sequential order, but may be performed in parallel or independently of one another, depending on the processing capacity of the device performing the operation, or where necessary. In this specification, a system is a logical integration of devices, and each of the component devices is not necessarily located in the same housing.

Industrial Applicability

As described above, with a structure according to an embodiment of this disclosure, cryptographic processing with improved diffusion properties and a high level of security is realized.

Specifically, a cryptographic processing unit divides and inputs the constituent bits of data to be subjected to data processing to lines, and repeatedly performs a data converting operation using round functions on the data of the respective lines. The cryptographic processing unit inputs n/d-bit data obtained by dividing n-bit data as input data by a division number d to each line, and repeatedly performs a round calculation that is a calculation including a data converting operation using round functions. The n/d-bit data in each line having the output data of the round calculations is divided into d/2 sets of data, and the divided data are combined to restructure d sets of n/d-bit data that are different from the output data of the round calculations of the previous stage. The restructured data is set as the input data for the round calculations of the next stage. With this structure, cryptographic processing with improved diffusion properties and a high level of security can be realized.

Reference Signs List

700 IC module
   701 CPU(Central processing Unit)
   702 Memory
   703 Cryptographic processing unit
   704 Random number generator
   705 Transmitting/receiving unit

The invention claimed is:

1. A cryptographic processing device comprising a cryptographic processing circuit configured to divide and input constituent bits of data to be subjected to data processing into a plurality of lines, and repeatedly perform a data converting operation on the data in the respective lines by using a round function, wherein the cryptographic processing circuit has a structure designed to input n/d-bit data formed by dividing n-bit data as input data by a division number d to the respective lines, and repeatedly perform a calculation as a round calculation including the data converting operation using the round function, the cryptographic processing circuit performs an operation in which the n/d-bit data of each line having output data of the round calculation is redivided into d/2 sets of data, the redivided data is recombined to restructure d sets of n/d-bit data different from output data of a round calculation of a previous stage, and the restructured data is set as input data for a round calculation of the next stage, the round function includes an F-function and an exclusive OR operation to be performed on a output or an input of the F-function with data of another line, and the cryptographic processing circuit sets a result of the round calculation of the previous stage as the input to the round calculation of the next stage by performing an operation that satisfies the following distribution conditions (1) through (3): (1) F-function input-side data series are distributed to XOR-side data series of the next round function, (2) XOR-side data series are distributed to F-function input-side data series of the next round function, and (3) each one of data series divided into d/2 sets is distributed to d/2 data series of the next round function without overlaps.

2. The cryptographic processing device according to claim 1, wherein the round function includes an F-function that includes a calculation using a round key, nonlinear transformation, and linear transformation, and an exclusive OR operation between an output or an input of the F-function and data of another line.

3. The cryptographic processing device according to claim 1, wherein the cryptographic processing circuit has a generalized Feistel structure having equal to or greater than 4 as the division number d of input data.

4. The cryptographic processing device according to claim 1, wherein the cryptographic processing circuit performs an operation in which d.times.(d/2) sets of redivided data are generated by redividing n/d-bit data of each of d lines having the output data of the round calculation into d/2 sets of data, d/2 sets of redivided data selected from different lines among the d lines corresponding to the division number d are recombined to restructure d sets of n/d-bit data different from the output data of the round calculation of the previous stage, and the restructured data is set as the input data for the round calculation of the next stage.

5. The cryptographic processing device according to claim 1, wherein, when all output bits are in a diffusion state that satisfies the following two conditions, or when the output bits are expressed in a relational expression with input bits, the cryptographic processing circuit has a structure that realizes a full diffusion state satisfying the following two conditions: (Condition 1) all input bits are included in the relational expression, and (Condition 2) all the input bits have passed through the round function at least once.

6. The cryptographic processing device according to claim 5, wherein the cryptographic processing circuit realizes the full diffusion state through four rounds of round calculations.

7. The cryptographic processing device according to claim 1, wherein the connection structure that determines an input-output relationship between the output data of the round calculation of the previous stage and the redivided data of the round calculation of the next stage is a connection structure selected from connection structures that have (d/2) sets of 2n/d-bit data as units that are data generated by combining d.times.(d/2) sets of redivided data generated through a redividing operation performed on the n/d-bit data in the lines having the output data of the round calculation.

8. The cryptographic processing device according to claim 1, wherein the cryptographic processing circuit has involution properties.

9. The cryptographic processing device according to claim 8, wherein the operation to restructure redivided data of respective round calculations in the cryptographic processing circuit includes: distributing redivided data of round-function input-side series of the previous stage to XOR-side series of the next stage in accordance with a predetermined rule; and distributing redivided data of XOR-side series of the previous stage to round-function input-side series of the next stage in accordance with a predetermined rule.

10. The cryptographic processing device according to claim 1, wherein the cryptographic processing circuit performs an encrypting operation to transform a plain text as input data into a cipher text, or a decrypting operation to transform a cipher text as input data into a plain text.

11. A cryptographic processing method implemented in a cryptographic processing device, the cryptographic processing method comprising a cryptographic processing step of dividing and inputting constituent bits of data to be subjected to data processing into a plurality of lines, and repeatedly performing a data converting operation on the data in the respective lines by using a round function, wherein the cryptographic processing step includes inputting n/d-bit data formed by dividing n-bit data as input data by a division number d to the respective lines; and repeatedly performing a calculation as a round calculation including the data converting operation using the round function, the cryptographic processing step includes an operation in which the n/d-bit data of each line having output data of the round calculation is redivided into d/2 sets of data, the redivided data is recombined to restructure d sets of n/d-bit data different from output data of a round calculation of a previous stage, and the restructured data is set as input data for a round calculation of the next stage, the round function includes an F-function and an exclusive OR operation to be performed on a output or an input of the F-function with data of another line, and the cryptographic processing step includes setting a result of the round calculation of the previous stage as the input to the round calculation of the next stage by performing an operation that satisfies the following distribution conditions (1) through (3): (1) F-function input-side data series are distributed to XOR-side data series of the next round function, (2) XOR-side data series are distributed to F-function input-side data series of the next round function, and (3) each one of data series divided into d/2 sets is distributed to d/2 data series of the next round function without overlaps.

12. A non-transitory computer readable medium including a computer executable program for causing a cryptographic processing device to perform cryptographic processing, the program causing a cryptographic processing circuit to carry out: a cryptographic processing step of dividing and inputting constituent bits of data to be subjected to data processing into a plurality of lines, and repeatedly performing a data converting operation on the data in the respective lines by using a round function, wherein the cryptographic processing step includes: inputting n/d-bit data formed by dividing n-bit data as input data by a division number d to the respective lines; and repeatedly performing a calculation as a round calculation including the data converting operation using the round function, the cryptographic processing step includes an operation in which the n/d-bit data of each line having output data of the round calculation is redivided into d/2 sets of data, the redivided data is recombined to restructure d sets of n/d-bit data different from output data of a round calculation of a previous stage, and the restructured data is set as input data for a round calculation of the next stage, the round function includes an F-function and an exclusive OR operation to be performed on a output or an input of the F-function with data of another line, and the cryptographic processing step includes setting a result of the round calculation of the previous stage as the input to the round calculation of the next stage by performing an operation that satisfies the following distribution conditions (1) through (3): (1) F-function input-side data series are distributed to XOR-side data series of the next round function, (2) XOR-side data series are distributed to F-function input-side data series of the next round function, and (3) each one of data series divided into d/2 sets is distributed to d/2 data series of the next round function without overlaps.

13. A cryptographic processing device comprising: a cryptographic processing circuit configured to divide and input constituent bits of data to be subjected to data processing into a plurality of lines, and repeatedly perform a data converting operation on the data in the respective lines by using a round function, wherein the cryptographic processing circuit has a structure designed to input n/d-bit data formed by dividing n-bit data as input data by a division number d to the respective lines, and repeatedly perform a calculation as a round calculation including the data converting operation using the round function, the cryptographic processing circuit performs an operation in which the n/d-bit data of each line having output data of the round calculation is redivided into d/2 sets of data, the redivided data is recombined to restructure d sets of n/d-bit data different from output data of a round calculation of a previous stage, and the restructured data is set as input data for a round calculation of the next stage, and the cryptographic processing circuit performs an operation in which d.times.(d/2) sets of redivided data are generated by redividing n/d-bit data of each of d lines having the output data of the round calculation into d/2 sets of data, d/2 sets of redivided data selected from different lines among the d lines corresponding to the division number d are recombined to restructure d sets of n/d-bit data different from the output data of the round calculation of the previous stage, and the restructured data is set as the input data for the round calculation of the next stage.

14. The cryptographic processing device according to claim 13, wherein the round function includes an F-function and an exclusive OR operation to be performed on a output or an input of the F-function and data of another line, and the cryptographic processing circuit sets a result of the round calculation of the previous stage as the input to the round calculation of the next stage by performing an operation that satisfies the following distribution conditions (1) through (3): (1) F-function input-side data series are distributed to XOR-side data series of the next round function, (2) XOR-side data series are distributed to F-function input-side data series of the next round function, and (3) each one of data series divided into d/2 sets is distributed to d/2 data series of the next round function without overlaps.

15. An information processing device comprising: a processor configured to execute a program; a memory storing the program; and a cryptographic processing circuit configured to divide and input constituent bits of data to be subjected to data processing into a plurality of lines, and repeatedly perform a data converting operation on the data in the respective lines by using a round function, wherein the cryptographic processing circuit has a structure designed to input n/d-bit data formed by dividing n-bit data as input data by a division number d to the respective lines, and repeatedly perform a calculation as a round calculation including the data converting operation using the round function, the cryptographic processing circuit performs an operation in which the n/d-bit data of each line having output data of the round calculation is redivided into d/2 sets of data, the redivided data is recombined to restructure d sets of n/d-bit data different from output data of a round calculation of a previous stage, and the restructured data is set as input data for a round calculation of the next stage, the round function includes an F-function and an exclusive OR operation to be performed on a output or an input of the F-function with data of another line, and the cryptographic processing circuit sets a result of the round calculation of the previous stage as the input to the round calculation of the next stage by performing an operation that satisfies the following distribution conditions (1) through (3): (1) F-function input-side data series are distributed to XOR-side data series of the next round function, (2) XOR-side data series are distributed to F-function input-side data series of the next round function, and (3) each one of data series divided into d/2 sets is distributed to d/2 data series of the next round function without overlaps.

* * * * *